(12) United States Patent
Matsunaga et al.

(10) Patent No.: US 9,643,085 B2
(45) Date of Patent: May 9, 2017

(54) COMPUTER-READABLE STORAGE MEDIUM, INFORMATION PROCESSING SYSTEM, AND INFORMATION PROCESSING METHOD FOR CONTROLLING A VIRTUAL OBJECT USING ATTITUDE DATA

(75) Inventors: Hiroshi Matsunaga, Kyoto (JP); Yugo Hayashi, Kyoto (JP); Kazuya Sumaki, Kyoto (JP); Keiichi Minato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/277,561

(22) Filed: Oct. 20, 2011

(65) Prior Publication Data

US 2012/0229516 A1 Sep. 13, 2012

(30) Foreign Application Priority Data

Mar. 8, 2011 (JP) ................................. 2011-050039
Apr. 5, 2011 (JP) ................................. 2011-083453

(51) Int. Cl.
| | | |
|---|---|---|
| A63F 13/42 | (2014.01) | |
| A63F 13/214 | (2014.01) | |
| A63F 13/5258 | (2014.01) | |
| A63F 13/5255 | (2014.01) | |
| A63F 13/26 | (2014.01) | |

(Continued)

(52) U.S. Cl.
CPC ............ *A63F 13/42* (2014.09); *A63F 13/214* (2014.09); *A63F 13/26* (2014.09); *A63F 13/5255* (2014.09); *A63F 13/5258* (2014.09); *A63F 13/211* (2014.09); *A63F 13/218* (2014.09); *A63F 2300/105* (2013.01); *A63F 2300/1068* (2013.01); *A63F 2300/301* (2013.01); *A63F 2300/403* (2013.01); *A63F 2300/6676* (2013.01); *A63F 2300/6684* (2013.01)

(58) Field of Classification Search
USPC .......................................................... 345/659
See application file for complete search history.

(56) References Cited

U.S. PATENT DOCUMENTS

| | | |
|---|---|---|
| 5,838,909 A | 11/1998 | Roy et al. |
| 5,853,324 A | 12/1998 | Kami et al. |
| 6,201,554 B1 | 3/2001 | Lands |

(Continued)

FOREIGN PATENT DOCUMENTS

| | | |
|---|---|---|
| EP | 1 726 342 A2 | 11/2006 |
| EP | 2 218 485 | 8/2010 |

(Continued)

OTHER PUBLICATIONS

Office Action dated Jul. 18, 2013 in U.S. Appl. No. 13/362,255.

(Continued)

*Primary Examiner* — Vu Nguyen
(74) *Attorney, Agent, or Firm* — Nixon & Vanderhye, P.C.

(57) ABSTRACT

An object arranged in a virtual world is caused to move in accordance with data based on a load applied to a load detection device. Then, based on attitude data outputted from a portable display device and a position of the object in the virtual world, a first virtual camera for generating an image of the virtual world is controlled, and a first image representing the virtual world viewed from the first virtual camera is displayed on the portable display device.

26 Claims, 29 Drawing Sheets

(51) Int. Cl.
*A63F 13/211* (2014.01)
*A63F 13/218* (2014.01)

(56) References Cited

U.S. PATENT DOCUMENTS

| | | | |
|---|---|---|---|
| 6,225,977 B1 | 5/2001 | Li | |
| 6,290,600 B1 | 9/2001 | Glasson | |
| 6,416,410 B1 * | 7/2002 | Abou-Samra | G06T 9/005 345/614 |
| 6,450,886 B1 | 9/2002 | Oishi et al. | |
| 6,483,540 B1 | 11/2002 | Akasawa et al. | |
| 6,500,070 B1 | 12/2002 | Tomizawa et al. | |
| 6,540,614 B1 | 4/2003 | Nishino et al. | |
| 6,712,703 B2 * | 3/2004 | Miyamoto et al. | 463/43 |
| 6,762,746 B2 | 7/2004 | Fukuda | |
| 6,908,388 B2 | 6/2005 | Shimizu et al. | |
| 6,966,837 B1 | 11/2005 | Best | |
| 7,326,117 B1 | 2/2008 | Best | |
| 7,588,498 B2 | 9/2009 | Iizuka et al. | |
| 2002/0006827 A1 | 1/2002 | Ogata et al. | |
| 2002/0022518 A1 | 2/2002 | Okuda et al. | |
| 2002/0140666 A1 | 10/2002 | Bradski | |
| 2002/0155889 A1 * | 10/2002 | Miyamoto | A63F 13/10 463/32 |
| 2002/0165028 A1 * | 11/2002 | Miyamoto | A63F 13/06 463/46 |
| 2003/0134665 A1 | 7/2003 | Kato et al. | |
| 2003/0216176 A1 * | 11/2003 | Shimizu | A63F 13/10 463/31 |
| 2003/0220142 A1 | 11/2003 | Siegel | |
| 2004/0046736 A1 | 3/2004 | Pryor et al. | |
| 2004/0092309 A1 | 5/2004 | Suzuki | |
| 2004/0219980 A1 | 11/2004 | Bassett et al. | |
| 2004/0229687 A1 | 11/2004 | Miyamoto et al. | |
| 2005/0014543 A1 | 1/2005 | Itoi et al. | |
| 2005/0119053 A1 | 6/2005 | Suzuki et al. | |
| 2005/0130738 A1 | 6/2005 | Miyamoto et al. | |
| 2005/0187015 A1 | 8/2005 | Suzuki et al. | |
| 2005/0255900 A1 | 11/2005 | Takahashi et al. | |
| 2006/0017692 A1 | 1/2006 | Wehrenberg et al. | |
| 2006/0040740 A1 | 2/2006 | DiDato | |
| 2006/0046848 A1 | 3/2006 | Abe et al. | |
| 2006/0262120 A1 * | 11/2006 | Rosenberg | 345/473 |
| 2006/0262210 A1 | 11/2006 | Smith et al. | |
| 2006/0266200 A1 | 11/2006 | Goodwin | |
| 2007/0007143 A1 | 1/2007 | Hayashi et al. | |
| 2007/0008298 A1 | 1/2007 | Ohta | |
| 2007/0015577 A1 | 1/2007 | Hsu | |
| 2007/0018968 A1 | 1/2007 | Iwamoto et al. | |
| 2007/0072662 A1 * | 3/2007 | Templeman | A63F 13/00 463/6 |
| 2007/0073196 A1 | 3/2007 | Tanaka et al. | |
| 2007/0208528 A1 | 9/2007 | Seo et al. | |
| 2007/0265085 A1 | 11/2007 | Miyamoto et al. | |
| 2008/0009332 A1 | 1/2008 | Kake | |
| 2008/0042973 A1 | 2/2008 | Zhao et al. | |
| 2008/0062198 A1 | 3/2008 | Takahashi et al. | |
| 2008/0070686 A1 | 3/2008 | Satsukawa et al. | |
| 2008/0096654 A1 | 4/2008 | Mondesir et al. | |
| 2008/0096657 A1 | 4/2008 | Benoist | |
| 2008/0102951 A1 | 5/2008 | Eto et al. | |
| 2008/0216974 A1 | 9/2008 | Pitcher et al. | |
| 2008/0254821 A1 | 10/2008 | Kusuda et al. | |
| 2008/0261696 A1 | 10/2008 | Yamazaki et al. | |
| 2008/0268956 A1 | 10/2008 | Suzuki | |
| 2008/0274813 A1 | 11/2008 | Sato | |
| 2008/0318681 A1 | 12/2008 | Rofougaran et al. | |
| 2009/0002391 A1 | 1/2009 | Williamson et al. | |
| 2009/0069096 A1 | 3/2009 | Nishimoto | |
| 2009/0070093 A1 | 3/2009 | Nakanishi et al. | |
| 2009/0093305 A1 | 4/2009 | Okamoto et al. | |
| 2009/0156308 A1 | 6/2009 | Hsu | |
| 2009/0187371 A1 | 7/2009 | Ohta | |
| 2009/0244064 A1 | 10/2009 | Inokuchi et al. | |
| 2009/0298585 A1 | 12/2009 | Cannon et al. | |
| 2009/0303204 A1 | 12/2009 | Nasiri et al. | |
| 2010/0045666 A1 | 2/2010 | Kornmann et al. | |
| 2010/0045667 A1 | 2/2010 | Kornmann et al. | |
| 2010/0048357 A1 | 2/2010 | Nakagawa et al. | |
| 2010/0053322 A1 | 3/2010 | Marti et al. | |
| 2010/0058254 A1 | 3/2010 | Narita | |
| 2010/0081505 A1 | 4/2010 | Alten et al. | |
| 2010/0087248 A1 | 4/2010 | Takahashi | |
| 2010/0137063 A1 | 6/2010 | Shirakawa et al. | |
| 2010/0169110 A1 | 7/2010 | Sawano et al. | |
| 2010/0178988 A1 | 7/2010 | Izuno et al. | |
| 2010/0188397 A1 | 7/2010 | Tsai et al. | |
| 2010/0188937 A1 | 7/2010 | Watanabe | |
| 2010/0214216 A1 | 8/2010 | Nasiri et al. | |
| 2010/0245236 A1 | 9/2010 | Takayama | |
| 2010/0245685 A1 | 9/2010 | Onodera et al. | |
| 2010/0279770 A1 | 11/2010 | Ikeda | |
| 2010/0283723 A1 | 11/2010 | Konishi | |
| 2010/0285882 A1 | 11/2010 | Hsu | |
| 2010/0292006 A1 | 11/2010 | Terrell et al. | |
| 2010/0302238 A1 | 12/2010 | Yonemori et al. | |
| 2010/0304857 A1 | 12/2010 | Suzuki et al. | |
| 2011/0039618 A1 | 2/2011 | Ichiyanagi et al. | |
| 2011/0054359 A1 | 3/2011 | Sazonov et al. | |
| 2011/0070953 A1 | 3/2011 | Konishi | |
| 2011/0077088 A1 | 3/2011 | Hayashi et al. | |
| 2011/0092289 A1 | 4/2011 | Dagman et al. | |
| 2011/0159960 A1 | 6/2011 | Ueshima et al. | |
| 2011/0169928 A1 | 7/2011 | Gassel et al. | |
| 2011/0172013 A1 | 7/2011 | Shirasaka et al. | |
| 2011/0244956 A1 | 10/2011 | Sakakibara et al. | |
| 2011/0244957 A1 | 10/2011 | Nishimura et al. | |
| 2011/0250964 A1 | 10/2011 | Kulas | |
| 2011/0250965 A1 | 10/2011 | Kulas et al. | |
| 2011/0281650 A1 | 11/2011 | Yamazaki et al. | |
| 2011/0300930 A1 | 12/2011 | Hsu | |
| 2011/0306425 A1 | 12/2011 | Rivard et al. | |
| 2012/0014558 A1 | 1/2012 | Stafford et al. | |
| 2012/0017236 A1 | 1/2012 | Stafford et al. | |
| 2012/0079080 A1 | 3/2012 | Pishevar | |
| 2012/0086630 A1 | 4/2012 | Zhu et al. | |
| 2012/0086631 A1 | 4/2012 | Osman et al. | |
| 2012/0115596 A1 | 5/2012 | Otani | |
| 2012/0115609 A1 | 5/2012 | Sugiyama et al. | |
| 2013/0017876 A1 | 1/2013 | Koumbourlis | |
| 2013/0038532 A1 | 2/2013 | Okura et al. | |

FOREIGN PATENT DOCUMENTS

| | | |
|---|---|---|
| EP | 2 497 545 A2 | 9/2012 |
| EP | 2 497 545 A3 | 10/2012 |
| EP | 2015854 | 11/2013 |
| GB | 2 442 259 | 4/2008 |
| GB | 2 442 259 A | 4/2008 |
| JP | H07-36612 A | 2/1995 |
| JP | H9-091110 | 4/1997 |
| JP | H09-294260 | 11/1997 |
| JP | H11-90043 A | 4/1999 |
| JP | 2000-316143 | 11/2000 |
| JP | 2000-325653 | 11/2000 |
| JP | 2001-34247 A | 2/2001 |
| JP | 2002-298160 | 10/2002 |
| JP | 2002-325963 | 11/2002 |
| JP | 2003-61940 | 3/2003 |
| JP | 2003-512142 | 4/2003 |
| JP | 2003-325974 A | 11/2003 |
| JP | 2003-334379 | 11/2003 |
| JP | 2004-030408 | 1/2004 |
| JP | 2004-159781 | 6/2004 |
| JP | 2004-329744 | 11/2004 |
| JP | 2005-103154 | 4/2005 |
| JP | 2005-137921 | 6/2005 |
| JP | 2005-230263 | 9/2005 |
| JP | 2006-31307 | 2/2006 |
| JP | 2006-39635 | 2/2006 |
| JP | 2007-301048 | 11/2007 |
| JP | 2008-15679 | 1/2008 |
| JP | 2008-264195 | 11/2008 |
| JP | 2008-264402 | 11/2008 |

(56) References Cited

FOREIGN PATENT DOCUMENTS

| JP | 2009-172010 | 8/2009 |
|---|---|---|
| JP | 2009-237680 | 10/2009 |
| JP | 2009-536058 | 10/2009 |
| JP | 2010-055511 | 3/2010 |
| JP | 2010-233705 | 10/2010 |
| JP | 2010-259611 | 11/2010 |
| JP | 2010-273839 | 12/2010 |
| JP | 2011-015752 | 1/2011 |
| JP | 2011-19810 | 2/2011 |
| JP | 2011-019817 | 2/2011 |
| JP | 2011-53838 | 3/2011 |
| JP | 2011-056049 | 3/2011 |
| WO | WO 00/67864 | 11/2000 |
| WO | WO 01/30470 A1 | 5/2001 |
| WO | WO 2004/103244 | 2/2004 |
| WO | 2010/060211 | 6/2010 |
| WO | 2011/004629 | 1/2011 |

OTHER PUBLICATIONS

Office Action in U.S. Appl. No. 13/283,032 dated Dec. 5, 2013.
Aug. 29, 2013 Office Action in U.S. Appl. No. 13/362,289, 71 pages.
Aug. 29, 2013 Office Action in U.S. Appl. No. 13/400,944, 58 pages.
Aug. 29, 2013 Office Action in U.S. Appl. No. 13/402,026, 87 pages.
Aug. 30, 2013 Office Action in U.S. Appl. No. 13/401,054, 71 pages.
European Search Report for European Application 12156630.1 dated Oct. 1, 2013.
Nov. 21, 2012 Office Action from U.S. Appl. No. 13/271,510, 22 pages.
Sep. 4, 2012 European Search Report for EP 11184519.4, 6 pages.
Sep. 4, 2012 European Search Report for EP 11185811.4, 7 pages.
Sep. 4, 2012 European Search Report for EP 11186930.1, 7 pages.
Oct. 2, 2012 European Search Report for EP 11186933.5, 7 pages.
Sep. 4, 2012 European Search Report for EP 11187473.1, 7 pages.
Sep. 7, 2012 European Search Report for EP 12156629.3, 7 pages.
European Search Report in corresponding European Application No. 14166174.4 dated Jan. 14, 2016.
Office Action in related U.S. Appl. No. 13/283,032 dated Dec. 30, 2015.
Notice of Allowance in related U.S. Appl. No. 13/343,913 dated Jan. 11, 2016.
"Minna no Ennichi," Shukan Famitsu, vol. 27, No. 10, Enterbrain Inc., Feb. 23, 2012, pp. 32-33.
"Close-up!," Mobile Software Palm OS, Mobile Press, vol. 5, No. 1, Japan- Gijutsu-Hyohron Co., Ltd., Feb. 24, 2005, p. 213.
"iPhone 3G Perfect Guide," Mac People, vol. 14, No. 9, Japan, ASCII Media Works, Inc., Sep. 1, 2008, pp. 122-127.
"The Legend of Zelda: Ocarina of Time 3D," Famitsu DS+Wii, Enterbrain Inc., Apr. 21, 2011, vol. 13, No. 6.
Samurai Slash, [online], Aug. 27, 2015, the date of publication: Jun. 18, 2009 URL:http://raku-job.jp/blog/2009/06/iponeipod-touch.html.
Office Action dated Aug. 28, 2015 issued in corresponding JP Patent Application No. 2011-123644.
Office Action dated Sep. 1, 2015 issued in corresponding JP Patent Application No. 2011-118901 and English Translation.
Office Action dated Sep. 1, 2015 issued in corresponding JP Patent Application No. 2011-115402 and English Translation.
Office Action dated Sep. 1, 2015 issued in corresponding JP Patent Application No. 2011-115404 and English Translation.
Wei et al., "Novel Interface for First Person Shooting Games on PDAs," 2008, pp. 113-121.
Office Action in corresponding U.S. Appl. No. 13/343,913 dated Jul. 29, 2015.
Decision of Refusal in corresponding Japanese Appln. No. 2011-123645 dated Aug. 6, 2015.
Office Action in corresponding Japanese Patent Application No. 2011-225538 mailed May 21, 2015.
Office Action in corresponding U.S. Appl. No. 13/352,091 dated May 1, 2015.
Japanese Notice of Reasons for Refusal dated Mar. 16, 2015 in corresponding JP Application No. 2011-118902.
Office Action in corresponding U.S. Appl. No. 13/287,320 dated Feb. 27, 2015.
Office Action in corresponding U.S. Appl. No. 13/343,913 dated Mar. 4, 2015.
Office Action issued Japanese Patent Appln. No. 2011-083454 dated Jan. 22, 2015 (with translation).
Office Action issued Japanese Patent Appln. Nos. 2011-123645 and 2011-123646 dated Feb. 20, 2015.
The Legend of Zelda: Ocarina of Time, Nintendo DREAM, Kabushiki Kaisha Anbitto, Mar. 1, 2011, vol. 203 p. 11.
European Search Report for EP11194630.7 dated Feb. 16, 2015.
Office Action dated Dec. 10, 2014 in corresponding U.S. Appl. No. 13/283,032.
European Search Report EP Application No. 12 15 0272.8 dated Oct. 28, 2014.
European Search Report EP Application No. 12 15 3067.9 dated Oct. 29, 2014.
Office Action in co-pending U.S. Appl. No. 13/271,510 dated Sep. 18, 2014.
Office Action in co-pending U.S. Appl. No. 13/287,320 dated Oct. 3, 2014.
Office Action in co-pending U.S. Appl. No. 13/283,072 dated Oct. 10, 2014.
Office Action dated Aug. 20, 2014 issued in U.S. Appl. No. 13/343,913.
Final Office Action (36 pages) dated Jul. 2, 2014 issued in co-pending U.S. Appl. No. 13/283,032.
U.S. Office Action dated Jun. 27, 2014 issued in co-pending U.S. Appl. No. 13/283,072.
Office Action in U.S. Appl. No. 13/362,255 dated Apr. 10, 2014.
Office Action of U.S. Appl. No. 13/333,045 dated Feb. 20, 2014.
Office Action dated Jan. 20, 2016, issued in corresponding U.S. Appl. No. 13/287,320, filed Nov. 2, 2011.
"Virtual Camera System." Wikipedia. Wikimedia Foundation, Feb. 25, 2011. Web. Jan. 7, 2016. <https://en.wikipedia.org/w/index.php?title=Virtual_camera_system&oldid=415917860>.
Notice of Allowance in corresponding U.S. Appl. No. 13/352,091 dated Feb. 18, 2016.
Cameltry: an iPhone ball rolling labyrinth demanding Cameltray and rotations. You had better not compare it with other similar games, uploaded on Mar. 9, 2009 (with translation).
Notice of Reasons for Refusal for corresponding Japanese Patent Appln. No. JP2011-118901 dated May 18, 2016.
Office Action dated Jun. 30, 2015 in corresponding U.S. Appl. No. 13/287,320.

* cited by examiner

Po　　　61

2　　Po　　Lp

COMPUTER-READABLE STORAGE MEDIUM, INFORMATION PROCESSING SYSTEM, AND INFORMATION PROCESSING METHOD FOR CONTROLLING A VIRTUAL OBJECT USING ATTITUDE DATA

CROSS REFERENCE TO RELATED APPLICATION

The disclosure of Japanese Patent Application No. 2011-083453, filed on Apr. 5, 2011, is incorporated herein by reference.

FIELD

The exemplary embodiments relate to computer-readable storage media, information processing systems, and information processing methods. More particularly, the exemplary embodiments relate to computer-readable storage media, information processing systems, and information processing methods, which enable, for example, processing based on an action of a user.

BACKGROUND AND SUMMARY

Conventionally, there are known game systems that allow a user to play a game based on a load of the user. For example, a conventional game system includes a board type controller having a load sensor. In the game system, a load value is detected by the load sensor when the user stands on the board type controller, and the detected load value is transmitted as operation data to a game apparatus. In the game apparatus that has received the operation data, a game process is executed based on the load value represented by the operation data transmitted from the board type controller, and the content of the game process is displayed on a monitor connected to the game apparatus.

In the conventional game system, however, the result of the game process based on the load value represented by the operation data is displayed on the monitor connected to the game apparatus. It is premised that an existing television receiver or the like is used as the monitor, and generally a stationary display is used. On the other hand, when the user performs an operation on the board type controller, the operation is often based on an action of the user. However, since the monitor is stationary installed, the user is not allowed to view the result of the game process in a favorable situation according to the user's action.

Accordingly, an object of the exemplary embodiments is to provide a computer-readable storage medium, an information processing system, and an information processing method, which allow, when a process is performed in accordance with an operation based on an action of a user, the user to view the result of the process in a favorable situation.

In order to achieve the above-mentioned object, the exemplary embodiments have the following configurations. It should be understood that the scope of the exemplary embodiments is interpreted only by the scope of the claims. In event of any conflict between the scope of the claims and the scope of the description in this section, the scope of the claims has priority.

An example of a configuration of a computer-readable storage medium according to the exemplary embodiments has stored therein an information processing program executed on a computer of an information processing apparatus which is capable of displaying an image on a portable display device. The portable display device outputs at least attitude data based on an attitude of a body of the portable display device. The information processing program causes the computer to act as load obtaining means, object moving means, first virtual camera control means, and display control means. The load obtaining means obtains data based on a load applied to a load detection device. The object moving means causes an object arranged in a virtual world to move, based on the data obtained by the load obtaining means. The first virtual camera control means controls a first virtual camera which generates an image of the virtual world, based on the attitude data and a position of the object in the virtual world. The display control means displays, on the portable display device, a first image representing the virtual world viewed from the first virtual camera.

The information processing apparatus may be an apparatus for executing a game process and generating an image based on the game process, or may be a versatile apparatus such as a general personal computer. The portable display device may have a size small enough to be carried by a user. Typically, the portable display device may be a display device which allows the user, holding the portable display device with his/her both hands, to view an image displayed thereon. The portable display device may include other components than the means for outputting at least attitude data and the means for displaying the first image, like a terminal device of exemplary embodiments described later, or may not include other components. The load detection device may be, for example, a device which detects a load applied thereto when a user puts at least a part of his/her body thereon, or a device which outputs an on/off signal according to the load. It is considered that, when the user operates the load detection device, the user may stand on the load detection device with his/her bottoms of both feet contacting the upper surface thereof, or the user may put his/her one foot on the upper surface thereof, or the user may put another part (e.g., a hand) of his/her body on the upper surface thereof.

According to the above configuration, when the user performs an operation by using the load detection device and thereby a process of causing an object in a virtual world to move based on the user's operation is performed, the user is allowed to view the result of the process on the portable display device. Therefore, the user is allowed to view an image displayed on the portable display device while holding the portable display device. Accordingly, for example, the user is allowed to perform an operation in a new operation environment, and allowed to view the result of the process in a favorable situation for the user in accordance with the operation environment. Further, since the first virtual camera for generating an image of a virtual world displayed on the portable display device is controlled based on the attitude of the portable display device, when the user turns the portable display device to his/her desired direction, an image of a virtual world in the direction can be displayed on the portable display device. Thus, the user is allowed to operate the first virtual camera by moving the portable display device.

The information processing program may cause the computer to act as attitude calculation means. The attitude calculation means calculates an attitude of the portable display device, based on the attitude data. In this case, the first virtual camera control means may control the first virtual camera, based on the attitude of the portable display device calculated by the attitude calculation means, and the position of the object.

According to the above configuration, an attitude of the portable display device is calculated based on the attitude data, and the first virtual camera can be controlled based on the attitude of the portable display device.

The first virtual camera control means may control at least one of a position and an attitude of the first virtual camera in the virtual world, based on the attitude of the portable display device.

The first virtual camera control means may control at least one of a position and an attitude of the first virtual camera, by controlling a line-of-sight direction of the first virtual camera in the virtual world, the line-of-sight direction being based on the attitude of the portable display device.

The attitude calculation means may calculate an attitude of the portable display device with respect to a predetermined direction in a real space. The first virtual camera control means may control at least one of the position and the attitude of the first virtual camera, with reference to a direction which corresponds to the predetermined direction and is set in the virtual world, based on the attitude of the portable display device with respect to the predetermined direction in the real space.

When the predetermined direction is a direction of gravity in the real space, the attitude calculation means may calculate an attitude of the portable display device with respect to the direction of gravity. The first virtual camera control means may control at least one of the position and the attitude of the first virtual camera, with reference to a direction of gravity set in the virtual world, based on the attitude of the portable display device with respect to the direction of gravity in the real space.

The attitude calculation means may calculate at least an attitude in which the portable display device rotates around the direction of gravity in the real space. The first virtual camera control means may control the attitude of the first virtual camera by rotating the first virtual camera around the direction of gravity set in the virtual world, based on the attitude in which the portable display device rotates around the direction of gravity in the real space.

The first virtual camera control means may control an attitude of the first virtual camera so as to be the same as the attitude of the portable display device.

According to the above configuration, the attitude and the position of the first virtual camera are controlled based on the attitude of the portable display device. Therefore, when the user turns the portable display device to his/her desired direction, the user is provided with an image which makes the user feel as if he/she looks into the virtual world through the portable display device, and thereby the user is allowed to experience a sense of presence in the virtual world.

The first virtual camera control means may control the first virtual camera such that the object is included in the first image.

According to the above configuration, since the image of the object moved by the user is included in the image of the virtual world displayed on the portable display device, the operation of moving the object is facilitated.

The object moving means may cause the object to move in a direction based on the line-of-sight direction of the first virtual camera.

According to the above configuration, the direction of the virtual world displayed on the portable display device can be regarded as the movement direction of the object. Accordingly, the user is allowed to set the movement direction of the object in accordance with the attitude of the portable display device, and the virtual world viewed in the movement direction is displayed on the portable display device.

Thus, the user is allowed to easily and intuitively set the movement direction of the object in his/her desired direction.

The portable display device may include at least one of a gyro sensor and an acceleration sensor. The attitude calculation means may calculate an attitude of the portable display device, based on data outputted from at least one of the gyro sensor and the acceleration sensor.

According to the above configuration, it is possible to accurately calculate an attitude of the portable display device by using data which is output from the gyro sensor and represents an angular velocity that occurs in the portable display device and/or data which is output from the acceleration sensor and represents an acceleration that occurs in the portable display device.

The display control means may display, separately from the first image, a second image representing the virtual world viewed from a second virtual camera, on another display device connected to the information processing apparatus.

The other display device is a display device connected to the information processing apparatus, such as a monitor 2 described later. Any type of display device may be used so long as it is separated from the portable display device, and is capable of displaying the second image generated by the information processing apparatus. For example, the other display device may be integrated with (in one housing) the information processing apparatus.

According to the above configuration, when performing a process based on an operation according to a load applied to the load detection device and an operation of moving the portable display device, the result of the process is displayed on another display device connected to the information processing apparatus as well as on the portable display device. Accordingly, the user is allowed to selectively use the images displayed on the two display devices, in accordance with the operation state or his/her preference, and allowed to view the image suitable for the user's operation. Further, the image displayed on the other display device connected to the information processing apparatus may be viewed by a person other than the user, thereby providing a favorable viewing environment when a plurality of persons view the result of the process.

The display control means may output image data representing the first image to the portable display device. In this case, the portable display device may include image data obtaining means and display means. The image data obtaining means obtains image data outputted from the information processing apparatus. The display means displays the first image represented by the image data obtained by the image data obtaining means.

According to the above configuration, the portable display device functions as a so-called thin client terminal which does not execute information processing.

The information processing program may cause the computer to act as compressed image generation means. The compressed image generation means generates compressed image data by compressing the image data representing the first image. In this case, the display control means may output the compressed image data generated by the compressed image generation means to the portable display device. The image data obtaining means may obtain the compressed image data outputted from the information processing apparatus. The portable display device may further include display image decompression means. The display image decompression means decompresses the compressed image data to obtain image data representing the first display image. In this case, the display means may display the first image represented by the image data which has been obtained by the image data obtaining means and decompressed by the display image decompression means.

According to the above configuration, since the first image is compressed and transmitted from the information processing apparatus to the portable display device. Therefore, the first image can be transmitted at a high speed, thereby reducing a delay from when the first image is generated to when the first image is displayed on the portable display device.

The information processing program may cause the computer to act as second virtual camera control means. The second virtual camera control means sets, based on the position of the object in the virtual world, the second virtual camera for generating an image of the virtual world, in a position different from the position of the first virtual camera such that the object is included in the second image.

According to the above configuration, an image different from the image displayed on the portable display device is displayed on another display device connected to the information processing apparatus. Therefore, images created according to the respective purposes of use can be displayed on the display devices suitable for the user.

The second virtual camera control means may set the second virtual camera in a position apart from the object by a distance longer than the distance between the object and the first virtual camera. The display control means may display, on the other display device, as the second image, a range of the virtual world, which range is broader than the range of the virtual world as the first image.

According to the above configuration, an image of the virtual world, which is larger in display range than the image of the virtual world displayed on the portable display device, is displayed on the other display device connected to the information processing apparatus. Therefore, when providing the user with the state of the virtual world, an image suitable for the user's operation can be displayed on each of the display devices.

The second virtual camera control means may set the second virtual camera in a position in the virtual world, from which the second virtual camera views the object in a manner of bird's eye viewing. The display control means may display, on the other display device, as the second image, an image in which the object arranged in the virtual world is viewed in a manner of bird's eye viewing.

According to the above configuration, an image of the virtual world according to the attitude of the portable display device is displayed on the portable display device, while an image in which the virtual world is viewed in a manner of bird's eye viewing is displayed on the other display device connected to the information processing apparatus. Therefore, when providing the user with the state of the virtual world, an image suitable for the user's operation can be displayed on each of the display devices.

The second virtual camera control means may change the line-of-sight direction of the second virtual camera in the virtual world, in accordance with a change in the line-of-sight direction of the first virtual camera in the virtual world.

According to the above configuration, it is possible to realize a display control in which, when the direction of the virtual world displayed on the portable display device changes, the direction of the virtual world displayed on the other display device also changes in the same direction as the virtual world displayed on the portable display device.

Another example of a configuration of a computer-readable storage medium according to the exemplary embodiments has stored therein an information processing program executed on a computer of an information processing apparatus which is capable of displaying an image on a portable display device. The portable display device outputs at least attitude data according to an attitude of a body of the portable display device. The information processing program causes the computer to act as load obtaining means, first virtual camera control means, and display control means. The load obtaining means obtains data based on a load applied to a load detection device. The first virtual camera control means controls a first virtual camera which generates an image of the virtual world, based on the data obtained by the load obtaining means, and the attitude data. The display control means displays, on the portable display device, a first image representing the virtual world viewed from the first virtual camera.

According to the above configuration, when the user performs an operation by using the load detection device and thereby a process of displaying an image of a virtual world based on the user's operation is performed, the user is allowed to view the result of the process on the portable display device. Therefore, the user is allowed to view an image displayed on the portable display device while holding the portable display device. Accordingly, for example, the user is allowed to perform an operation in a new operation environment, and allowed to view the result of the process in a favorable situation for the user in accordance with the operation environment. Further, since the first virtual camera for generating an image of a virtual world displayed on the portable display device is controlled based on the user' operation using the load detection device and the attitude of the portable display device, when the user turns the portable display device to his/her desired direction and performs an operation by using the load detection device, an image of a virtual world in the direction can be displayed on the portable display device. Thus, the user is allowed to operate the first virtual camera by moving the portable display device.

The exemplary embodiments may be implemented in the form of an information processing system including the above-mentioned means, or in the form of an information processing method including actions performed by the above-mentioned means.

According to the exemplary embodiments, when the user performs an operation based on his/her action and thereby a process based on the user's action is performed, the user is allowed to view the result of the process in a favorable situation for the user.

These and other objects, features, aspects and advantages of the exemplary embodiments will become more apparent from the following detailed description when taken in conjunction with the accompanying drawings.

DETAILED DESCRIPTION OF NON-LIMITING EXAMPLE EMBODIMENTS

First Embodiment

Figure 1:
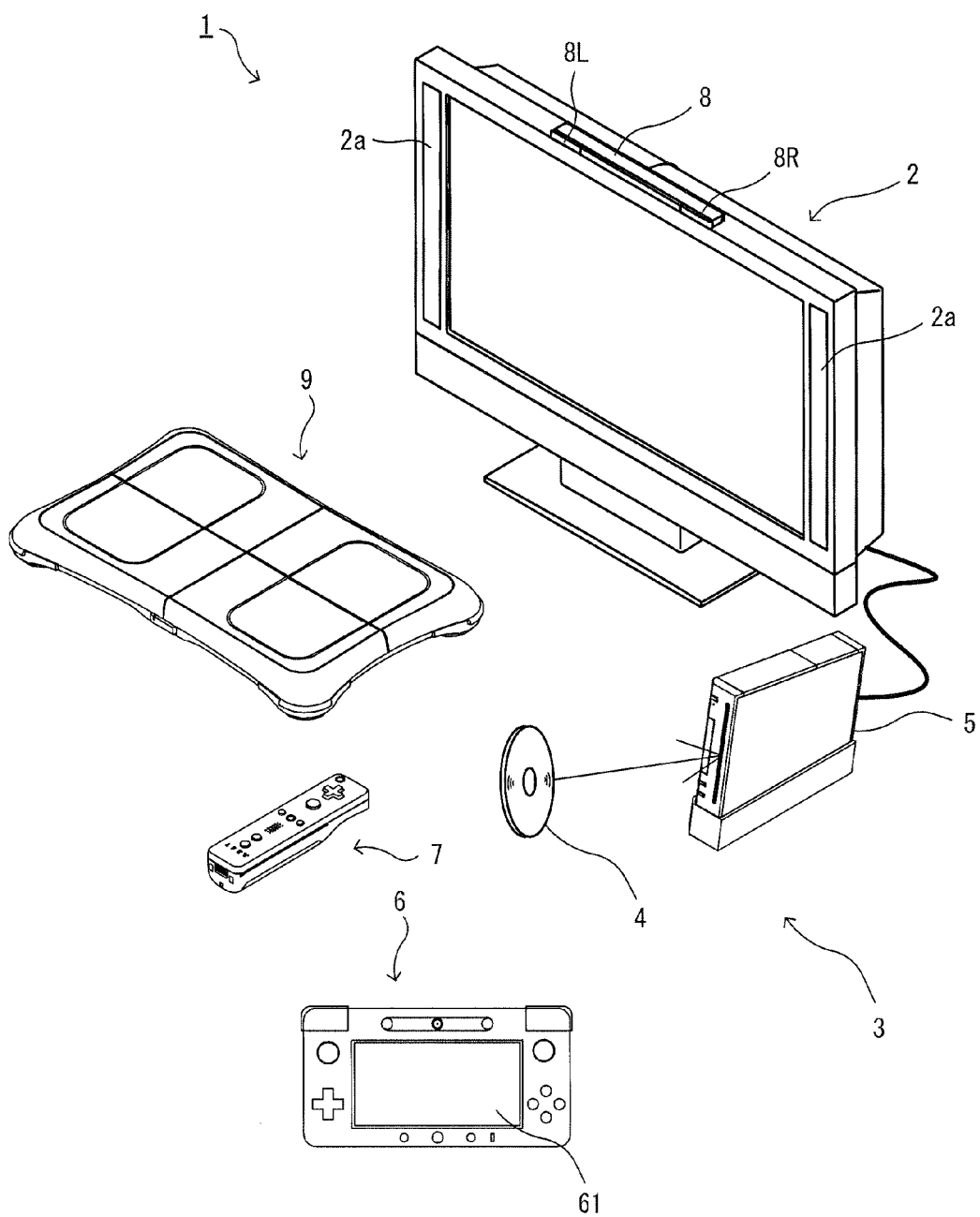
FIG. 1 is an external view illustrating a non-limiting example of a game system 1 according to an embodiment.
Figure 2:
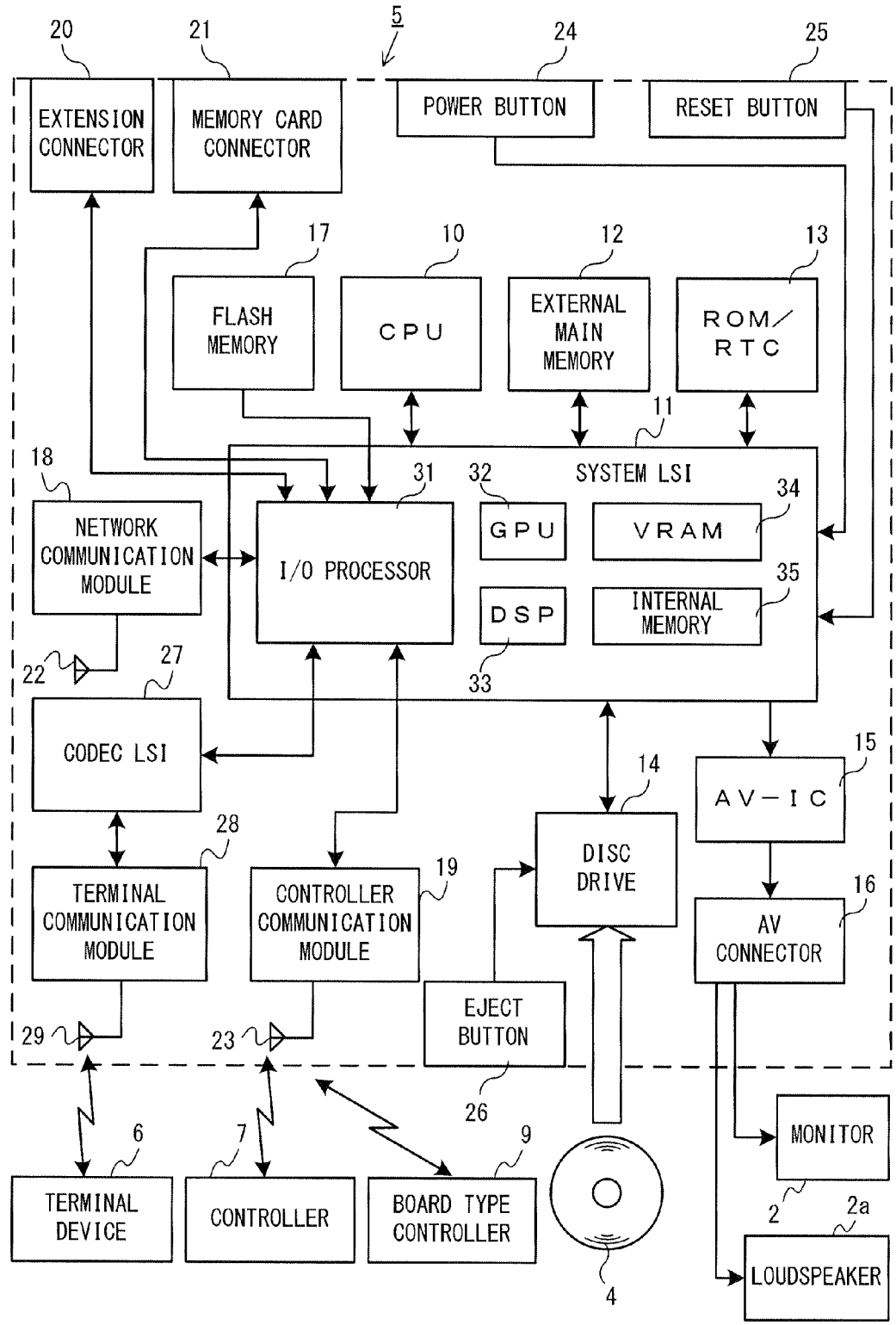
FIG. 2 is a functional block diagram illustrating a non-limiting example of a game apparatus body 5 shown in FIG. 1.

With reference to FIG. 1, an information processing apparatus for executing an information processing program according to a first embodiment and an information processing system including the information processing apparatus will be described. Hereinafter, in order to provide a specific description, a stationary game apparatus body 5 is used as an example of the information processing apparatus, and a game system including the game apparatus body 5 will be described. FIG. 1 is an external view illustrating an example of the game system 1 including the stationary game apparatus body 5. FIG. 2 is a block diagram illustrating an example of the game apparatus body 5. Hereinafter, the game system 1 will be described.

As shown in FIG. 1, the game system 1 includes a household television receiver (hereinafter, referred to as a monitor) 2 which is an example of display means, and the stationary game apparatus 3 connected to the monitor 2 via a connection cord. The monitor 2 includes loudspeakers 2a for outputting, in the form of sound, a sound signal outputted from the game apparatus 3. Further, the game apparatus 3 includes: an optical disc 4 having stored therein a program (e.g., a game program); the game apparatus body 5 having a computer for executing the program stored in the optical disc 4 to display a game screen on the monitor 2; a terminal device 6; a controller 7 for providing the game apparatus body 5 with operation information required for operating, for example, objects displayed on the display screen; and a board type controller 9. The game system 1 executes a game process on the game apparatus body 5 in accordance with a game operation using at least one of the terminal device 6, the controller 7, and the board type controller 9, and displays a game image obtained by the game process on the monitor 2 and/or the terminal device 6. The game apparatus body 5 is wirelessly connected to the terminal device 6, the controller 7, and the board type controller 9 so as to enable wireless communication therebetween. For example, the wireless communication is executed according to the Bluetooth (registered trademark) standard or the IEEE802.11n standard. However, the wireless communication may be executed in accordance with other standards such as standards for infrared communication.

The optical disc 4, typifying an information storage medium used for the game apparatus body 5 in an exchangeable manner, is detachably inserted in the game apparatus body 5. The optical disc 4 has stored therein an information processing program (typically, a game program) to be executed by the game apparatus body 5. The game apparatus body 5 has, on a front surface thereof, an insertion opening for the optical disc 4. The game apparatus body 5 reads and executes the information processing program stored in the optical disc 4 inserted into the insertion opening to execute the game process.

The monitor 2 is connected to the game apparatus body 5 via a connection cord. The monitor 2 displays a game image obtained by the game process executed by the game apparatus body 5. The monitor 2 includes the loudspeakers 2a. The loudspeakers 2a each output a game sound obtained as a result of the game process. In another embodiment, the game apparatus body 5 and a stationary display unit may be integrated with each other. The communication between the game apparatus body 5 and the monitor 2 may be wireless communication.

The game apparatus body 5 has mounted thereto a flash memory 17 (see FIG. 2) which functions as a backup memory for fixedly storing data such as saved data. The game apparatus body 5 executes the game program or the like stored in the optical disc 4, and displays a result thereof as a game image on the monitor 2 and/or the terminal device 6. The game program or the like to be executed may be previously stored in the flash memory 17 as well as in the optical disc 4. Further, the game apparatus body 5 may reproduce a state of a game played in the past, by using the saved data stored in the flash memory 17, and display an image of the game state on the monitor 2 and/or the terminal device 6. A user of the game apparatus 3 can enjoy the game progress by operating at least one of the terminal device 6, the controller 7, and the board type controller 9 while viewing the game image displayed on the monitor 2 and/or the terminal device 6.

The controller 7 and the board type controller 9 each wirelessly transmit transmission data such as operation information, by using, for example, the Bluetooth technology, to the game apparatus body 5 having a controller communication module 19. The controller 7 is operation means for performing, for example, selection of options displayed on the display screen of the monitor 2. The controller 7 includes a housing which is small enough to be held by one hand, and a plurality of operation buttons (including a cross key and the like) which are exposed at the surface of the housing. In addition, as is described later, the controller 7 includes an imaging information calculation section for taking an image viewed from the controller 7. As exemplary imaging targets of the imaging information calculation section, two LED modules (hereinafter, referred to as "markers") 8L and 8R are provided in the vicinity of the display screen of the monitor 2 (above the screen in FIG. 1). Although details will be described later, a user (player) is allowed to perform a game operation while moving the controller 7, and the game apparatus body 5 uses a marker 8 to calculate the movement, position, attitude and the like of the controller 7. The marker 8 has two markers 8L and 8R at both ends thereof. Specifically, the marker 8L (as well as the marker 8R) includes one or more infrared LEDs (Light Emitting Diodes), and emits infrared light forward from the monitor 2. The marker 8 is connected to the game apparatus body 5, so that the game apparatus body 5 can control the infrared LEDs included in the marker 8 to be lit on or off. The marker 8 is a portable unit, so that the user is allowed to place the marker 8 in any position. Although FIG. 1 shows a case where the marker 8 is placed on the monitor 2, the location and direction of the marker 8 may be optionally selected. Further, the controller 7 is capable of receiving, at a communication section 75, transmission data wirelessly transmitted from the controller communication module 19 of the game apparatus body 5, to generate a sound or vibration based on the transmission data.

In another embodiment, the controller 7 and/or the board type controller 9 may be connected to the game apparatus body 5 via a cable. Further, in the exemplary embodiment, the game system 1 includes a controller 7 and a board type controller 9. However, the game apparatus body 5 is communicable with a plurality of controllers 7 and a plurality of board type controllers 9. Therefore, a plurality of players can play a game by using a predetermined number of controllers 7 and board type controller 9 simultaneously.

The controller 7 includes a housing which is formed by, for example, plastic molding, and has a plurality of operation sections in the housing. The controller 7 transmits, to the game apparatus body 5, operation data representing an input state to any of the operation sections (i.e., whether or not any of the operation buttons is pressed).

The controller 7 includes an imaging information calculation section for analyzing image data of an image taken by image pickup means to identify an area having a high luminance in the image, and calculates the position of the center of gravity, the size, and the like of the area. For example, the imaging information calculation section includes image pickup means fixed to the housing of the controller 7. A marker emitting infrared light, such as a marker section 65 of the terminal device 6 and/or the marker 8, is a target to be imaged by the image pickup means. The imaging information calculation section calculates the position of the imaging target in the image taken by the image pickup means, and transmits, to the game apparatus body 5, marker coordinate data representing the calculated position. Since the marker coordinate data varies depending on the direction (angle of tilt) or the position of the controller 7, the game apparatus body 5 can calculate the direction and the position of the controller 7 by using the marker coordinate data.

The controller 7 includes an acceleration sensor and/or a gyro sensor. The acceleration sensor detects an acceleration (including gravitational acceleration) of the controller 7, and transmits acceleration data representing the detected acceleration to the game apparatus body 5. Since the acceleration detected by the acceleration sensor varies depending on the direction (angle of tilt) and the movement of the controller 7, the game apparatus body 5 can calculate the direction and the movement of the controller 7 by using the obtained acceleration data. The gyro sensor detects angular velocities around three axes which are set in the controller 7, and transmits angular velocity data representing the detected angular velocities to the game apparatus body 5. Since the angular velocities detected by the gyro sensor vary depending on the direction (angle of tilt) and the movement of the controller 7, the game apparatus body 5 can calculate the direction and the movement of the controller 7 by using the obtained angular velocity data. In this way, the user is allowed to perform a game operation by pressing the operation sections provided on the controller 7, or by moving the controller 7 to change the position and the attitude (angle of tilt) of the controller 7.

The controller 7 is provided with a loudspeaker and a vibrator. The controller 7 processes sound data transmitted from the game apparatus body 5, and causes the loudspeaker to output a sound based on the sound data. Further, the controller 7 processes vibration data transmitted from the game apparatus body 5, and causes the vibrator to vibrate in accordance with the vibration data. In the exemplary embodiment described later, a user is allowed to play a game without using the controller 7. The board type controller 9 will be described in detail later.

The terminal device 6 is a portable device that is small enough to be held by a user, and the user is allowed to move the terminal device 6 with hands, or place the terminal device 6 at any location. Although a specific structure of the terminal device 6 will be described later, the terminal device 6 includes an LCD (Liquid Crystal Display) 61 as display means, and input means (a touch panel 62, a gyro sensor 604, and the like described later). The terminal device 6 and the game apparatus body 5 (a terminal communication module 28 (see FIG. 2)) are communicable with each other wirelessly or via a cable. The terminal device 6 receives, from the game apparatus body 5, data of an image (e.g., a game image) generated in the game apparatus body 5, and displays the image represented by the data on an LCD 61. Although in the exemplary embodiment the LCD 61 is used as a display device, the terminal device 6 may include any other display device, such as a display device utilizing EL (Electro Luminescence), for example. Further, the terminal device 6 transmits, to the game apparatus body 5 having the terminal communication module 28, operation data representing the content of an operation performed on the terminal device 6.

Next, with reference to FIG. 2, an internal structure of the game apparatus body 5 will be described. FIG. 2 is a block diagram illustrating an example of an internal structure of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15 and the like.

The CPU 10, serving as a game processor, executes a program stored in the optical disc 4 to perform a process. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes such as control of data transmission between the respective components connected thereto, generation of an image to be displayed, and acquisition of data from an external apparatus. An internal structure of the system LSI 11 will be described later. The external main memory 12, which is a volatile memory, stores programs loaded from the optical disc 4 or the flash memory 17, and stores various data. The external main memory 12 is used as a work area and a buffer area for the CPU 10. The ROM/RTC 13 includes a ROM (so-called boot ROM) incorporating a program for booting the game apparatus body 5, and a clock circuit (RTC) for counting time. The disc drive 14 reads, from the optical disc 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM) 34, and the internal main memory 35. These components 31 to 35 are connected to each other via an internal bus (not shown).

The GPU 32, which is a part of rendering means, generates an image in accordance with a graphics command (draw command) supplied from the CPU 10. The VRAM 34 stores data (such as polygon data and texture data) required for the GPU 32 to execute the graphics command. When an image is generated, the GPU 32 generates image data by using the data stored in the VRAM 3. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a "monitor game image", and the game image to be displayed on the terminal device 6 may be referred to as a "terminal game image".

The DSP 33, serving as an audio processor, generates sound data by using sound data and sound waveform (tone quality) data stored in the internal main memory 35 and the external main memory 12. In the exemplary embodiment, similarly to the game images, both a game sound to be output from the loudspeakers 2a of the monitor 2 and a game sound to be output from the loudspeakers of the terminal device 6 may be generated. Hereinafter, the game sound to be output from the monitor 2 may be referred to as a "monitor game sound", and the game sound to be output from the terminal device 6 may be referred to as a "terminal game sound".

Among the image data and sound data generated by the game apparatus body 5, the image data and sound data to be output to the monitor 2 are read by the AV-IC 15. The AV-IC 15 outputs the read image data to the monitor 2 via an AV connector 16, and outputs the read sound data to the loudspeakers 2a included in the monitor 2. Thereby, an image is displayed on the monitor 2, and a sound is output from the loudspeakers 2a.

Further, among the image data and sound data generated by the game apparatus body 5, the image data and sound data to be output to the terminal device 6 are transmitted to the terminal device 6 by the I/O processor 31 or the like. Data transmission to the terminal device 6 by the I/O processor 31 or the like will be described later.

The I/O processor 31 executes data reception and transmission with the components connected thereto, and download of data from an external apparatus. The I/O processor 31 is connected to the flash memory 17, the network communication module 18, the controller communication module 19, an extension connector 20, a memory card connector 21, and a codec LSI 27. An antenna 23 is connected to the controller communication module 19. The codec LSI 27 is connected to the terminal communication module 28, and an antenna 29 is connected to the terminal communication module 28.

The game apparatus body 5 is connected to a network such as the Internet so as to communicate with external information processing apparatuses (for example, other game apparatuses or various servers). That is, the I/O processor 31 is connected to a network via the network communication module 18 and the antenna 22 so as to communicate with external information processing apparatuses connected to the network. The I/O processor 31 accesses the flash memory 17 at regular intervals so as to detect for data to be transmitted to the network. When data to be transmitted is detected, the data is transmitted to the network via the network communication module 18 and the antenna 22. Further, the I/O processor 31 receives, via the network, the antenna 22 and the network communication module 18, data transmitted from the external information processing apparatuses or data downloaded from a download server, and stores the received data in the flash memory 17. The CPU 10 executes a program, and reads the data stored in the flash memory 17 to use the data for execution of the program. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7 and/or the board type controller 9. That is, the I/O processor 31 receives, via the antenna 23 and the controller communication module 19, operation data or the like transmitted from the controller 7 and/or the board type controller 9, and stores (temporarily) the data in a buffer region of the internal main memory 35 or the external main memory 12. Similarly to the external main memory 12, the internal main memory 35 may store a program loaded from the optical disc 4 or a program loaded from the flash memory 17, and various data. The internal main memory 35 may be used as a work region or buffer region of the CPU 10.

The game apparatus body 5 is capable of transmitting/receiving image data, sound data and the like to/from the terminal device 6. When transmitting a game image (terminal game image) to the terminal device 6, the I/O processor 31 outputs data of a game image generated by the GPU 32 to the codec LSI 27. The codec LSI 27 performs a predetermined compression process on the image data supplied from the I/O processor 31. The terminal communication module 28 performs wireless communication with the terminal device 6. Accordingly, the image data compressed by the codec LSI 27 is transmitted by the terminal communication module 28 to the terminal device 6 via the antenna 29. In the exemplary embodiment, the codec LSI 27 compresses the image data by using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal device 6 at a high speed by using, for example, the technique of MIMO (Multiple Input Multiple Output) adopted in the IEEE802.11n standard, or may use other communication techniques.

The game apparatus body 5 transmits, to the terminal device 6, sound data as well as the image data. That is, the I/O processor 31 outputs sound data generated by the DSP 33 to the terminal communication module 28 via the codec LSI 27. The codec LSI 27 performs a compression process on the sound data in a similar manner to that for the image data. Any compression technique may be adopted for the sound data. In another embodiment, uncompressed sound data may be transmitted. The terminal communication module 28 transmits the compressed image data and sound data to the terminal device 6 via the antenna 29.

The game apparatus body 5 transmits, in addition to the image data and sound data, various control data to the terminal device 6, according to need. The control data represent control instructions for the components included in the terminal device 6, such as an instruction to control on/off of a marker section (a marker section 65 shown in FIG. 5), and an instruction to control image taking of a camera (a camera 66 shown in FIG. 5). The I/O processor 31 transmits the control data to the terminal device 6 in response to an instruction from the CPU 10. In the exemplary embodiment, the codec LSI 27 does not perform a data compression process on the control data. In another embodiment, however, the codec LSI 27 may perform a compression process on the control data. The above-described data transmitted from the game apparatus body 5 to the terminal device 6 may be encrypted according to need, or may not be encrypted.

The game apparatus body 5 can receive various data from the terminal device 6. Although details will be described later, in the exemplary embodiment, the terminal device 6 transmits operation data, image data, and sound data. The respective data transmitted from the terminal device 6 are received by the terminal communication module 28 via the antenna 29. The image data and sound data transmitted from the terminal device 6 have been subjected to a similar compression process to that for the image data and sound data transmitted from the game apparatus body 5 to the terminal device 6. Accordingly, these image data and sound data are transmitted from the terminal communication module 28 to the codec LSI 27, and subjected to a decompression process by the codec LSI 27. The decompressed data are output to the I/O processor 31. On the other hand, since the operation data transmitted from the terminal device 6 is smaller in amount than the image data and sound data, the operation data need not be compressed. The operation data may be encrypted according to need, or may not be encrypted. Accordingly, the operation data, which has been received by the terminal communication module 28, is output to the I/O processor 31 via the codec LSI 27. The I/O processor 31 stores (temporarily) the data received from the terminal device 6 in the buffer region of the internal main memory 35 or the external main memory 12.

The game apparatus body 5 is connectable to other devices and external storage media. That is, an extension connector 20 and a memory card connector 21 are connected to the I/O processor 31. The expansion connector 20 is an interface connector as typified by a USB and an SCSI, and is capable of performing communication with the network, instead of the network communication module 18, by connecting thereto a medium such as an external storage medium, a peripheral device such as another controller, or a wired communication connector. The memory card connector 21 is a connector for connecting thereto an external storage medium such as a memory card. For example, the I/O processor 31 accesses the external storage medium via the expansion connector 20 or the memory card connector 21 to save or read data.

The game apparatus body 5 includes (on the front main surface thereof, for example) a power button 24, a reset button 25, an insertion slot in which the optical disc 4 is inserted, an eject button 26 for ejecting the optical disc 4 from the insertion slot of the game apparatus body 5, and the like. The power button 24 and the reset button 25 are connected to the system LSI 11. When the power button 24 is turned on, the respective components of the game apparatus body 5 are supplied with power. When the reset button 25 is pressed, the system LSI 11 re-executes the boot program of the game apparatus body 5. The eject button 26 is connected to the disc drive 14. When the eject button 26 is pressed, the optical disc 4 is ejected from the disc drive 14.

In another embodiment, some of the components of the game apparatus body 5 may be constituted as an extension device separated from the game apparatus body 5. At this time, the extension device may be connected to the game apparatus body 5 via the extension connector 20. Specifically, the extension device may include, for example, the codec LSI 27, the terminal communication module 28, and the antenna 29, and may be detachably connected to the extension connector 20. Thus, by connecting the extension device to the game apparatus body which does not have the above-mentioned, the game apparatus body can be made communicable with the terminal device 6.

Figure 3:
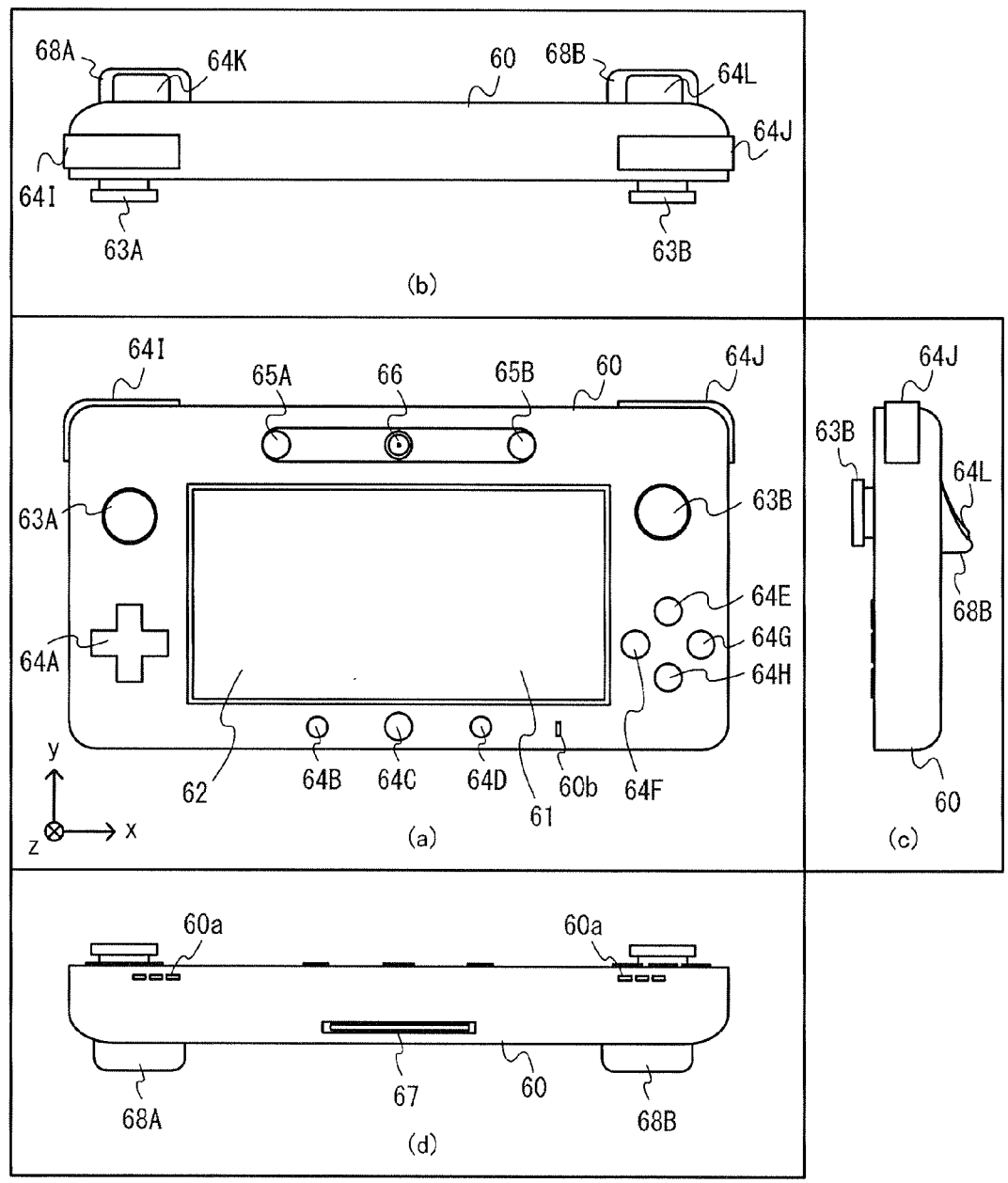
FIG. 3 is a diagram illustrating a non-limiting example of an external structure of a terminal device 6 shown in FIG. 1.
Figure 4:
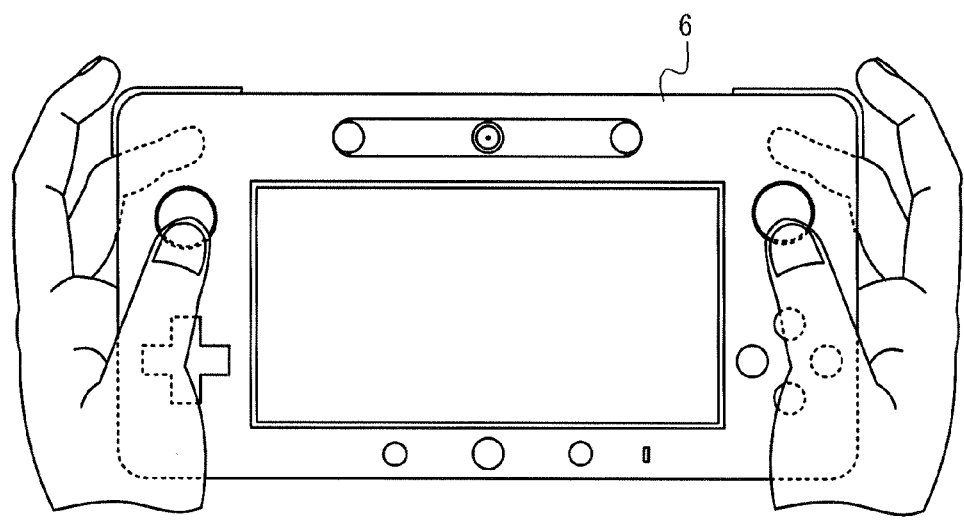
FIG. 4 is a diagram illustrating a non-limiting example of a state where a user holds the terminal device 6.
Figure 5:
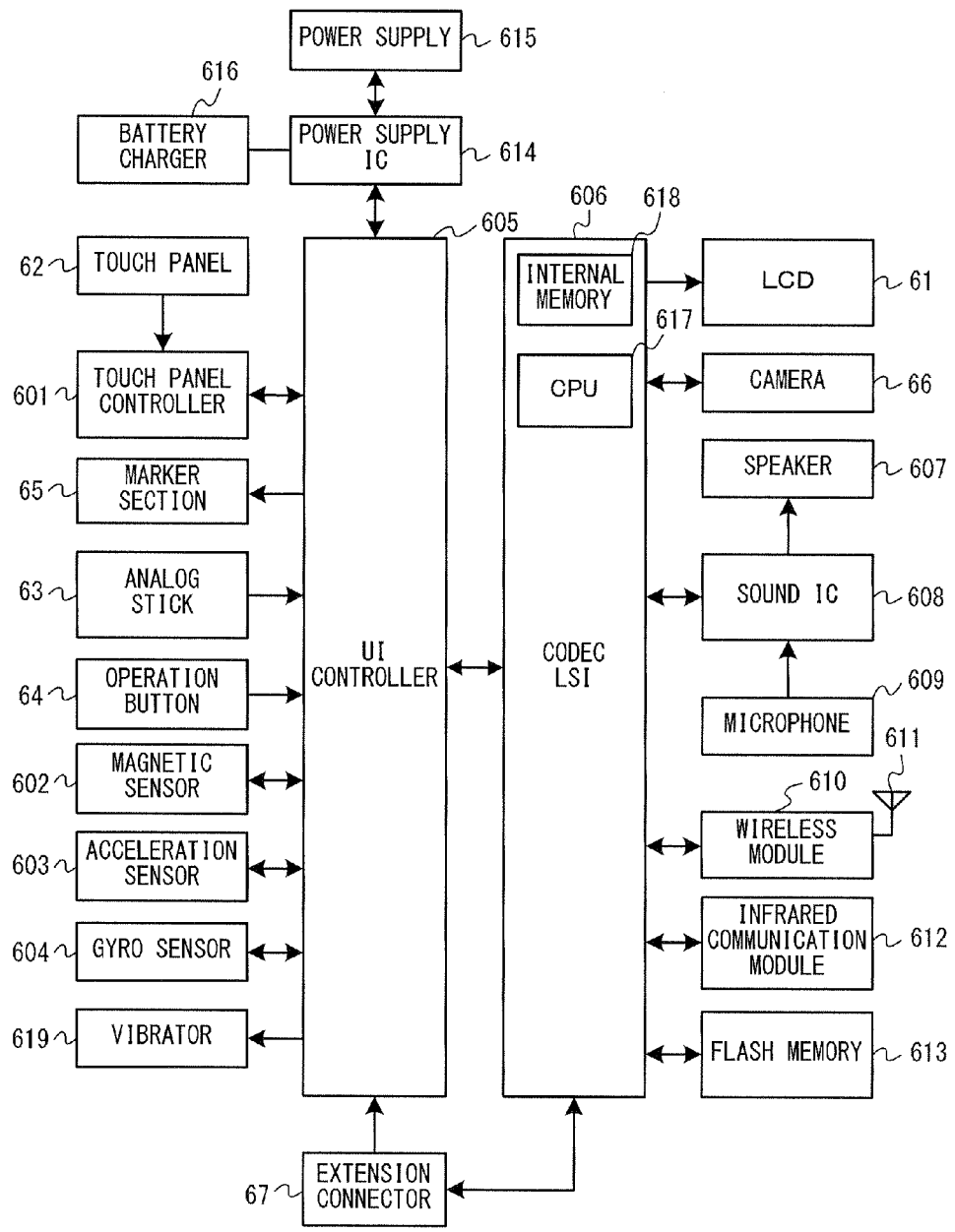
FIG. 5 is a block diagram illustrating a non-limiting example of an internal structure of the terminal device 6 shown in FIG. 3.

Next, a structure of the terminal device 6 will be described with reference to FIGS. 3 to 5. FIG. 3 is a diagram illustrating an example of an external structure of the terminal device 6. More specifically, (a) of FIG. 3 is a front view of the terminal device 6, (b) of FIG. 3 is a top view, (c) of FIG. 3 is a right side view, and (d) of FIG. 3 is a bottom view. FIG. 4 shows an example of a state in which a user holds the terminal device 6 with both hands.

As shown in FIG. 3, the terminal device 6 includes a housing 60 which generally has a horizontally long plate-like rectangular shape. The housing 60 is small enough to be held by the user. Therefore, the user is allowed to move the terminal device 6 with hands, and change the location of the terminal device 6.

The terminal device 6 includes an LCD 61 on a front surface of the housing 60. The LCD 61 is provided near the center of the front surface of the housing 60. Therefore, as shown in FIG. 4, the user, holding the housing 60 at portions to the right and left of the LCD 61, is allowed to move the terminal device 6 while viewing a screen of the LCD 61. FIG. 4 shows an example in which the user holds the terminal device 6 horizontally (i.e., with the longer sides of the terminal device 6 being oriented horizontally) by holding the housing 60 at portions to the right and left of the LCD 61. However, the user may hold the terminal device 6 vertically (i.e., with the longer sides of the terminal device 6 being oriented vertically).

As shown in (a) of FIG. 3, the terminal device 6 includes, as operation means, a touch panel 62 on the screen of the LCD 61. In the exemplary embodiment, the touch panel 62 is, but is not limited to, a resistive film type touch panel. However, a touch panel of any type, such as electrostatic capacitance type, may be used. The touch panel 62 may be of single touch type or multiple touch type. In the exemplary embodiment, the touch panel 62 has the same resolution (detection accuracy) as that of the LCD 61. However, the resolution of the touch panel 62 and the resolution of the LCD 61 need not be the same. Although an input onto the touch panel 62 is usually performed by using a touch pen, in addition to the touch pen, a finger of the user may be used for performing an input onto the touch panel 62. The housing 60 may have an opening for accommodating the touch pen used for performing an operation to the touch panel 62. Since the terminal device 6 has the touch panel 62, the user is allowed to operate the touch panel 62 while moving the terminal device 6. That is, the user is allowed to directly (by using the touch panel 62) perform an input onto the screen of the LCD 61 while moving the LCD 61.

As shown in FIG. 3, the terminal device 6 has, as operation means, two analog sticks 63A and 63B, and a plurality of operation buttons 64A to 64L. The analog sticks 63A and 63B are each a device for designating a direction. The analog sticks 63A and 63B are each configured such that a stick part thereof to be operated by a finger of the user is slidable or tiltable in any direction (at any angle in any direction such as the upward, the downward, the rightward, the leftward, or the diagonal direction) with respect to the front surface of the housing 60. The left analog stick 63A is provided to the left of the screen of the LCD 61, and the right analog stick 63B is provided to the right of the screen of the LCD 61. Therefore, the user is allowed to perform an input for designating a direction by using the analog stick 63A or 63B with either the left or right hand. Further, as shown in FIG. 4, the analog sticks 63A and 63B are positioned so as to be operated by the user holding the right and left portions of the terminal device 6. Therefore, the user is allowed to easily operate the analog sticks 63A and 63B when the user holds and moves the terminal device 6.

The operation buttons 64A to 64L are each operation means for performing a predetermined input. As described below, the operation buttons 64A to 64L are positioned so as to be operated by the user holding the right and left portions of the terminal device 6 (see FIG. 4). Accordingly, the user is allowed to easily operate the operation means when the user holds and moves the terminal device 6.

As shown in (a) of FIG. 3, among the operation buttons 64A to 64L, the cross button (direction input button) 64A and the operation buttons 64B to 64H are provided on the front surface of the housing 60. The operation buttons 64A to 64H are positioned so as to be operated by a thumb of the user (see FIG. 4).

The cross button 64A is provided to the left of the LCD 61 and beneath the left analog stick 63A. That is, the cross button 64A is positioned so as to be operated by the left hand of the user. The cross button 64A is cross-shaped, and is capable of indicating an upward, a downward, a leftward, or a rightward direction. The operation buttons 64B to 64D are provided beneath the LCD 61. The three operation buttons 64B to 64D are positioned so as to be operated by the right and left hands of the user. The four operation buttons 64E to 64H are provided to the right of the LCD 61 and beneath the right analog stick 63B. That is, the four operation buttons 64E to 64H are positioned so as to be operated by the right hand of the user. Further, the four operation buttons 64E, 64H, 64F, and 64G are positioned upward, downward, leftward, and rightward, respectively, with respect to a center position of the four operation buttons. Accordingly, the terminal device 6 may cause the four operation buttons 64E to 64H to function as buttons which allow the user to designate an upward, a downward, a leftward, or a rightward direction.

As shown in (a), (b), and (c) of FIG. 3, a first L button 64I and a first R button 64J are provided on diagonal upper portions (an upper left portion and an upper right portion) of the housing 60. Specifically, the first L button 64I is provided on the left end of the upper side surface of the plate-shaped housing 60 so as to protrude from the upper and left side surfaces. The first R button 64J is provided on the right end of the upper side surface of the housing 60 so as to protrude from the upper and right side surfaces. In this way, the first L button 64I is positioned so as to be operated by the index finger of the left hand of the user, and the first R button 64J is positioned so as to be operated by the index finger of the right hand of the user (see FIG. 4).

As shown in (b) and (c) of FIG. 3, leg parts 68A and 68B are provided so as to protrude from a rear surface (i.e., a surface reverse of the front surface on which the LCD 61 is provided) of the plate-shaped housing 60, and a second L button 64K and a second R button 64L are provided so as to protrude from the leg parts 68A and 68B, respectively. Specifically, the second L button 64K is provided at a slightly upper position on the left side (the left side as viewed from the front surface side) of the rear surface of the housing 60, and the second R button 64L is provided at a slightly upper position on the right side (the right side as viewed from the front-surface side) of the rear surface of the housing 60. In other words, the second L button 64K is provided at a position substantially opposite to the left analog stick 63A provided on the front surface, and the second R button 64L is provided at a position substantially opposite to the right analog stick 63B provided on the front surface. The second L button 64K is positioned so as to be operated by the middle finger of the left hand of the user, and the second R button 64L is positioned so as to be operated by the middle finger of the right hand of the user (see FIG. 4). Further, as shown in (c) of FIG. 3, the leg parts 68A and 68B each have a surface facing obliquely upward, and the second L button 64K and the second R button 64L are provided on the oblique surfaces of the leg parts 68A and 68B, respectively. Thus, the second L button 64K and the second R button 64L have button surfaces facing obliquely upward. Since it is supposed that the middle finger of the user moves vertically when the user holds the terminal device 6, the upward facing button surfaces allow the user to easily press the second L button 64K and the second R button 64L. Further, the leg parts 68A and 68B provided on the rear surface of the housing 60 allow the user to easily hold the housing 60. Moreover, the operation buttons provided on the leg parts 68A and 68B allow the user to easily perform operation while holding the housing 60.

In the terminal device 6 shown in FIG. 3, the second L button 64K and the second R button 64L are provided on the rear surface of the housing 60. Therefore, if the terminal device 6 is placed with the screen of the LCD 61 (the front surface of the housing 60) facing upward, the screen of the LCD 61 may not be perfectly horizontal. Accordingly, in another embodiment, three or more leg parts may be provided on the rear surface of the housing 60. In this case, if the terminal device 6 is placed on a floor with the screen of the LCD 61 facing upward, the three or more leg parts contact the floor. Thus, the terminal device 6 can be placed with the screen of the LCD 61 being horizontal. Such a horizontal placement of the terminal device 6 may be achieved by providing detachable leg parts on the rear surface of the housing 60.

The respective operation buttons 64A to 64L are assigned functions, according to need, in accordance with a game program. For example, the cross button 64A may be used for direction designation operation, selection operation, and the like, and the operation buttons 64E to 64H may be used for determination operation, cancellation operation, and the like.

The terminal device 6 includes a power button (not shown) for turning on/off the power of the terminal device 6. The terminal device 6 may include an operation button for turning on/off screen display of the LCD 61, an operation button for performing connection setting (pairing) with the game apparatus body 5, and an operation button for adjusting the volume of loudspeakers (loudspeakers 607 shown in FIG. 5).

As shown in (a) of FIG. 3, the terminal device 6 includes a marker section (a marker section 65 shown in FIG. 5) including a marker 65A and a marker 65B, on the front surface of the housing 60. For example, the marker section 65 is provided above the LCD 61. The markers 65A and 65B are each constituted by one or more infrared LEDs, like the markers 8L and 8R of the marker 8. The marker section 65 is used, like the marker 8, for causing the game apparatus body 5 to calculate a movement or the like of the controller 7 with respect to the marker section 65. The game apparatus body 5 is capable of controlling the infrared LEDs of the marker section 65 to be on or off.

The terminal device 6 includes a camera 66 as imaging means. The camera 66 includes an image pickup element (e.g., a CCD image sensor or a CMOS image sensor) having a predetermined resolution, and a lens. For example, the camera 66 is provided on the front surface of the housing 60. Accordingly, the camera 66 is capable of taking an image of the face of the user holding the terminal device 6. For example, the camera 66 is capable of taking an image of the user playing a game while viewing the LCD 61.

The terminal device 6 has a microphone (a microphone 609 shown in FIG. 5) as sound input means. A microphone hole 60b is provided in the front surface of the housing 60. The microphone 609 is embedded in the housing 60 at a position inside the microphone hole 60b. The microphone 609 detects for a sound, such as user's voice, around the terminal device 6.

The terminal device 6 has loudspeakers (loudspeakers 607 shown in FIG. 5) as sound output means. As shown in (d) of FIG. 3, speaker holes 60a are provided in the lower side surface of the housing 60. A sound is output through the speaker holes 60a from the loudspeakers 607. In the exemplary embodiment, the terminal device 6 has two loudspeakers, and the speaker holes 60a are provided at positions corresponding to a left loudspeaker and a right loudspeaker, respectively.

The terminal device 6 includes an extension connector 67 for connecting another device to the terminal device 6. In the exemplary embodiment, as shown in (d) of FIG. 3, the extension connector 67 is provided in the lower side surface of the housing 60. Any device may be connected to the extension connection 67. For example, a controller (a gun-shaped controller or the like) used for a specific game or an input device such as a keyboard may be connected to the extension connector 67. If another device need not be connected, the extension connector 67 need not be provided.

In the terminal device 6 shown in FIG. 3, the shapes of the operation buttons and the housing 60, the number of the respective components, and the positions in which the components are provided are merely examples. The shapes, numbers, and positions may be different from those described above.

Next, an internal structure of the terminal device 6 will be described with reference to FIG. 5. FIG. 5 is a block diagram illustrating an example of an internal structure of the terminal device 6. As shown in FIG. 5, the terminal device 6 includes, in addition to the components shown in FIG. 3, a touch panel controller 601, a magnetic sensor 602, a gyro sensor 604, a user interface controller (UI controller) 605, a codec LSI 606, loudspeakers 607, a sound IC 608, a microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data input to various input/output sections and data output from various input/output sections. The UI controller 605 is connected to the touch panel controller 601, the analog stick 63 (the analog sticks 63A and 63B), the operation button 64 (the operation buttons 64A to 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to the respective components through the UI controller 605. The internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal device 6 can be supplied with power and charged from the external power supply by using the battery charger 616 or the cable. Charging of the terminal device 6 may be performed by setting the terminal device 6 on a cradle (not shown) having a charging function.

The touch panel controller 601 is a circuit which is connected to the touch panel 62 and controls the touch panel 62. The touch panel controller 601 generates a predetermined form of touch position data, based on a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions on the touch panel 62 are output from the UI controller 605 to the touch panel controller 601.

The analog stick 63 outputs, to the UI controller 605, stick data representing a direction in which the stick part operated by a finger of the user slides (or tilts), and an amount of the sliding (tilting). The operation button 64 outputs, to the UI controller 605, operation button data representing an input state of each of the operation buttons 64A to 64L (whether or not the operation button is pressed).

The magnetic sensor 602 detects the magnitude and direction of a magnetic field to detect an orientation. Orientation data representing the detected orientation is output to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a hall sensor, a GMR (Giant Magneto Resistance) sensor, a TMR (Tunneling Magneto Resistance) sensor, and an AMR (Anisotropic Magneto Resistance) sensor. However, any sensor may be adopted as long as the sensor can detect an orientation. Strictly speaking, the obtained orientation data does not represent an orientation in a place where a magnetic field is generated in addition to the geomagnetism. Even in such a case, it is possible to calculate a change in the attitude of the terminal device 6 because the orientation data changes when the terminal device 6 moves.

The acceleration sensor 603 is provided inside the housing 60. The acceleration sensor 603 detects the magnitudes of linear accelerations along three axial directions (x-axis, y-axis, and z-axis directions shown in (a) of FIG. 3), respectively. Specifically, in the acceleration sensor 603, the long side direction of the housing 60 is defined as the x-axial direction, the short side direction of the housing 60 is defined as the y-axial direction, and the direction orthogonal to the front surface of the housing 60 is defined as the z-axial direction, thereby detecting the magnitudes of the linear accelerations in the respective axial directions. Acceleration data representing the detected accelerations is output to the UI controller 605. The UI controller 605 outputs, to the acceleration sensor 603, a control instruction for the acceleration sensor 603. In the exemplary embodiment, the acceleration sensor 603 is, for example, an electrostatic capacitance type MEMS acceleration sensor. However, in another embodiment, another type of acceleration sensor may be used. Further, the acceleration sensor 603 may be an acceleration sensor for detecting the magnitude of acceleration in one axial direction or two axial directions.

The gyro sensor 604 is provided inside the housing 60. The gyro sensor 604 detects the angular velocities around the three axes (the above-described x, y, and z axes), respectively. Angular velocity data representing the detected angular velocities is output to the UI controller 605. The UI controller 605 outputs, to the gyro sensor 604, a control instruction for the gyro sensor 604. Any number and any combination of gyro sensors may be used as long as the angular velocities around three axes are detected. The gyro sensor 604 may be constituted by a two-axis gyro sensor and a one-axis gyro sensor, like the gyro sensor 703. Alternatively, the gyro sensor 604 may be a gyro sensor for detecting the angular velocity around one axis or two axes.

The vibrator 619 is, for example, a vibration motor or a solenoid. The vibrator 619 is connected to the UI controller 605. The terminal device 6 is vibrated by actuating the vibrator 619 in accordance with a control instruction outputted from the UI controller 605 to the vibrator 619. The vibration of the terminal device 6 is transmitted to the user's hand holding the terminal device 6. Thus, a so-called vibration-feedback game is realized.

The UI controller 605 outputs, to the codec LSI 606, the operation data including the touch position data, the stick data, the operation button data, the orientation data, the acceleration data, and the angular velocity data, which have been received from the respective components. If another device is connected to the terminal device 6 through the extension connector 67, data representing operation to the other device may be included in the operation data.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 includes a CPU 617 and an internal memory 618. Although the terminal device 6 is configured not to perform a game process, the terminal device 6 may execute a program for managing the terminal device 6 or a program for communication. For example, a program stored in the flash memory 613 is loaded into the internal memory 618 and executed by the CPU 617 when the terminal device 6 is powered on, thereby starting up the terminal device 6. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is connected to the loudspeakers 607 and the microphone 609. The sound IC 608 is a circuit for controlling input of sound data from the microphone 609 to the codec LSI 606 and output of sound data from the codec LSI 606 to the loudspeakers 607. Specifically, when the sound IC 608 receives sound data from the codec LSI 606, the sound IC 608 performs D/A conversion on the sound data, and outputs a resultant sound signal to the loudspeakers 607 to cause the loudspeakers 607 to output a sound. The microphone 609 detects sound (such as user's voice) propagated to the terminal device 6, and outputs a sound signal representing the sound to the sound IC 608. The sound IC 608 performs A/D conversion on the sound signal from the microphone 609, and outputs a predetermined form of sound data to the codec LSI 606.

The codec LSI 606 transmits the image data from the camera 66, the sound data from the microphone 609, and the operation data from the UI controller 605 (terminal operation data), to the game apparatus body 5 through the wireless module 610. In the exemplary embodiment, the codec LSI 606 subjects the image data and the sound data to a compression process similar to that performed by the codec LSI 27. The compressed image data and sound data, and the terminal operation data are output to the wireless module 610 as transmission data. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE802.11n standard. The data transmitted from the wireless module 610 may be encrypted according to need, or may not be encrypted As described above, the transmission data transmitted from the terminal device 6 to the game apparatus body 5 includes the operation data (terminal operation data), the image data, and the sound data. If another device is connected to the terminal device 6 through the extension connector 67, data received from the other device may be included in the transmission data. The infrared communication module 612 performs, with another device, infrared communication based on, for example, the IRDA standard. The codec LSI 606 may include, in the transmission data, data received by the infrared communication, and transmit the transmission data to the game apparatus body 5, according to need.

As described above, the compressed image data and sound data are transmitted from the game apparatus body 5 to the terminal device 6. These data are received by the codec LSI 606 through the antenna 611 and the wireless module 610. The codec LSI 606 decompresses the received image data and sound data. The decompressed image data is output to the LCD 61, and an image according to the image data is displayed on the LCD 61. On the other hand, the decompressed sound data is output to the sound IC 608, and a sound based on the sound data is output from the loudspeakers 607.

When control data is included in the data received from the game apparatus body 5, the codec LSI 606 and the UI controller 605 make control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal device 6. In the exemplary embodiment, the control instructions represented by the control data are considered to be instructions to start and halt (stop) the operations of the above-mentioned components. That is, some components which are not used for a game may be halted to reduce power consumption. In this case, data from the halted components are not included in the transmission data transmitted from the terminal device 6 to the game apparatus body 5. Since the marker section 65 is constituted by infrared LEDs, the marker section 65 is controlled by simply turning on/off the supply of power thereto.

As described above, the terminal device 6 includes the operation means such as the touch panel 62, the analog sticks 63, and the operation buttons 64. In another embodiment, however, the terminal device 6 may include other operation means instead of or in addition to these operation means.

The terminal device 6 includes the magnetic sensor 602, the acceleration sensor 603, and the gyro sensor 604 as sensors for calculating the movement (including the position and the attitude, or a change in the position or the attitude) of the terminal device 6. In another embodiment, however, the terminal device 6 may include one or two of these sensors. In still another embodiment, the terminal device 6 may include other sensors instead of or in addition to these sensors.

The terminal device 6 includes the camera 66 and the microphone 609. In another embodiment, however, the terminal device 6 may not include the camera 66 and the microphone 609, or may include either of the camera 66 and the microphone 609.

The terminal device 6 includes the marker section 65 as a component for calculating the positional relation between the terminal device 6 and the controller 7 (such as the position and/or the attitude of the terminal device 6 as viewed from the controller 7). In another embodiment, however, the terminal device 6 may not include the marker section 65. In still another embodiment, the terminal device 6 may include other means as a component for calculating the above-mentioned positional relation. For example, the controller 7 may include a marker section, and the terminal device 6 may include an image pickup element. In this case, the marker 8 may include an image pickup element instead of an infrared LED.

Figure 6:
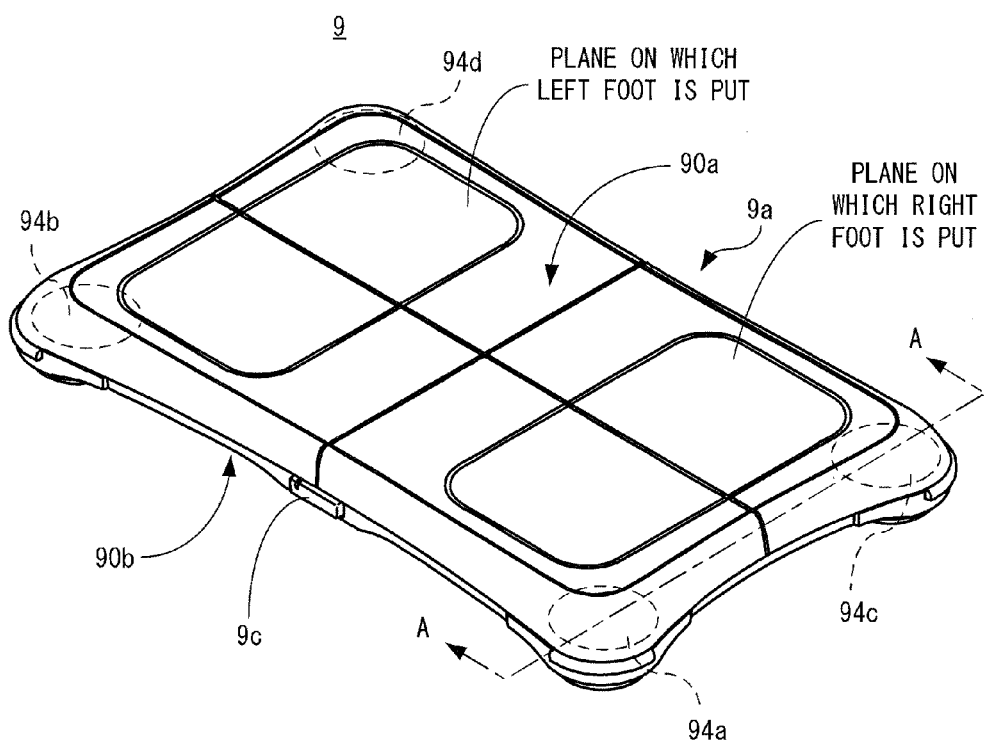
FIG. 6 is a perspective view illustrating a non-limiting example of a board type controller 9 shown in FIG. 1.
Figure 11:
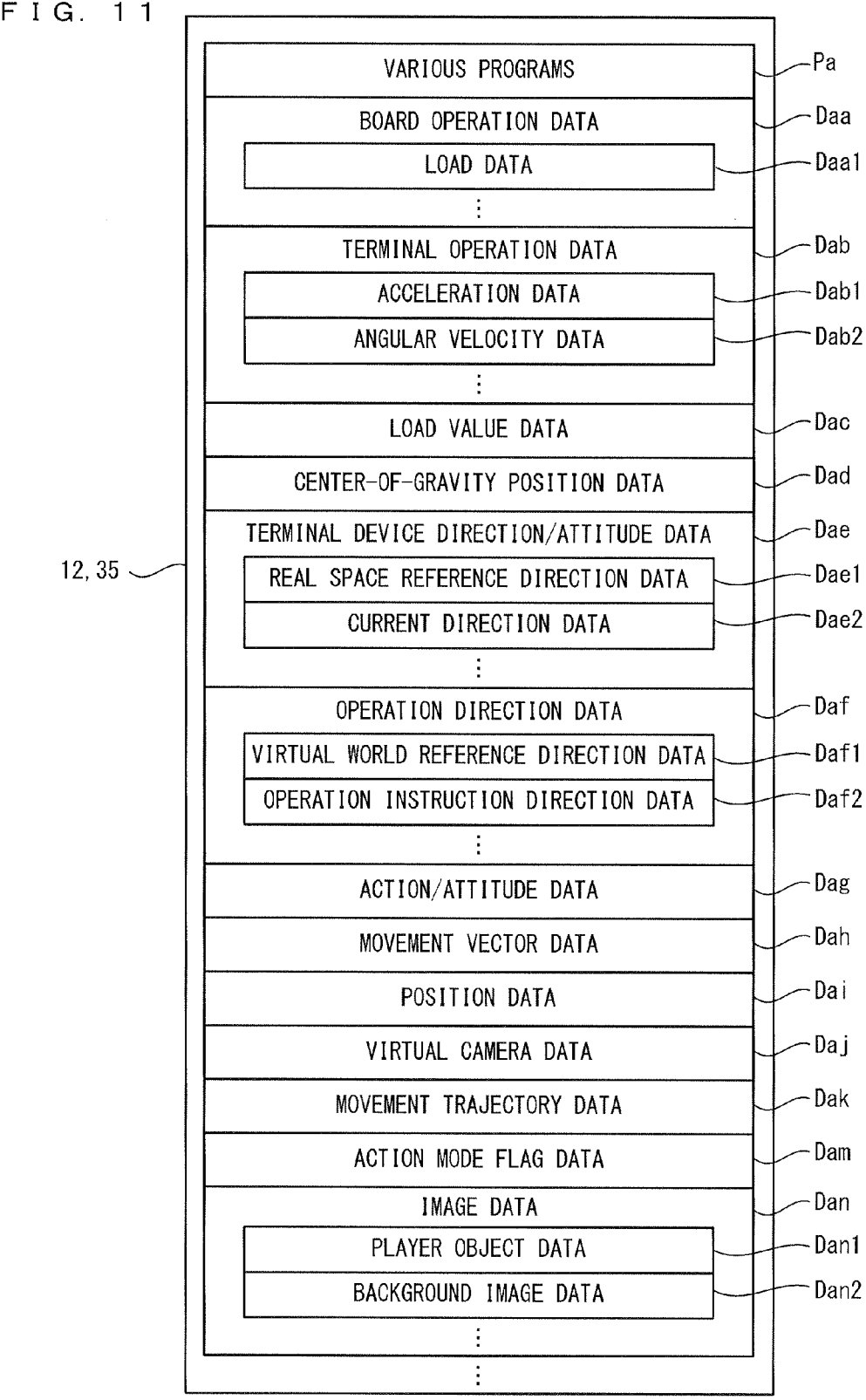
FIG. 11 is a diagram illustrating a non-limiting example of main data and programs stored in a main memory of the game apparatus body 5 shown in FIG. 1 in the first exemplary game.

Next, a structure of the board type controller 9 will be described with reference to FIGS. 6 to 8. FIG. 11 is a perspective view illustrating an example of an external appearance of the board type controller 9 shown in FIG. 1. As shown in FIG. 6, the board type controller 9 includes a platform 9a on which a user stands (on which the user puts his/her feet), and at least four load sensors 94a to 94d for detecting a load applied to the platform 9a. Each of the load sensors 94a to 94d is embedded in the platform 9a (see FIG. 7), and the positions where the load sensors 94a to 94d are provided are indicated by dotted lines in FIG. 6. In the following description, the four load sensors 94a to 94d may be collectively referred to as a load sensor 94.

The platform 9a is formed in the shape of substantially a rectangular parallelepiped, and is in the shape of substantially a rectangle as viewed from the top. For example, the short side of the rectangular shape of the platform 9a is approximately 30 cm, and the long side thereof is approximately 50 cm. The upper surface of the platform 9a is flat, and has a pair of planes on which the user stands with the bottoms of his/her feet contacting thereto. Specifically, the upper surface of the platform 9a has a plane (a back-left region enclosed with a double line in FIG. 6) on which the user's left foot is put, and a plane (a front-right region enclosed with a double line in FIG. 6) on which the user's right foot is put. The platform 9a has, at four corners thereof, side surfaces each partially projecting outward in a cylindrical shape.

In the platform 9a, the four load sensors 94a to 94d are arranged at predetermined intervals. In the exemplary embodiment, the four load sensors 94a to 94d are arranged on the periphery of the platform 9a, more specifically, at the four corners of the platform 9a, respectively. The intervals of the load sensors 94a to 94d are appropriately set such that the load sensors 94a to 94d can accurately detect the intention of a game operation which is expressed by a manner of applying a load onto the platform 9a by the user.

Figure 7:
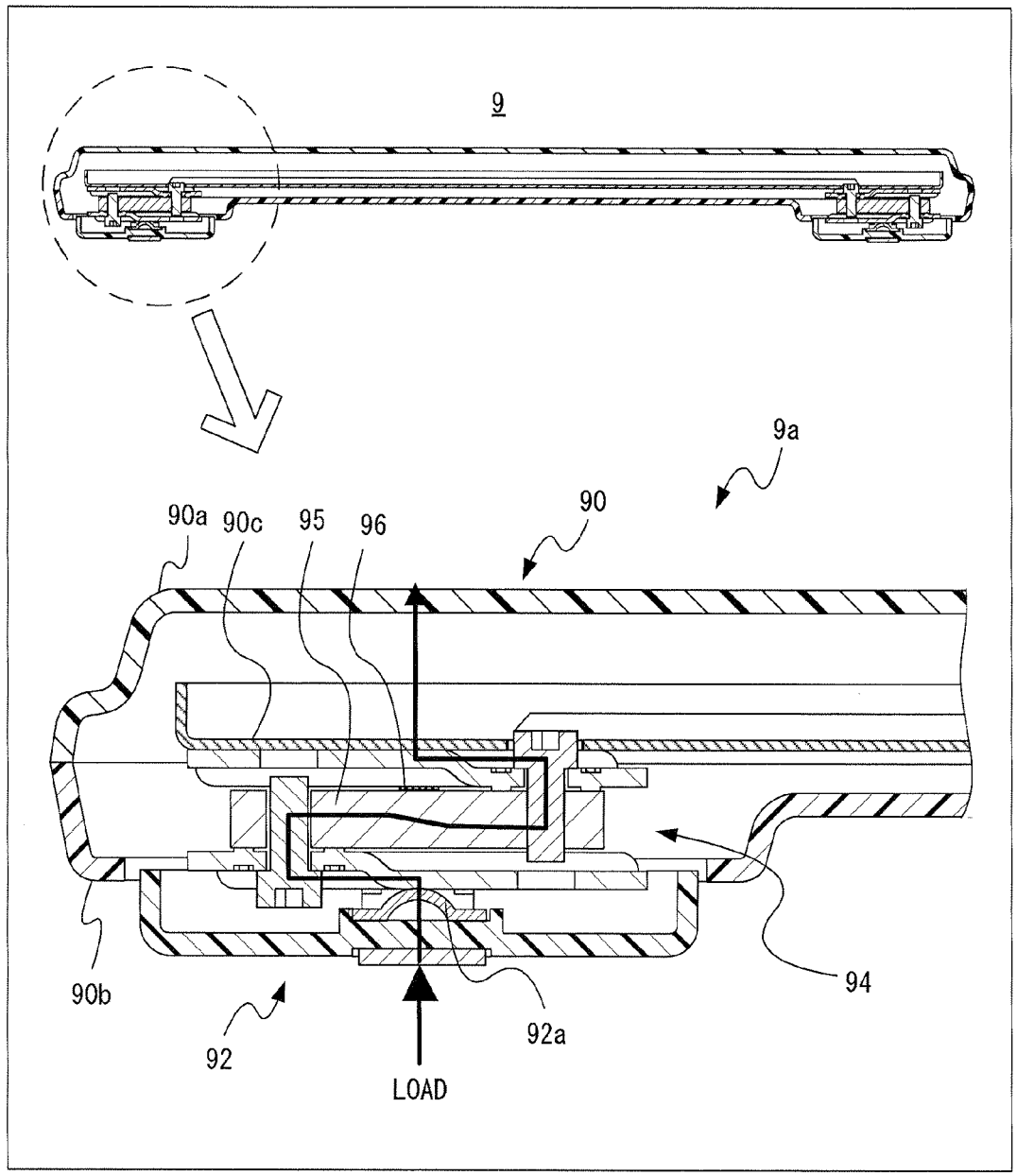
FIG. 7 is a diagram illustrating a non-limiting example of a cross-sectional view of the board type controller 9 taken along a line A-A in FIG. 6, and a non-limiting example of an enlarged view of a corner portion in which a load sensor 94 is provided.

FIG. 7 shows an example of a cross-sectional view of the board type controller 9, taken along a line A-A in FIG. 6, and an example of an enlarged view of a corner part where a load sensor 94 is arranged. In FIG. 7, the platform 9a includes a support plate 90 on which the user stands, and legs 92. The load sensors 94a to 94d are provided in positions where the legs 92 are provided. In the exemplary embodiment, since the four legs 92 are provided at the four corners, the four load sensors 94a to 94d are also provided at the corresponding four corners. Each leg 92 is formed by plastic molding in the shape of substantially a cylinder with a base. Each load sensor 94 is located on a spherical part 92a provided on the base of the corresponding leg 92. The support plate 90 is supported by the legs 92 via the load sensors 94.

The support plate 90 includes an upper plate 90a forming an upper surface and an upper side surface portion, a lower plate 90b forming a lower surface and a lower side surface portion, and an intermediate plate 90c provided between the upper plate 90a and the lower plate 90b. The upper plate 90a and the lower plate 90b are formed by, for example, plastic molding, and are integrated using an adhesive or the like. The intermediate plate 90c is, for example, formed of a single metal plate by press forming. The intermediate plate 90c is fixed onto the four load sensors 94a to 94d. The upper plate 90a has, on a lower surface thereof, a grid-patterned rib (not shown), and is supported by the intermediate plate 90c via the rib. Therefore, when the user stands on the platform 9a, the load is transferred to the four legs 92 via the support plate 90 and the load sensors 94a to 94d. As indicated by arrows in FIG. 7, a reaction from a floor, which is generated by the input load, is transferred from the legs 92 through the spherical parts 92a, the load sensors 94a to 94d and the intermediate plate 90c to the upper plate 90a.

Each load sensor 94 is, for example, a strain gauge (strain sensor) load cell, which is a load converter for converting an input load to an electrical signal. In the load sensor 94, a strain-generating body 95 is deformed according to an input load, resulting in a strain. The strain is converted into a change of electrical resistance and then converted into a change of voltage by a strain sensor 96 attached to the strain-generating body 95. Therefore, the load sensor 94 outputs, from an output terminal thereof, a voltage signal indicating the input load.

The load sensor 94 may be of other types, such as a tuning fork type, a string vibration type, an electrostatic capacitance type, a piezoelectric type, a magnetostrictive type, and a gyroscopic type.

Referring back to FIG. 6, the board type controller 9 further includes a power button 9c. When the power button 9c is operated (e.g., when the power button 9c is pressed) in the state where the board type controller 9 is not activated, power is supplied to each of circuit components (see FIG. 8) of the board type controller 9. However, there are cases in which the board type controller 9 is powered on in accordance with an instruction from the game apparatus body 5 and thereby supply of power to the circuit components is started. The board type controller 9 may be automatically powered off when a state where the user does not stand thereon continues for a predetermined period of time (e.g., 30 sec) or more. Further, when the power button 9c is again operated in the state where the board type controller 9 is in the active state, the board type controller 9 may be powered off to stop supply of power to the circuit components.

Figure 8:
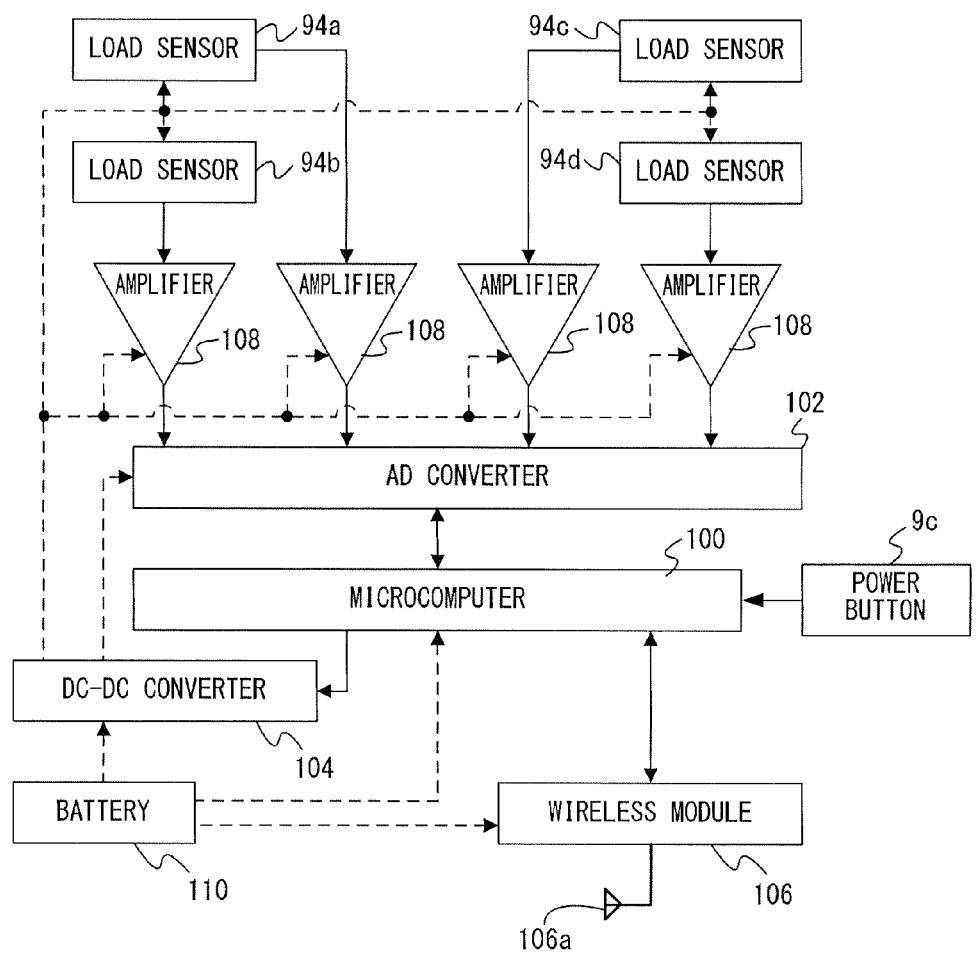
FIG. 8 is a block diagram illustrating a non-limiting example of an electric configuration of the board type controller 9 shown in FIG. 6.

FIG. 8 is a block diagram illustrating an example of an electrical configuration of the board type controller 9. In FIG. 8, flows of signals and data are indicated by solid arrows, and supply of power is indicated by dotted arrows.

As shown in FIG. 8, the board type controller 9 includes a microcomputer 100 for controlling the operation thereof. The microcomputer 100 includes a CPU, a ROM, a RAM, and the like, which are not shown. The CPU controls the operation of the board type controller 9 in accordance with a program stored in the ROM.

The power button 9c, an AD converter 102, a DC-DC converter 104, and a wireless module 106 are connected to the microcomputer 100. An antenna 106a is connected to the wireless module 106. The four load sensors 94a to 94b are connected to the AD converter 102 via amplifiers 108, respectively.

Further, the board type controller 9 includes a battery 110 for supplying power to the circuit components. In another embodiment, an AC adapter may be connected to the board type controller 9 instead of the battery 110 so that commercial power is supplied to the circuit components. In this case, instead of the DC-DC converter 104, a power circuit, which converts alternating current into direct current and lowers and rectifies a direct-current voltage, may be provided in the board type controller 9. In the exemplary embodiment, power is supplied directly from the battery 110 to the microcomputer 100 and the wireless module 106. In other words, power is constantly supplied from the battery 110 to the wireless module 106 and some components (such as the CPU) in the microcomputer 100 to detect whether or not the power button 9c is turned on and whether or not a command that instructs power-on is transmitted from the game apparatus body 5. On the other hand, power is supplied from the battery 110 through the DC-DC converter 104 to the load sensors 94a to 94d, the AD converter 102, and the amplifiers 108. The DC-DC converter 104 converts a voltage value of direct current supplied from the battery 110 into a different voltage value, and supplies the resultant direct current to the load sensors 94a to 94d, the AD converter 102, and the amplifiers 108.

Supply of power to the load sensors 94a to 94d, the A/D converter 102 and the amplifiers 108 may be performed according to need by the microcomputer 100 that controls the DC-DC converter 104. Specifically, when the microcomputer 100 determines that it is necessary to operate the load sensors 94a to 94d to detect a load, the microcomputer 100 may control the DC-DC converter 104 to supply power to the load sensors 94a to 94d, the A/D converter 102 and the amplifiers 108.

When power is supplied to the load sensors 94a to 94d, the load sensors 94a to 94d each output a signal indicating a load inputted thereto. These signals are amplified by the respective amplifiers 108, and converted from analog signals into digital data by the A/D converter 102. The digital data is input to the microcomputer 100. The detected values of the load sensors 94a to 94d are given identification information of the load sensors 94a to 94d, so that the load sensors 94a to 94d can be identified from the corresponding detected values. Thus, the microcomputer 100 can obtain the data representing the detected load values of the four load sensors 94a to 94d at the same time.

On the other hand, when the microcomputer 100 determines that it is not necessary to operate the load sensors 94a to 94d, i.e., when it is not the time for load detection, the microcomputer 100 controls the DC-DC converter 104 to stop supply of power to the load sensors 94a to 94d, the A/D converter 102, and the amplifiers 108. Thus, the board type controller 9 can operate the load sensors 94a to 94d to detect a load or a distance only when it is required, resulting in a reduction in power consumption for load detection.

Load detection is typically required when the game apparatus body 5 (FIG. 1) needs to obtain load data. For example, when game apparatus body 5 requires load information, the game apparatus body 5 transmits an information acquisition command to the board type controller 9. When the microcomputer 100 receives the information acquisition command from the game apparatus body 5, the microcomputer 100 controls the DC-DC converter 104 to supply power to the load sensors 94a to 94d and the like, thereby detecting a load. On the other hand, when the microcomputer 100 does not receive a load acquisition command from the game apparatus body 5, the microcomputer 100 controls the DC-DC converter 104 to stop supply of power to the load sensors 94a to 94d and the like.

The microcomputer 100 may control the DC-DC converter 104 based on a determination that load detection timing occurs at predetermined intervals. When such periodic load detection is performed, information regarding the constant time period may be supplied and stored from the game apparatus body 5 to the microcomputer 100 of the board type controller 9 when the game is started, or it may be preinstalled in the microcomputer 100.

The data representing the detected values from the load sensors 94a to 94d are transmitted as board operation data (input data) for the board type controller 9 from the microcomputer 100 via the radio module 106 and an antenna 106b to the game apparatus body 5. For example, when the microcomputer 100 has performed load detection according to a command from the game apparatus body 5, the microcomputer 100 transmits the detected value data of the load sensors 94a to 94d to the game apparatus body 5 on receipt of the detected value data from the A/D converter 102. The microcomputer 100 may transmit the detected value data to the game apparatus body 5 at predetermined intervals. If the interval of the data transmission is longer than the interval of the load detection, data containing load values which have been detected at a plurality of detection timings up to the next transmission timing may be transmitted.

The wireless module 106 is set so as to perform communication according to the same wireless standard (the Bluetooth, wireless LAN, and the like) as that for the controller communication module 19 of the game apparatus body 5. Accordingly, the CPU 10 of the game apparatus body 5 is allowed to transmit an information acquisition command to the board type controller 9 through the controller communication module 19 and the like. Thus, the board type controller 9 is allowed to receive the command from the game apparatus body 5 through the wireless module 106 and the antenna 106a. Further, the board type controller 9 is allowed to transmit the board operation data including the load detection values (or load calculation values) of the load sensors 94a to 94d to the game apparatus body 5.

For example, in a game which is executed based on a simple sum of four load values detected by the four load sensors 94a to 94d, the user is allowed to stand at any position with respect to the four load sensors 94a to 94d of the board type controller 9. That is, the user is allowed to stand on the platform 9a at any position and in any direction to play a game. In some kinds of games, however, the direction of a load value detected by each of the four load sensors 94 viewed from the user needs to be identified. That is, a positional relation between the four load sensors 94 of the board type controller 9 and the user needs to be recognized. In this case, for example, the positional relation between the four load sensors 94 and the user may be previously defined, and the user may be supposed to stand on the platform 9a in a manner which allows the predetermined positional relation. Typically, a positional relation in which two of the load sensors 94a to 94d are present in front of, behind, to the right of, and to the left of the user standing in the center of the platform 9a, i.e., a positional relation in which the user stands in the center of the platform 9a of the board type controller 9, is defined. In this case, the platform 9a of the board type controller 9 is rectangular in shape as viewed from the top, and the power button 9c is provided at one side (long side) of the rectangle. Therefore, it is previously ruled that the user, using the power button 9c as a guide, stands on the platform 9a such that the long side at which the power button 9c is provided is located in a predetermined direction (front, rear, left or right). In this case, each of the load values detected by the load sensors 94a to 94d is a load value of a predetermined direction (front right, front left, rear right, or rear left) as viewed from the user. Therefore, the board type controller 9 and the game apparatus body 5 can find out a direction to which each detected load value corresponds as viewed from the user, based on the identification information of the load sensors 94 contained in the detected load value data and arrangement data representing previously set (stored) positions or directions of the load sensors 94 with respect to the user. As a result, it is possible to recognize what is intended by a game operation performed by the user, such as an operation direction of forward, backward, rightward or leftward, or which foot of the user is lifted.

Figure 9:
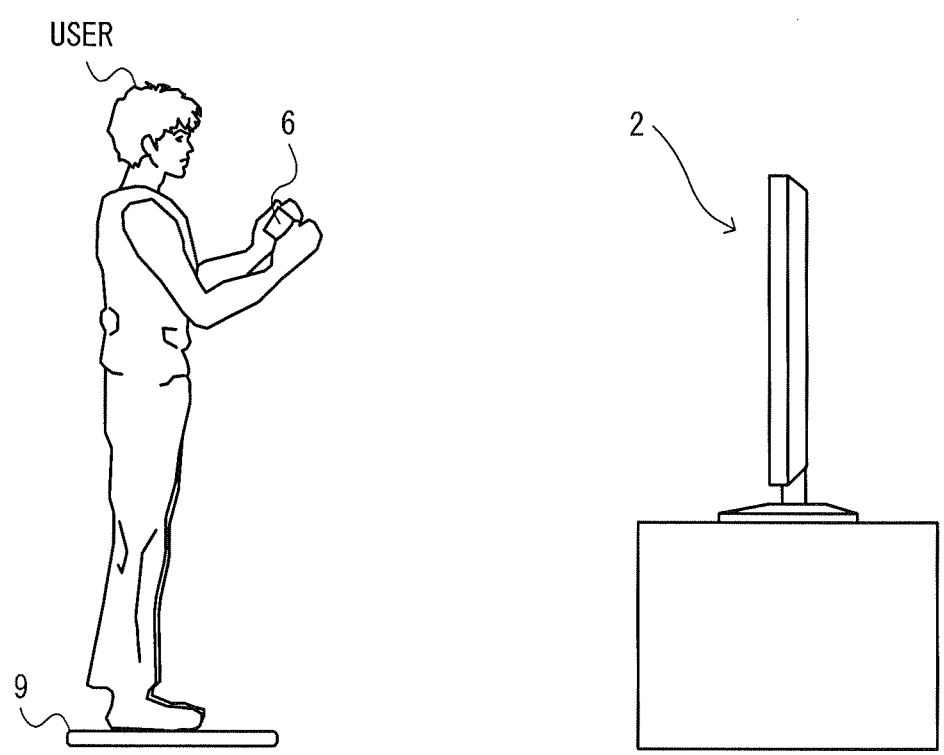
FIG. 9 is a diagram illustrating a non-limiting example of a user who performs an operation by using the terminal device 6 and the board type controller 9.
Figure 10A:
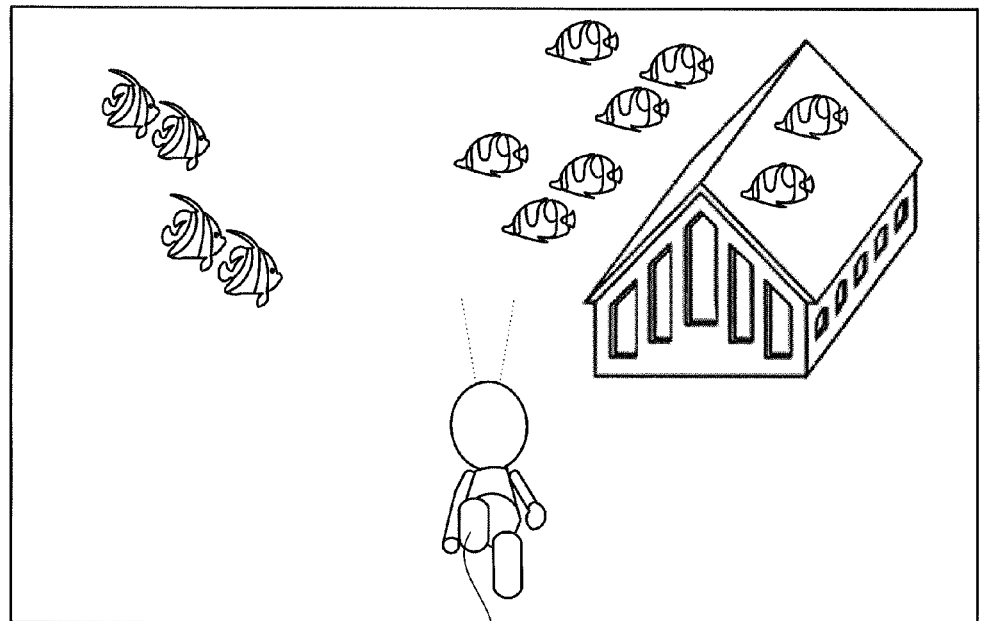
FIG. 10A is a diagram illustrating a non-limiting example of an image displayed on a LCD 61 of the terminal device 6 in a first exemplary game.
Figure 10B:
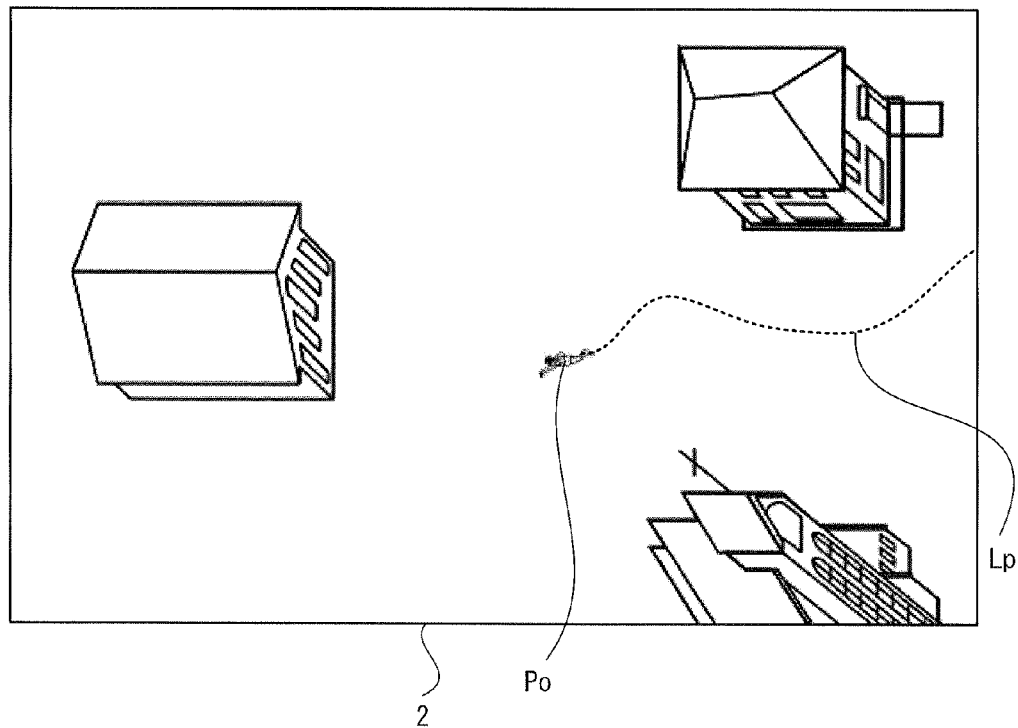
FIG. 10B is a diagram illustrating a non-limiting example of an image displayed on a monitor 2 in the first exemplary game.

Next, an outline of information processing performed on the game apparatus body 5 will be described with reference to FIGS. 9, 10A, and 10B before a specific description of processes performed by the game apparatus body 5 is given. In the following description of the outline of information processing, a first exemplary game is used as an example of information processing. FIG. 9 is a diagram illustrating an example of a user who plays the first exemplary game by using the terminal device 6 and the board type controller 9. FIG. 10A is a diagram illustrating an example of an image of the first exemplary game, which is displayed on the LCD 61 of the terminal device 6. FIG. 10B is a diagram illustrating an example of an image of the first exemplary game, which is displayed on the monitor 2.

As shown in FIG. 9, in the first exemplary game, the user performs an operation by using the terminal device 6 and the board type controller 9. Specifically, the user stands on the board type controller 9 with the terminal device 6 in his/her hands, and performs an operation. Then, the user performs an action (e.g., stepping or knee bending) on the board type controller 9 and simultaneously performs an operation to move the terminal device 6, while viewing the image displayed on the monitor 2 and the image displayed on the LCD 61 of the terminal device 6, thereby playing the game. On each of the LCD 61 of the terminal device 6 and the monitor 2, a game image is displayed, in which a player object Po performs an action (e.g., an action to change its attitude or an action to change its movement direction) in a virtual world in accordance with the direction and the attitude of the terminal device 6 held by the user as well as the user's action on the board type controller 9, and the position and the attitude of a virtual camera set in the virtual world are changed in accordance with the position and the attitude of the player object Po.

As shown in FIG. 10A, on the LCD 61 of the terminal device 6, the player object Po moving in the virtual world is displayed. In the example shown in FIG. 10A, a virtual camera is located near the back of the player object Po swimming in the sea, and a state of the virtual world viewed from the virtual camera is displayed together with player object Po. Displaying, on the LCD 61, the virtual world viewed at close range from behind the player object Po allows the user holding the terminal device 6 to experience a sense of presence in the virtual world, and allows the user to intuitively know the movement direction and the movement speed of the player object Po. Further, the attitude and the movement direction of the player object Po are changed when the attitude of the terminal device 6 is changed or the terminal device 6 is rotated to change its direction, and the position and the attitude of the virtual camera are changed in accordance with the attitude change of the terminal device 6. For example, by associating the attitude and the direction of the terminal device 6 with the attitude and the direction of the virtual camera, the user is allowed to experience a sense of looking into the virtual world through the LCD 61 of the terminal device 6.

Further, as shown in FIG. 10B, the same virtual world as that displayed on the LCD 61 is displayed on the monitor 2. In the example shown in FIG. 10B, a state of the virtual world in which the player object Po swimming in the sea is viewed from a distance in a manner of bird's eye viewing is displayed together with the player object Po. Further, in the example shown in FIG. 10B, a movement trajectory Lp of the player object Po in the sea is displayed in the virtual world. Displaying, on the monitor 2, the virtual world in which the player object Po is viewed from a distance in a manner of bird's eye viewing allows the user to easily know the surroundings of the player object Po, and allows another person who watches the user's playing the first exemplary game to enjoy a view in which the player object Po moves in the virtual world.

For example, when the user performs stepping on the board type controller 9, the player object Po swims in the sea with flutter kicks at a speed based on the user's stepping action. When the user performs knee bending on the board type controller 9, the player object Po swims in the sea with dolphin kicks at a speed based on the user's knee bending action. In this way, the user is allowed to change the swimming style or the movement speed of the player object Po in accordance with his/her action on the board type controller.

For example, as described above, detected load values based on the user's action on the board type controller 9 are output from the board type controller 9. Using the detected load values allows calculation of a total load applied to the board type controller 9, and a center-of-gravity position of the load applied to the board type controller 9. Further, using a change in the total load or a change in the center-of-gravity position allows estimation of the action of the user on the board type controller 9. Based on the estimated user's action on the board type controller 9, the swimming style and the movement speed of the player object Po are set.

Further, the attitude and the movement direction of the player object Po swimming in the sea change in accordance with the direction and the attitude of the terminal device 6 held by the user. For example, when the user turns the terminal device 6 to the upward, downward, leftward, or rightward direction, the attitude of the player object Po swimming in the sea (the direction to which the player object Po faces in the virtual world) changes in accordance with the direction change of the terminal device 6, and the direction in which the player object Po swims also changes. Specifically, when the user changes the direction of the terminal device 6 such that the back surface of the terminal device 6 faces upward, the attitude of the player object Po changes such that the player object Po faces the sea surface, and the swimming direction of the player object Po changes such that the player object Po swims upward to the sea surface. When the user changes the direction of the terminal device 6 such that the back surface of the terminal device 6 faces leftward, the attitude of the player object Po changes to the left as viewed from the player object Po, and the swimming direction of the player object Po changes to the left. In this way, the user is allowed to change the attitude and the movement direction of the player object Po in accordance with the direction and the attitude of the terminal device 6 held by the user. For example, by associating the attitude and the direction of the terminal device 6 with the attitude and the movement direction of the player object Po, the user is allowed to perform, by using the terminal device 6, a realistic operation as if he/she becomes the player object Po. Further, since the virtual camera is located near the back of the player object Po swimming in the sea, when the attitude and the movement direction of the player object Po change, the attitude and the position of the virtual camera also change. For example, by associating the attitude and the direction of the terminal device 6 with the attitude and the direction of the virtual camera, the user is allowed to experience a sense of looking into the virtual world through the LCD 61 of the terminal device 6.

For example, acceleration data or angular velocity data based on a change in the attitude of the terminal device 6 is output from the terminal device 6. Since the direction of the gravitational acceleration applied to the terminal device 6 can be calculated by using the acceleration represented by the acceleration data, it is possible to estimate the attitude of the terminal device 6 with respect to the vertical direction in the real space. Further, since the angular velocity and/or the dynamic acceleration applied to the terminal device 6 are known by using the angular velocity represented by the angular velocity data and/or the acceleration represented by the acceleration data, it is possible to estimate a change in the attitude (a change in the direction) of the terminal device from its initial attitude in the real space by using the angular velocity and/or the dynamic acceleration. Based on the estimated attitude change (direction change) of the terminal device, the attitude and the movement direction of the player object Po as well as the attitude and the position of the virtual camera are set.

Next, a process of the first embodiment, which is performed in the game system 1, will be described in detail. First, main data used in the process will be described with reference to FIG. 11. FIG. 11 is a diagram illustrating an example of main data and programs stored in the external main memory 12 and/or the internal main memory 35 (hereinafter, these two main memories are collectively referred to as a main memory) of the game apparatus body 5 of the first embodiment.

As shown in FIG. 11, in a data storage area of the main memory, board operation data Daa, terminal operation data Dab, load value data Dac, center-of-gravity position data Dad, terminal device direction/attitude data Dae, operation direction data Daf, action/attitude data Dag, movement vector data Dah, position data Dai, virtual camera data Daj, movement trajectory data Dak, action mode flag data Dam, image data Dan, and the like are stored. In addition to the data shown in FIG. 11, data required for a game process, such as image data of various objects displayed on the monitor 2 and the LCD 61, and sound data used for a game, are optionally stored in the main memory. In a program storage area of the main memory, various programs Pa constituting an information processing program of the first embodiment are stored.

As the board operation data Daa, a series of operation information (board operation data) transmitted as transmission data from the board type controller 9 is stored, and updated to the latest board operation data. For example, the board operation data Daa includes load data Daa1 and the like. The load data Daa1 is data representing load values detected by the load sensors 94a to 94d of the board type controller 9.

As the terminal operation data Dab, a series of operation information (terminal operation data) transmitted as transmission data from the terminal device 6 is stored, and updated to the latest terminal operation data. For example, the terminal operation data Dab includes acceleration data Dab1, angular velocity data Dab2, and the like. The acceleration data Dab1 is data representing an acceleration (an acceleration vector) detected by the acceleration sensor 603. For example, the acceleration data Dab1 represents a three-dimensional acceleration vector whose components are accelerations in the three-axis (x-axis, y-axis, and z-axis) directions shown in FIG. 3. In another embodiment, the acceleration data Dab1 may represent an acceleration in any one or more directions. The angular velocity data Dab2 is data representing an angular velocity detected by the gyro sensor 604. For example, the angular velocity data Dab2 represents angular velocities around the three axes (x-axis, y-axis, and z-axis) shown in FIG. 3. In another example, the angular velocity data Dab2 may represent an angular velocity around any one or more axes.

The game apparatus body 5 sequentially receives the data (e.g., the data representing the detected load value, the acceleration, and the angular velocity) included in the operation information transmitted from the controller 7, the board type controller 9, and the terminal device 6 at predetermined intervals (e.g., at intervals of 1/200 sec.). For example, the received data is successively stored in the main memory by the I/O processor 31. In a process flow described later, the CPU 10 reads, every frame period (e.g., 1/60 sec.), the latest board operation data and the latest terminal operation data from the main memory, to update the board operation data Daa and the terminal operation data Dab, respectively.

The operation information transmitted at predetermined intervals from the controller 7, the board type controller 9, and the terminal device 6 may be temporarily stored in the buffer (not shown) included in the controller communication module 19 or the terminal communication module 28. In this case, the data stored in the buffer is read every frame period, and thus the board operation data Daa (e.g., the load data Daa1) or the terminal operation data Dab (e.g., the acceleration data Dab1 and the angular velocity data Dab2) in the main memory is updated to be used. At this time, since the cycle of receiving the operation information is different from the processing cycle, a plurality of pieces of information received at a plurality of timings are stored in the buffer. The process is executed by using only the latest operation information among the plurality of pieces of operation information received at the plurality of timings.

The load value data Dac is an aggregate of data each representing a load value detected by the board type controller 9. For example, the load value data Dac is an aggregate of data each representing a sum of load values (total load value) detected by the load sensors 94a to 94d. Specifically, the load value data Dac is an array of data each representing the above-mentioned total load value within a predetermined period, which is calculated time-sequentially, and the data representing the total load value is time-sequentially stored in each element of the array.

The center-of-gravity position data Dad is an aggregate of data each representing a center-of-gravity position of a load applied to the board type controller 9. For example, the center-of-gravity position data Dad is an aggregate of data each representing a position of center of gravity which is calculated based on the load values detected by the respective load sensors 94a to 94d by using a predetermined numerical formula. Specifically, the center-of-gravity position data Dad is an array of data each representing the above-mentioned center-of-gravity position within a predetermined period, which is calculated time-sequentially, and the data representing the center-of-gravity position is time-sequentially stored in each element of the array.

The terminal device direction/attitude data Dae includes real space reference direction data Dae1, current direction data Dae2, and the like. The real space reference direction data Dae1 is data representing a reference direction (attitude; real space reference direction) of the terminal device 6 in the real space. The current direction data Dae2 is data representing a direction and an attitude (current direction) of the terminal device 6 at the current time in the real space. For example, a real space reference direction data Dae1 and a current direction data Dae2 are calculated based on the acceleration data Dab1 and the angular velocity data Dab2 included in the terminal operation data Dab. Methods for calculating a real space reference direction and a current direction will be described later.

The operation direction data Daf includes virtual world reference direction data Daf1, operation instruction direction data Daf2, and the like. The virtual world reference direction data Daf1 is data representing a reference direction set in the virtual world. The operation instruction direction data Daf2 is data representing an operation instruction direction which is currently instructed in the virtual world by the user. Methods for calculating a virtual world reference direction and an operation instruction direction will be described later.

The action/attitude data Dag is data representing an action and an attitude of the player object Po in the virtual world. The movement vector data Dah is data representing a movement speed and a movement direction of the player object Po in the virtual world. For example, the movement vector data Dah represents a movement vector in the virtual world. The position data Dai is data representing a position of the player object Po in the virtual world. The virtual camera data Daj is data relating to a virtual camera set in the virtual world. For example, the virtual camera data Daj includes data relating to a first virtual camera for generating a game image to be displayed on the LCD 61 of the terminal device 6, and data relating to a second virtual camera for generating a game image to be displayed on the monitor 2. The movement trajectory data Dak is data representing a trajectory along which the player object Po has moved in the virtual world.

The action mode flag data Dam is data representing an action mode flag which is set in accordance with an action (e.g., a swimming style) set on the player object Po. For example, when the user performs knee bending on the board type controller 9, the action of the player object Po is set to an action of swimming with dolphin kicks in the sea, and the action mode flag is turned on.

The image data Dan includes player object data Dan1, background image data Dan2, and the like. The player object data Dan1 is data for arranging the player object Po of the first exemplary game in the virtual world to generate a game image. The background image data Dan2 is data for arranging a background of the first exemplary game in the virtual world to generate a game image.

Figure 12:
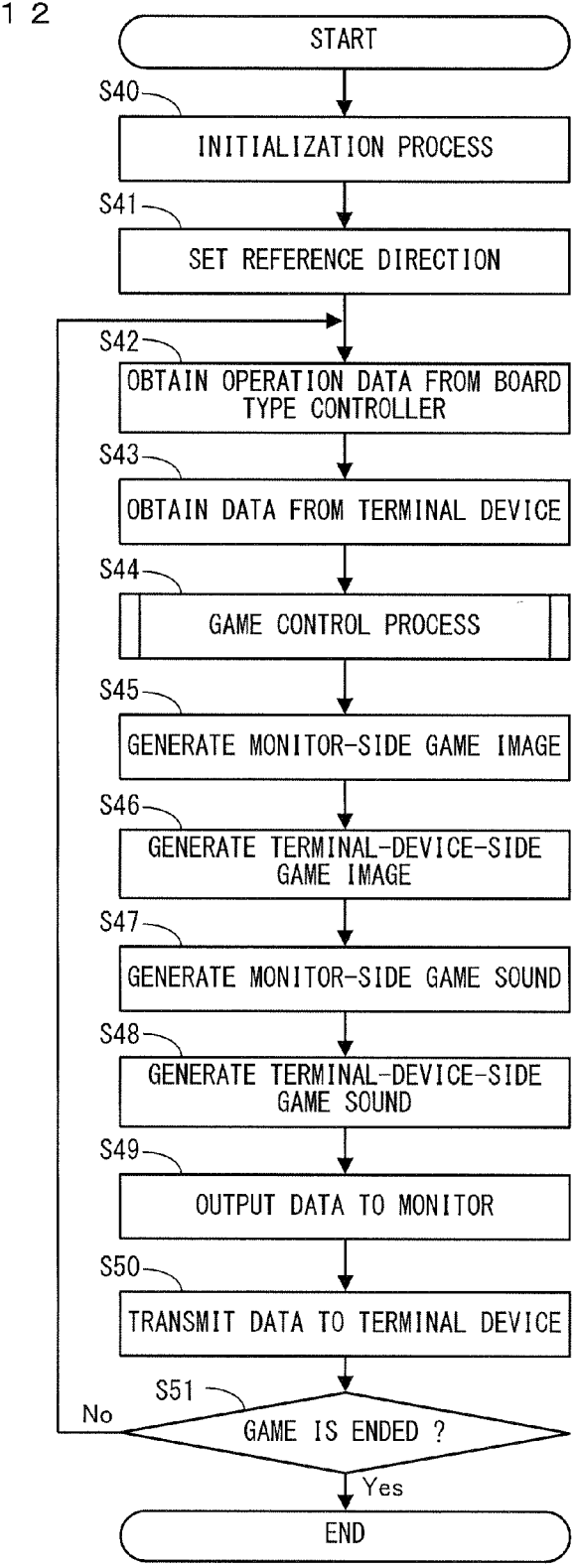
FIG. 12 is a flowchart illustrating a non-limiting example of a process executed by the game apparatus body 5 shown in FIG. 1.
Figure 13:
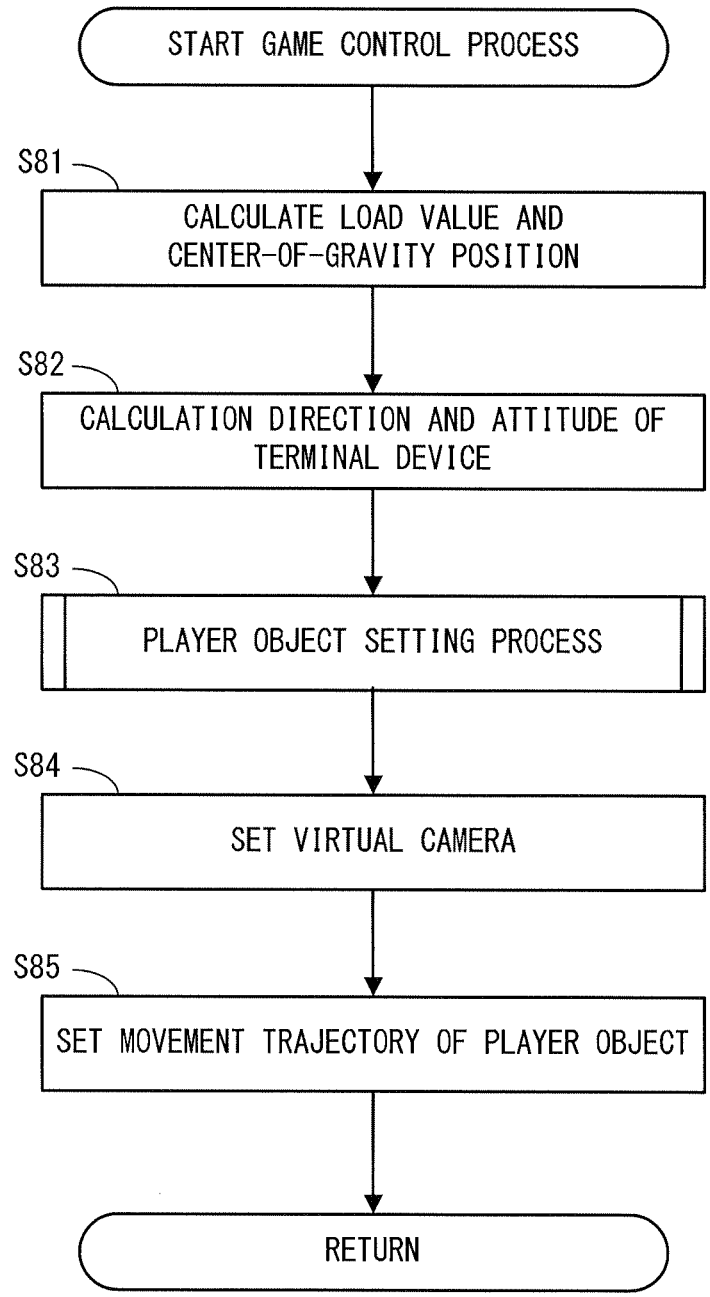
FIG. 13 is a sub-routine illustrating a non-limiting example of a game control process in step 44 in FIG. 12.
Figure 14:
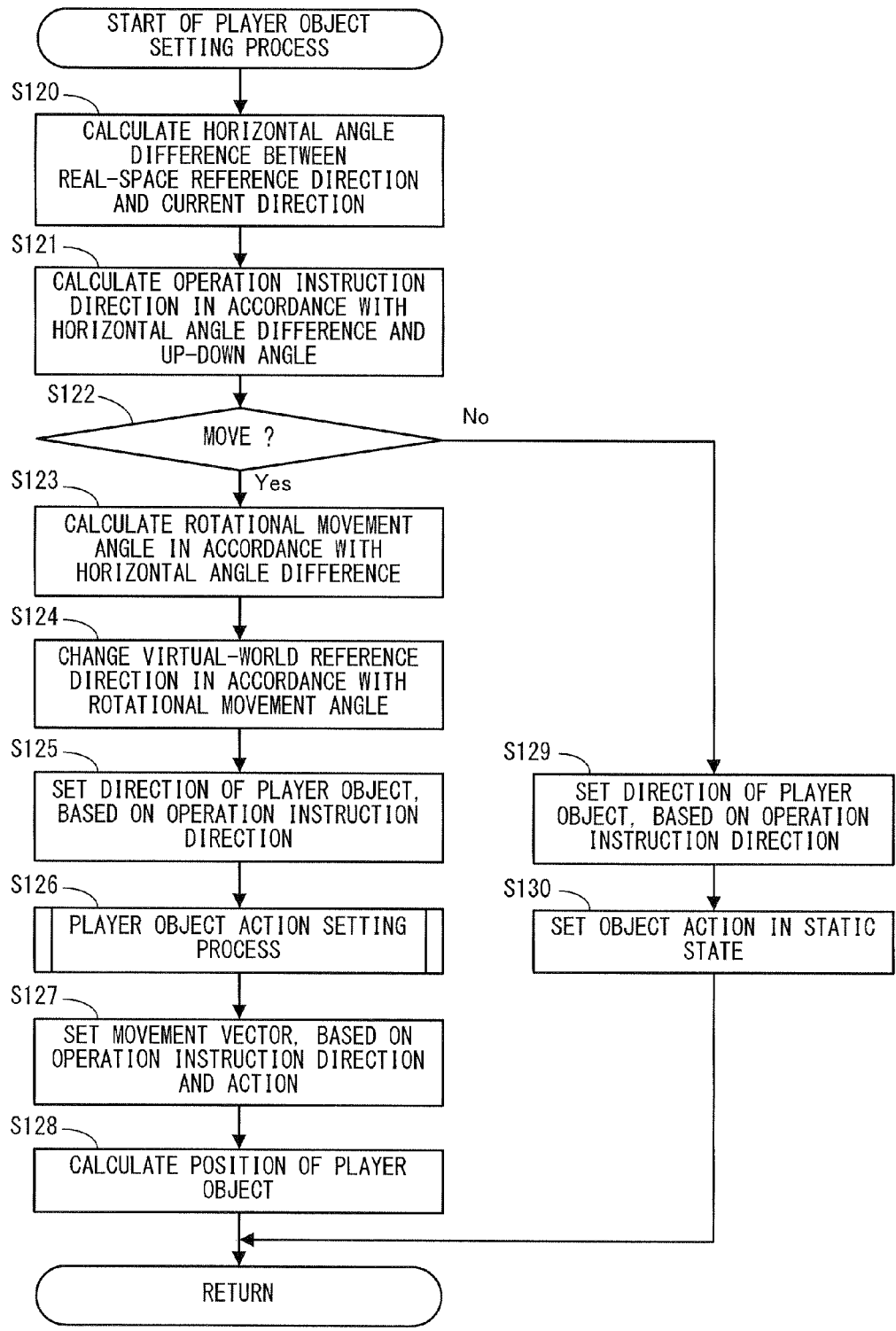
FIG. 14 is a sub-routine illustrating a non-limiting example of a player object setting process in step 83 in FIG. 13.
Figure 15:
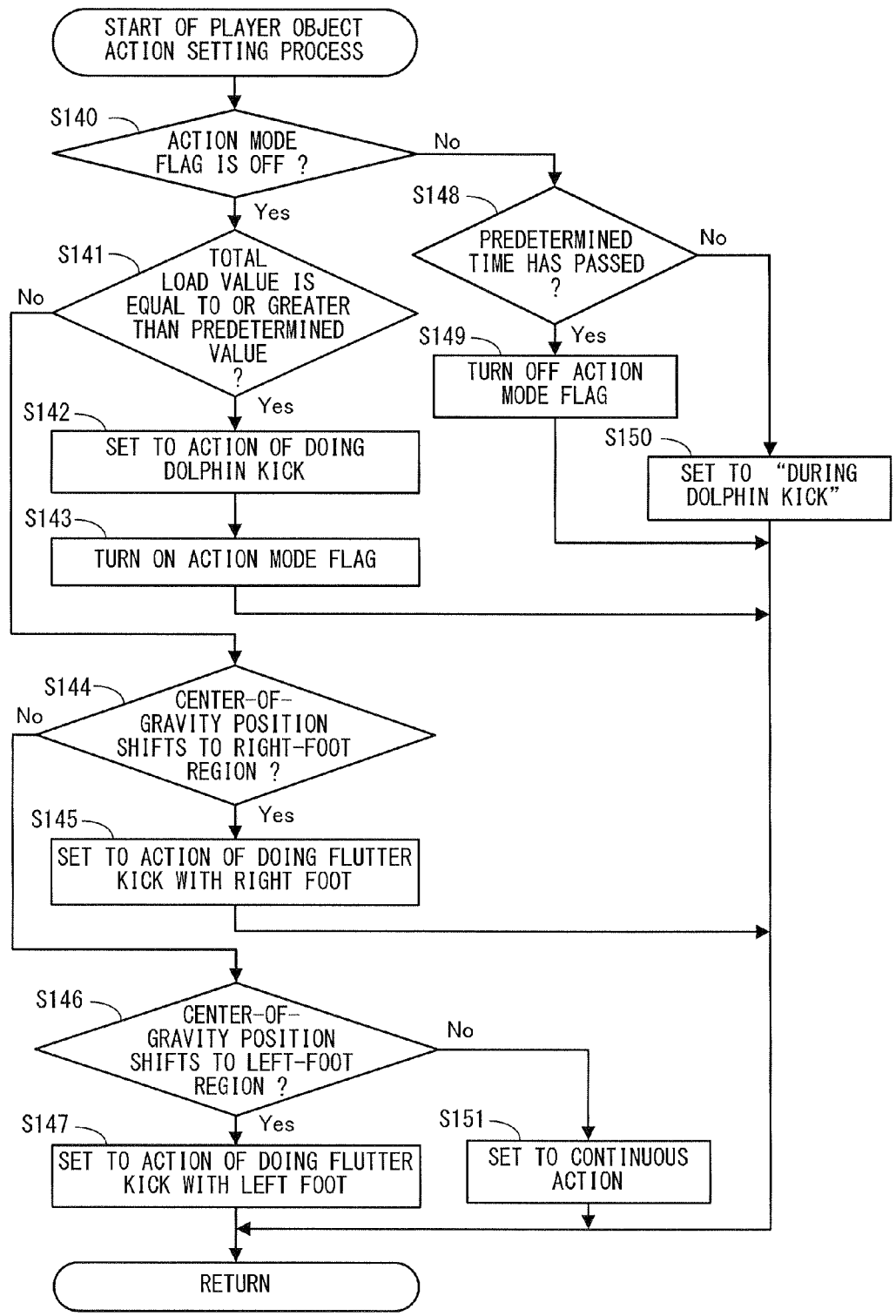
FIG. 15 is a sub-routine illustrating a non-limiting example of a player object action setting process in step 126 in FIG. 14.
Figure 16:
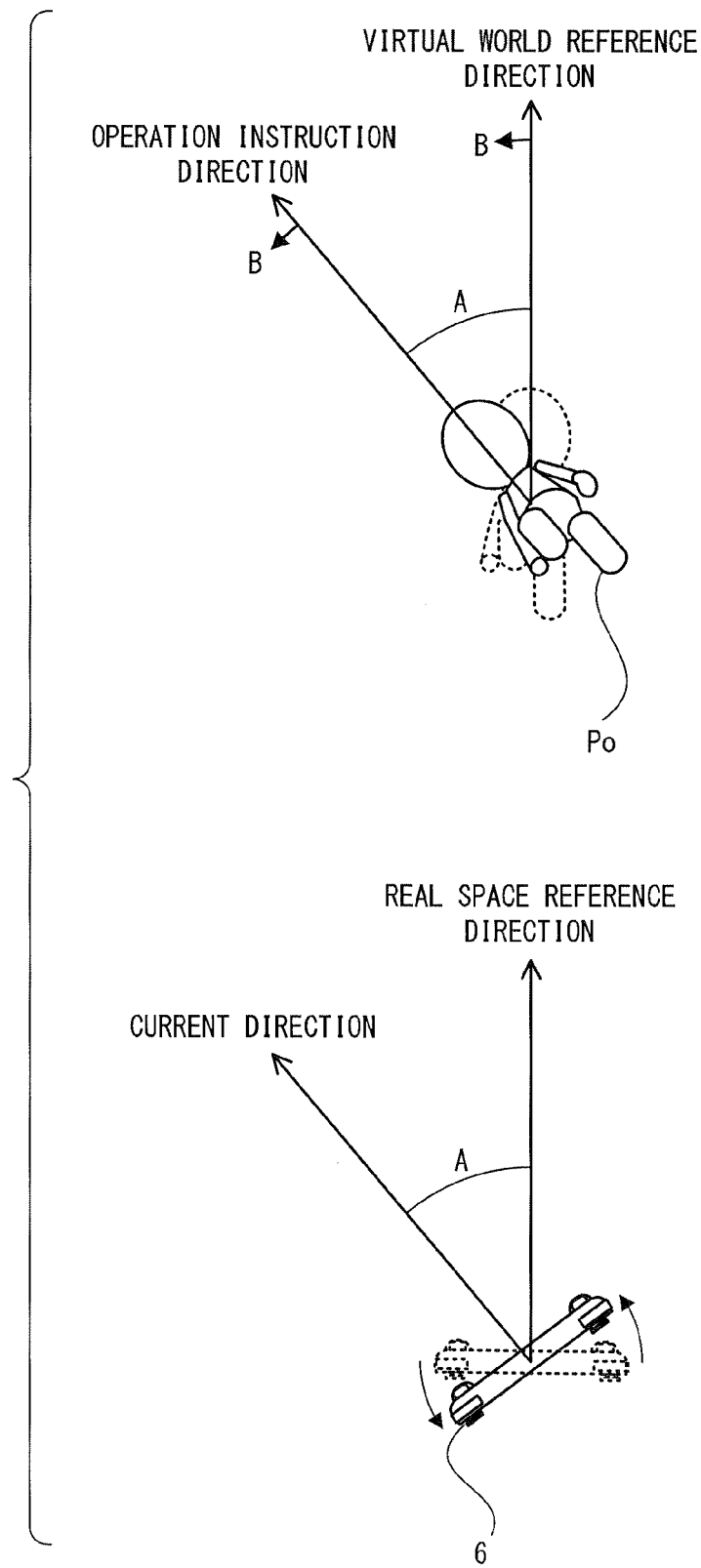
FIG. 16 is a diagram illustrating a non-limiting example of a relationship between a real space reference direction and a current direction which are projected on a horizontal plane in a real space, and a virtual world reference direction and an operation instruction direction which are projected on a horizontal plane in a virtual world.
Figure 17:
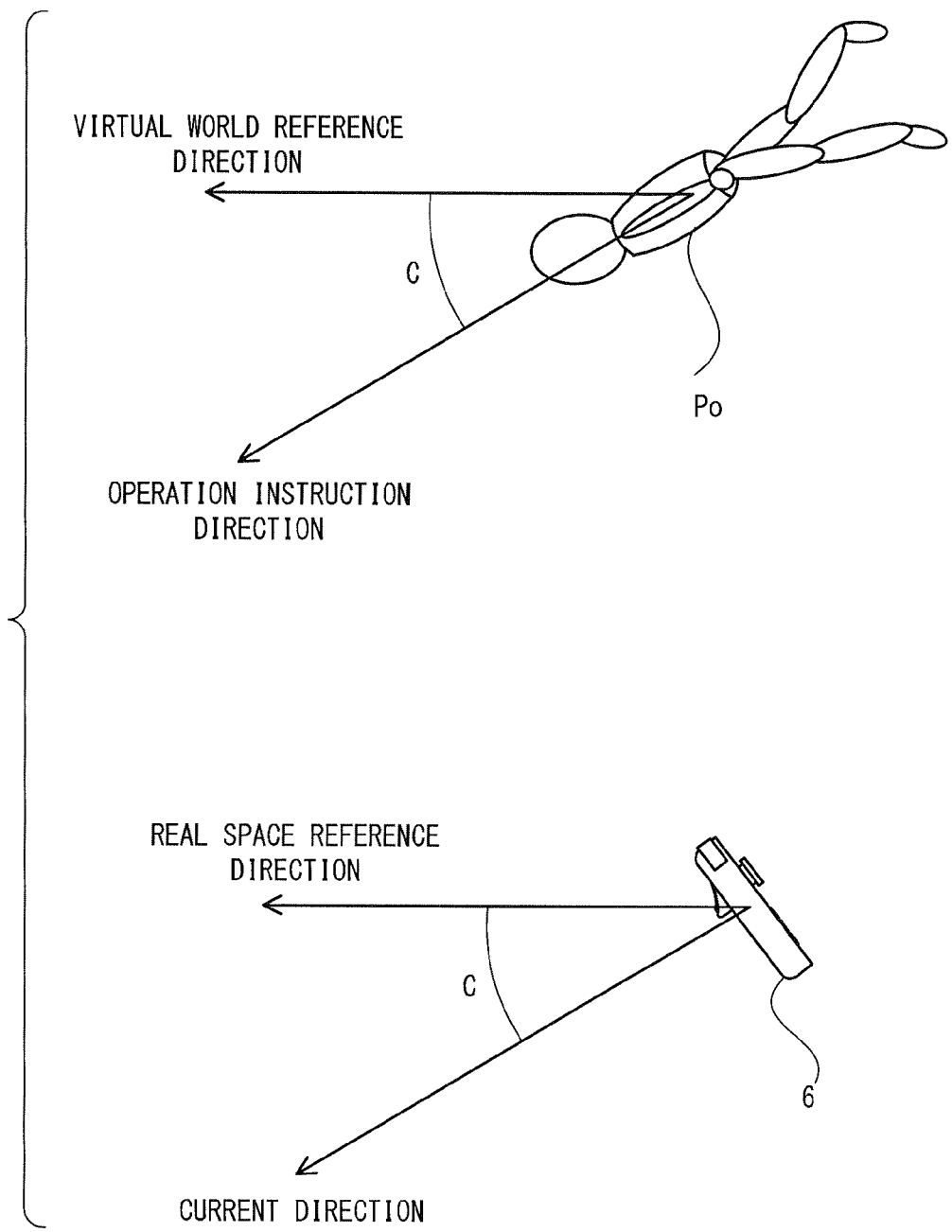
FIG. 17 is a diagram illustrating a non-limiting example of a relationship between a current direction projected on a vertical plane in the real space, and an operation instruction direction projected on a vertical plane in the virtual world.

Next, the process of the first embodiment performed by the game apparatus body 5 will be described in detail with reference to FIGS. 12 to 17. FIG. 12 is a flowchart illustrating an example of a process of the first embodiment executed by the game apparatus body 5. FIG. 13 is a sub-routine illustrating an example of a game control process in step 44 in FIG. 12. FIG. 14 is a sub-routine illustrating an example of a player object setting process in step 83 in FIG. 13. FIG. 15 is a sub-routine illustrating an example of a player object action setting process in step 126 in FIG. 14. FIG. 16 is a diagram illustrating an example of a relationship between a real space reference direction and a current direction which are projected on a horizontal plane in a real space, and a virtual world reference direction and an operation instruction direction which are projected on a horizontal plane in a virtual world. FIG. 17 is a diagram illustrating an example of a relationship between a current direction projected on a vertical plane in the real space, and an operation instruction direction projected on a vertical plane in the virtual world. In the flowcharts shown in FIGS. 12 to 15, process steps for causing the player object Po to move and displaying the same, in accordance with an operation performed by a user using the terminal device 6 and the board type controller 9 will be mainly described among the whole process, while detailed description of other process steps is not given. Further, in FIGS. 12 to 15, each of the steps executed by the CPU 10 is abbreviated as "S".

When the game apparatus body 5 is powered on, the CPU 10 of the game apparatus body 5 executes a boot program stored in the ROM/RTC 13 to initialize each unit such as the main memory. Then, the information processing program stored in the optical disc 4 is loaded to the main memory, and the CPU 10 starts to execute the program. The flowcharts shown in FIGS. 12 to 15 show process steps to be performed after the above-mentioned process steps are completed.

As shown in FIG. 12, the CPU 10 performs an initialization process (step 40), and proceeds to the next step. For example, in the initialization process at step 40, the CPU 10 constructs a virtual world, arranges a player object Po and other objects, which appear in a game space, in their initial positions, and sets the initial values of various parameters used for the game process.

Next, the CPU 10 sets a reference direction based on data transmitted from the terminal device 6 (step 41), and proceeds to the next step. Hereinafter, an example of setting of a reference direction by the CPU 10 will be described.

The terminal device 6 repeatedly transmits the above-mentioned data to the game apparatus body 5. In the game apparatus body 5, the terminal communication module 28 sequentially receives the above data, and the I/O processor 31 sequentially stores the terminal operation data, the camera image data, and the microphone sound data in the main memory. In step 41, the CPU 10 reads the latest terminal operation data from the main memory, and updates the acceleration data Dab1 and the angular velocity data Dab2.

Next, the CPU 10 calculates a direction and an attitude of the terminal device 6 in the real space. For example, the CPU 10 calculates, as a reference direction (initial attitude) in the real space, a direction and an attitude of the terminal device 6 at the current time, based on the acceleration represented by the acceleration data Dab1 and the angular velocity represented by the angular velocity data Dab2, and updates the real space reference direction data Dae1 by using data representing the calculated reference direction of the terminal device 6. For example, the CPU 10 is capable of calculating an amount of rotation (an amount of direction change) of the terminal device 6 in the real space, per unit time, based on the angular velocity represented by the angular velocity data Dab2. Further, in a state where the terminal device 6 is substantially stationary (in a static state) in the real space, the acceleration applied to the terminal device 6 is the gravitational acceleration. Therefore, the CPU 10 is capable of calculating a direction of gravity applied to the terminal device 6 (i.e., an attitude of the terminal device 6 with respect to the vertical direction in the real space), based on the acceleration represented by the acceleration data Dab1. Accordingly, the CPU 10 is capable of calculating an initial attitude of the terminal device 6, based on the acceleration represented by the acceleration data Dab1 and the angular velocity represented by the angular velocity data Dab2. In the following description, when step 41 is executed, a direction in which the back surface of the terminal device 6 faces in the real space (the z-axis positive direction shown in FIG. 3) is the real space reference direction.

The initial attitude of the terminal device 6 may be calculated based on the acceleration represented by the acceleration data Dab1, or on the direction of a magnetism detected by the magnetic sensor 602. Alternatively, the user is caused to perform a predetermined operation with the terminal device 6 being set in a specific attitude, and the specific attitude at the time when the predetermined operation is performed may be used as an initial attitude. As for the timing at which the initial attitude is set, i.e., the timing at which step 41 is executed, step 41 may be automatically executed when the game is started, or may be executed in accordance with that the user performs a predetermined operation (e.g., an operation to press a predetermined operation button 64) by using the terminal device 6.

In step 41, the CPU 10 calculates a current direction in which the player object Po faces in the virtual world (e.g., a direction in which the player object Po moves if there is no direction change) as a reference direction (initial attitude) in the virtual world, and updates the virtual world reference direction data Daf1 by using data representing the calculated reference direction in the virtual world.

The above-mentioned step 41 is followed by a process at step 42. Thereafter, a process loop of a series of process steps 42 to 51 is repeatedly executed every predetermined period (one frame period).

In step 42, the CPU 10 obtains board operation data transmitted from the board type controller 9, and proceeds to the next step. The board type controller 9 repeatedly transmits the board operation data to the game apparatus body 5. Accordingly, in the game apparatus body 5, the controller communication module 19 sequentially receives the board operation data, and the I/O processor 31 sequentially stores the received board operation data in the main memory. The interval of transmission of the board operation data from the board type controller 9 may be shorter than the game processing period (one frame period), and for example, it is 1/200 sec. In step 42, the CPU 10 reads the latest board operation data from the main memory to update the board operation data Daa1. The board operation data includes data representing identification information of the load sensors 94a to 94d, and data representing the load values detected by the load sensors 94a to 94d. The load data Daa1 is updated by using each of the data identified by the identification information.

Next, the CPU 10 obtains various data transmitted from the terminal device 6 (step 43), and proceeds to the next step. The terminal device 6 repeatedly transmits the data to the game apparatus body 5. Accordingly, in the game apparatus body 5, the terminal communication module 28 sequentially receives the data, and the codec LSI 27 sequentially performs a decompression process on the camera image data and the microphone sound data. Then, the I/O processor 31 sequentially stores the terminal operation data, the camera image data, and the microphone sound data in the main memory. In step 43, the CPU 10 reads the latest terminal operation data from the main memory to update the acceleration data Dab1 and the angular velocity data Dab2.

Next, the CPU 10 performs a game control process (step 44), and proceeds to the next step. The game control process is a process in which, for example, the player object Po in the virtual world is caused to move in accordance with a game operation performed by the user, thereby progressing the game. In the first exemplary game, the user is allowed to play various games by using the terminal device 6 and the board type controller 9. Hereinafter, the game control process at step 44 will be described with reference to FIG. 13.

In FIG. 13, the CPU 10 calculates a load value and a center-of-gravity position (step 81), and proceeds to the next step. For example, the CPU 10 calculates a total load value by summing up the detected load values represented by the load data Daa1, and updates the latest data in the time-sequence data array of the load value data Dac by using the data representing the total load value. Specifically, since the load data Daa1 represents the latest load values detected by the load sensors 94*a* to 94*d*, the total load value is obtained by summing up the detected load values. Further, the CPU 10 calculates a center-of-gravity position by using the detected load values represented by the load data Daa1, and updates the latest data in the time-sequence data array of the center-of-gravity position data Dad by using the data representing the center-of-gravity position. Hereinafter, an example of a center-of-gravity position calculation method will be described.

The center-of-gravity position is a position of the center of gravity of a load applied to the platform 9*a* of the board type controller 9, and is determined based on the load values detected by the load sensors 94*a* to 94*d* (see FIG. 6). For example, the center-of-gravity position is represented by coordinate values based on a predetermined coordinate system corresponding to a position on the platform 9*a* of the board type controller 9 (e.g., a X1Y1 coordinate system in which the center of the platform 9*a* corresponds to an origin thereof, the long side direction of the platform 9*a* corresponds to the X1 axis direction, and the short side direction corresponds to the Y1 axis direction). Assuming that a load value detected by the load sensor 94*a* is defined as "a", a load value detected by the load sensor 94*b* is defined as "b", a load value detected by the load sensor 94*c* is defined as "c", and a load value detected by the load sensor 94*d* is defined as "d", an X1-axis coordinate value (X1) and a Y-axis coordinate value (Y1) of the center of gravity are calculated in accordance with the following equations:

$$X1=((a+c)-(b+d))\times m$$

$$Y1=((c+d)-(a+b))\times n$$

where m and n are predetermined constants.

The total load value and the center-of-gravity position, which are thus calculated, vary in accordance with an action or a weight shift (posture) of the user on the board type controller 9. For example, when the user repeats stepping on the board type controller 9, the total load value varies in accordance with the stepping cycle, and the center-of-gravity position shifts as if reciprocating, according to the stepping cycle, between the position on which the user puts his/her left foot and the position on which the user puts his/her right foot. In another example, when the user repeats knee bending on the board type controller 9, the total load value varies in accordance with the cycle of the knee bending, but the variation of the center-of-gravity position is relatively reduced.

Next, the CPU 10 calculates a direction change and an attitude of the terminal device 6 (step 82), and proceeds to the next step. For example, the CPU 10 calculates a direction change and an attitude of the terminal device 6, based on the acceleration represented by the acceleration data Dab1 and the angular velocity represented by the angular velocity data Dab2, and updates the current direction data Dae2 by using data representing the current direction which corresponds to the calculated direction change and attitude of the terminal device 6. The CPU 10 is capable of calculating an amount of rotation (an amount of direction change) of the terminal device 6 in the real space, per unit time, based on the angular velocity represented by the angular velocity data Dab2. Further, in a state where the terminal device 6 is substantially stationary (in a static state) in the real space, the acceleration applied to the terminal device 6 is the gravitational acceleration. Therefore, the CPU 10 is capable of calculating a direction of gravity applied to the terminal device 6 (i.e., the attitude of the terminal device 6 with respect to the vertical direction in the real space), based on the acceleration represented by the acceleration data Dab1. Accordingly, the CPU 10 is capable of calculating a direction change and an attitude of the terminal device 6, based on the acceleration represented by the acceleration data Dab1 and the angular velocity represented by the angular velocity data Dab2. In the following description, a direction (the z-axis positive direction shown in FIG. 3) at the current time, in which the back surface of the terminal device 6 faces in the real space, is regarded as the current direction of the terminal device 6.

In the exemplary embodiment, a direction change and an attitude of the terminal device 6 are calculated based on the data representing the acceleration and the angular velocity detected by the terminal device 6. In another embodiment, however, a direction change and an attitude of the terminal device 6 may be calculated by using any one piece data or three or more pieces of data. For example, the magnetic sensor 602 included in the terminal device 6 detects a geomagnetism applied to the terminal device 6. Therefore, based on the direction of the geomagnetism applied to the terminal device 6, a predetermined orientation with respect to the terminal device 6 (i.e., the attitude of the terminal device 6 with respect to the predetermined orientation) can be calculated. Even when a magnetic field is generated in addition to the geomagnetism in the real space where the terminal device 6 is located, an amount of rotation of the terminal device 6 can be calculated. Accordingly, the CPU 10 is capable of calculating a direction change and an attitude of the terminal device 6 by using at least one of the data representing the acceleration, the data representing the angular velocity, and the data representing the magnetism, which are detected by the terminal device 6.

Any calculation method may be used for calculating an attitude of the terminal device 6. For example, a calculation method is considered, in which the attitude of the terminal device 6, which is calculated based on the angular velocity represented by the angular velocity data Dab2, is corrected by using the acceleration represented by the acceleration data Dab1 and the direction of the magnetism detected by the magnetic sensor 602.

Specifically, the CPU 10 firstly calculates an attitude of the terminal device 6 based on the angular velocity represented by the angular velocity data Dab2. Any method may be used for calculating an attitude of the terminal device 6 based on the angular velocity. For example, an attitude of the terminal device 6 may be calculated by using the immediately preceding attitude (most-recently calculated attitude) and the current angular velocity (the angular velocity currently obtained at step 42 in the process loop). The CPU 10 causes the immediately preceding attitude to rotate at the current angular velocity for a unit time to obtain a new attitude. The immediately preceding attitude is represented by the current direction data Dae2, and the current angular velocity is represented by the angular velocity data Dab2. Accordingly, the CPU 10 reads the current direction data Dae2 and the angular velocity data Dab2, and calculates an attitude of the terminal device 6. As described above, the initial attitude of the terminal device 6 is determined in step 41. Therefore, when calculating an attitude of the terminal device 6 based on the angular velocity, the CPU 10 can calculate an attitude of the terminal device 6 at the current time, based on the initial attitude of the terminal device 6.

Next, the CPU 10 corrects the attitude of the terminal device 6 calculated based on the angular velocity, by using the acceleration represented by the acceleration data Dab1. Specifically, the CPU 10 calculates an attitude of the terminal device 6 based on the acceleration represented by the acceleration data Dab1. In a state where the terminal device 6 is substantially stationary, the acceleration applied to the terminal device 6 is the gravitational acceleration. Accordingly, in this state, the CPU 10 is capable of calculating a direction of the gravitational acceleration (direction of gravity) by using the direction of the acceleration represented by the acceleration data Dab1, and therefore, is capable of calculating a direction (attitude) of the terminal device 6 with respect to the direction of gravity.

After the calculation of the attitude of the terminal device 6 based on the acceleration, the CPU 10 corrects the attitude based on the angular velocity, by using the attitude based on the acceleration. Specifically, the CPU 10 performs a correction to approximate, at a predetermined rate, the attitude of the terminal device 6 calculated based on the angular velocity to the attitude of the terminal device 6 calculated based on the acceleration. The predetermined rate may be a preset fixed value, or may be set according to, for example, the acceleration represented by the acceleration data Dab1. Regarding the attitude of the terminal device 6 calculated based on the acceleration, since an attitude cannot be calculated with respect to the direction of rotation around the direction of gravity, the CPU 10 may not perform correction of the attitude with respect to this rotation direction. When correcting the attitude of the terminal device 6 calculated based on the angular velocity, based on the direction of magnetism detected by the magnetic sensor 602, the CPU 10 approximates, at a predetermined rate, the attitude of the terminal device 6 calculated based on the angular velocity to the attitude of the terminal device 6 calculated based on the direction of magnetism. Thus, the CPU 10 is capable of accurately calculating an attitude of the terminal device 6.

Next, the CPU 10 sets a player object Po (step 83), and proceeds to the next step. Hereinafter, a player object setting process in step 83 will be described with reference to FIG. 14.

In FIG. 14, the CPU 10 calculates a horizontal angular difference between the real space reference direction and the current direction (step 120), and proceeds to the next step. The horizontal angular difference is an angular difference (e.g., an angle A shown in FIG. 16) which is obtained by projecting an angular difference between the real space reference direction and the current direction in the real space on a horizontal plane. The horizontal angular difference indicates an angle at which the direction of the terminal device 6 (the direction in which the back surface of the terminal device 6 faces (the z-axis positive direction shown in FIG. 3)) is changed from the initial attitude of the terminal device 6 around the vertical direction in the real space. For example, the CPU 10 calculates the horizontal angular difference by using the real space reference direction represented by the real space reference direction data Dae1, and the current direction represented by the current direction data Dae2.

Next, the CPU 10 calculates an operation instruction direction with respect to the virtual world reference direction in accordance with the horizontal angular difference and the attitude (up-down angle) of the terminal device 6 in the up-down direction (step 121), and proceeds to the next step. For example, as shown in FIG. 16, the CPU 10 calculates, based on the virtual world reference direction represented by the virtual world reference direction data Daf1, an operation instruction direction in the virtual world such that an angular difference which occurs when the virtual world reference direction and the operation instruction direction are projected on the horizontal plane in the virtual world is equal to the horizontal angular difference, and the same positional relation is achieved between the real space and the virtual world (that is, if the current direction rotates to the left with respect to the real space reference direction, the operation instruction direction also rotates to the left with respect to the virtual world reference direction). Please refer to angle A shown in FIG. 16. Further, as shown in FIG. 17, the CPU 10 calculates, based on the current direction represented by the current direction data Dae2, an operation instruction direction in the virtual world such that an angular difference between the horizontal direction in the virtual world and the operation instruction direction is equal to an angular difference between the horizontal direction in the real space and the current direction, and the same positional relation is achieved between the real space and the virtual world (that is, if the current direction is downward with respect to the horizontal direction in the real space, the operation instruction direction is also downward with respect to the horizontal direction in virtual world). Please refer to angle C in FIG. 17. Then, the CPU 10 updates the operation instruction direction data Daf2 by using the calculated operation instruction directions.

Next, the CPU 10 determines whether or not the player object Po moves (step 122). For example, when a movement vector is set in the movement vector data Dah, the CPU 10 determines that the player object Po moves. When the player object Po moves, the CPU 10 proceeds to step 123. On the other hand, when the player object Po does not move, the CPU 10 proceeds to step 129.

In step 123, the CPU 10 calculates a rotation movement angle in accordance with the horizontal angular difference calculated at step 120, and proceeds to the next step. For example, the CPU 10 calculates a rotation movement angle B (angle B shown in FIG. 16) in accordance with the following equation:

$$B = A \times a1$$

where A is the horizontal angular difference, and a1 is a positive constant (e.g., 0.001) smaller than 1.

Next, the CPU 10 changes the virtual world reference direction in accordance with the rotation movement angle calculated at step 123 (step 124), and proceeds to the next step. For example, when the virtual world reference direction represented by the virtual world reference direction data Daf1 is projected on the horizontal plane in the virtual world, the CPU 10 changes the virtual world reference direction such that the virtual world reference direction approaches the operation instruction direction by the rotation movement angle, and updates the virtual world reference direction data Daf1 by using the changed virtual world reference direction.

Next, the CPU 10 sets a direction of the player object Po in the virtual world, based on the operation instruction direction represented by the operation instruction direction data Daf2 (step 125), and proceeds to the next step. For example, the CPU 10 updates the action/attitude data Dag by using the operation instruction direction represented by the operation instruction direction data Daf2 as the direction of the player object Po. Accordingly, the direction of the player object Po in the virtual world is set based on the attitude of the terminal device 6 in the real space. For example, when the user turns the back surface of the terminal device 6 upward, the direction of the player object Po is set at an elevation angle according to an angle at which the back surface faces upward with respect to the vertical direction. When the user turns the back surface of the terminal device 6 downward, the direction of the player object Po is set at a depression angle according to an angle at which the back surface faces downward with respect to the vertical direction. Further, a left-right direction of the player object Po is set based on a left-right direction change of the terminal device 6 with respect to the real space reference direction. For example, when the terminal device 6 rotates in the yaw direction (see FIG. 3) which is a rotation direction around the y axis, the direction of the player object Po also changes in accordance with the amount of the rotation of the terminal device 6. Specifically, when the terminal device 6 rotates around the y axis to the left as viewed from the y-axis negative direction, the direction of the player object Po also changes to the left as viewed from the player object Po in accordance with the amount of this rotation. When the user maintains the state where the terminal device 6 is rotated to the left or to the right with respective to the real space reference direction, the virtual world reference direction continuously changes to the left or to the right, and therefore, the operation instruction direction continuously changes to the left or to the right in accordance with the change in the virtual world reference direction when step 121 is executed. Accordingly, when the user maintains the state where the terminal device 6 is rotated to the left or to the right with respect to the real space reference direction, the direction of the player object Po continuously changes to the left or to the right. That is, even when the user desires to greatly change the direction of the player object Po (e.g., to change the direction of the player object Po to the opposite direction), the user need not greatly change the direction of the terminal device 6 to the opposite direction or the like, and thus the operability of the user is enhanced.

Next, the CPU 10 performs a player object action setting process (step 126), and proceeds to the next step. Hereinafter, the player object action setting process at step 126 will be described with reference to FIG. 15.

In FIG. 15, the CPU 10 determines whether or not the action mode flag represented by the action mode flag data Dam is set to OFF (step 140). When the action mode flag is set to OFF, the CPU 10 proceeds to step 141. When the action mode flag is set to ON, the CPU 10 proceeds to step 148.

In step 141, the CPU 10 determines whether or not the total load value is equal to or greater than a predetermined value. For example, the CPU 10 determines whether or not the latest total load value represented by the load value data Dac is equal to or greater than the predetermined value. The predetermined value is a threshold value for determining that the user performs as action such as knee banding on the board type controller 9. For example, the threshold value is set to a value obtained by adding a predetermined rate (e.g., 20%) to the weight of the user on the board type controller 9. The weight of the user on the board type controller 9 may be calculated based on the total load value (e.g., the weight may be an average of total load values obtained within a predetermined period), or may be previously inputted by the user. When the total load value is equal to or greater than the predetermined value, the CPU 10 proceeds to step 142. When the total load value is smaller than the predetermined value, the CPU 10 proceeds to step 144.

In step 142, the CPU 10 sets the object action to an action of doing a dolphin kick, and proceeds to the next step. For example, when the total load value is equal to or greater than the predetermined value, the CPU 10 determines that the user performs knee bending on the board type controller 9. In this case, the CPU 10 sets the action of the player object Po to an action of swimming in the dolphin kick style, and to an action of doing a dolphin kick, and then updates the action/attitude data Dag by using the set action.

Next, the CPU 10 sets the action mode flag to ON (step 143), and ends the process of this sub-routine. For example, the CPU 10 sets the action mode flag represented by the action mode flag data Dam to ON.

On the other hand, when it is determined at step 141 that the total load value is smaller than the predetermined value, the CPU 10 determines whether or not the center-of-gravity position represented by the center-of-gravity position data Dad has shifted from outside the right-foot region to inside the right-foot region (step 144). When the result of the determination is that the center-of-gravity position has shifted from outside the right-foot region to inside the right-foot region, the CPU 10 proceeds to step 145. On the other hand, when the result of the determination is that the center-of-gravity position has not shifted from outside the right-foot region to inside the right-foot region, the CPU 10 proceeds to step 146.

In the predetermined coordinate system (e.g., an X1Y1 coordinate system in which the center of the platform 9*a* corresponds to an origin thereof, the long side direction of the platform 9*a* corresponds to the X1 axis direction, and the short side direction corresponds to the Y1 axis direction) corresponding to a position on the platform 9*a* of the board type controller 9, a region (right-foot region) to which the center-of-gravity position shifts when the user lifts the left foot and puts down the right foot in the stepping action, and a region (left-foot region) to which the center-of-gravity position shifts when the user lifts the right foot and puts down the left foot in the stepping action, are set. For example, the left-foot region and the right-foot region are provided on the left-half part and the right-half part of the platform 9*a* (with the power button 9*c* facing downward, for example), respectively, and a neutral region having a predetermined width and extending in the front-rear direction is set between the left-foot region and the right-foot region. In the process at step 144, the determination result is positive when the latest center-of-gravity position represented by the center-of-gravity position data Dad shifts from outside the right-foot region to inside the right-foot region, such as when the latest center-of-gravity position shifts from inside the neutral region to inside the right-foot region.

It is considered that the user may perform stepping while turning on the board type controller 9. In this case, if the positions of the left-foot region, the right-foot region, and the neutral region are fixed, accurate determination of the stepping action cannot be performed. In such a case, the left-foot region, the right-foot region, and the neutral region in the coordinate system may be shifted based on the shift of the center-of-gravity position in the coordinate system. For example, if the distance of shift of the center-of-gravity position within a predetermined period is equal to or longer than a predetermined length, the neutral region is shifted such that, in the center position of the movement trajectory of the center-of-gravity position within the predetermined period, the neutral region extends orthogonally to the movement trajectory, and the left-foot region and the right-foot region are shifted in accordance with the shift of the neutral region. Shifting the left-foot region, the right-foot region, and the neutral region in this way enables accurate determination of the stepping action even when the user performs stepping while turning on the board type controller 9.

In the above-described determination of the stepping action, the CPU 10 determines whether the foot with which the user takes a step on the board type controller 9 is the left foot or the right foot. However, such distinction between the left foot and the right foot may not be performed. For example, in the case where the process is performed such that the above-mentioned "left foot" is regarded as "one foot" and the "right foot" as "the other foot", it is possible to make an instruction of an action in which the user's stepping action is synchronized with the flutter kick action of the player object Po although there is a possibility that the foot with which the user takes a step and the foot with which the player object Po does a flutter kick may be reversed to those described above.

In step 145, the CPU 10 sets the object action to an action of doing a flutter kick with its right foot, and ends the process of this sub-routine. For example, when the center-of-gravity position shifts from outside the right-foot region to inside the right-foot region, the CPU 10 determines that the user performs stepping such that he/she lifts the left foot and puts down the right foot on the board type controller 9. In this case, the CPU 10 sets the action of the player object Po to an action of swimming in the flutter kick style, and to an action of doing a flutter kick with its right foot, and then updates the action/attitude data Dag by using the set action.

In step 146, the CPU 10 determines whether or not the center-of-gravity position represented by the center-of-gravity position data Dad shifts from outside the left-foot region to inside the left-foot region. When the result of the determination is that the center-of-gravity position shifts from outside the left-foot region to inside the left-foot region, the CPU 10 proceeds to step 147. When the result of the determination is that the center-of-gravity position does not shift from outside the left-foot region to inside the left-foot region, the CPU 10 proceeds to step 151

In step 147, the CPU 10 sets the object action to an action of doing a flutter kick with its left foot, and ends the process of this sub-routine. For example, when the center-of-gravity position shifts from outside the left-foot region to inside the left-foot region, the CPU 10 determines that the user performs stepping such that he/she lifts the right foot and puts down the left foot on the board type controller 9. In this case, the CPU 10 sets the action of the player object Po to an action of swimming in the flutter kick style, and to an action of doing a flutter kick with its left foot, and then updates the action/attitude data Dag by using the set action.

When it is determined at step 140 that the action mode flag is ON, the CPU 10 determines whether or not a predetermined time has passed from when the action mode flag was set to ON (step 148). When the result of the determination is that the predetermined time has passed, the CPU 10 proceeds to step 149. When the predetermined time has not passed, the CPU 10 proceeds to step 150. The predetermined time is a time from when a dolphin kick is done to when a next dolphin kick operation input or flutter kick operation input is enabled. Until the predetermined time has passed, determination of the user's action by using the board type controller 9 is not performed. Thereby, it is possible to prevent an erroneous determination of the user's action, which might occur immediately after a dolphin kick.

In step 149, the CPU 10 sets the action mode flag to OFF, and ends the process of this sub-routine. For example, the CPU 10 sets the action mode flag represented by the action mode flag data Dam to OFF.

On the other hand, in step 150, the CPU 10 sets the object action to "during dolphin kick", and ends the process of this sub-routine. For example, the CPU 10 continuously sets the action of the player object Po to an action of swimming in the dolphin kick style, and to "during dolphin kick", and then updates the action/attitude data Dag by using the set action.

In the case where the action mode flag is OFF (negative determination at step 140), the total load value is smaller than the predetermined value (negative determination at step 141), the center-of-gravity position does not shift from outside the right-foot region to inside the right-foot region (negative determination at step 144), and the center-of-gravity position does not shift from outside the left-foot region to inside the left-foot region (negative determination at step 146), the CPU 10 sets the object action to an action of continuing the currently set action (step 151), and ends the process of this sub-routine. For example, when an action of doing a kick (e.g., a flutter kick) is set, the CPU 10 cancels the action, and maintains the swimming style of the player object Po, which is set as the object action, and then updates the action/attitude data Dag by using the set action.

Referring back to FIG. 14, after the player object action setting process at step 126, the CPU 10 sets a movement vector of the player object Po (step 127), and proceeds to the next step. For example, the CPU 10 calculates a movement speed of the player object Po, based on the time-sequential array of the total load values (the history of variation of the total load value) represented by the load value data Dac, and the action (swimming style) of the player object Po which is set at step 126. For example, the shorter the cycle of variation of the total load value is, the higher the movement speed of the player object Po the CPU 10 calculates. The greater the maximum value or the variation width of the total load value is, the higher the movement speed of the player object Po the CPU 10 calculates. That is, the shorter the pitch of the user's stepping or knee bending on the board type controller 9 is, the higher the movement speed of the player object Po is. The greater the force of the user's stepping or knee bending on the board type controller 9 is, the higher the movement speed of the player object Po is. Then, the CPU 10 corrects the calculated movement speed by using a coefficient according to the set swimming style, thereby determining a movement speed of the player object Po. The movement speed of the player object Po is set so as to be relatively high at the timing of doing a kick and be gradually lowered until a next kick.

Further, the CPU 10 sets, as a movement direction of the player object Po, the operation instruction direction in the virtual world, which is represented by the operation instruction direction data Daf2. Then, the CPU 10 calculates a movement vector in the virtual world by using the calculated movement speed and movement direction of the player object Po, and updates the movement vector data Dah by using the calculated movement vector. For example, the CPU 10 sets a length of the movement vector by using the calculated movement speed of the player object Po, and sets a direction of the movement vector by using the operation instruction direction represented by the operation instruction direction data Daf2.

Next, the CPU 10 calculates a position of the player object Po (step 128), and ends the process of this sub-routine. For example, the CPU 10 causes the position of the player object Po represented by the position data Dai to shift in the virtual world, based on the movement vector represented by the movement vector data Dah, and updates the position data Dai by using the position after the shifting.

On the other hand, when it is determined at step 122 that the player object Po does not move, the CPU 10 sets a direction of the player object Po in the virtual world, based on the operation instruction direction represented by the operation instruction direction data Daf2 (step 129), and proceeds to the next step. Since the process at step 129 is identical to the process at step 125, repeated description is not necessary.

Next, the CPU 10 sets the object action in a static state (step 130), and ends the process of this sub-routine. For example, the CPU 10 sets the action of the player object Po in a static state (e.g., a state in which the player object Po is not swimming but drifting in the sea), and updates the action/attitude data Dag by using the set action.

Referring back to FIG. 13, after the player object setting process at step 83, the CPU 10 sets parameters relating to virtual cameras (step 84), and proceeds to the next step. For example, a terminal game image and a monitor game image are each generated as, for example, a three-dimensional CG image which is obtained by calculating a scene of a game space viewed from a virtual camera arranged in a virtual world (virtual space). Specifically, a first virtual camera for generating a terminal game image is set such that a state of the virtual world viewed at close range from behind the player object Po arranged in the virtual world is included in the terminal game image. A second virtual camera for generating a monitor game image is set in the same virtual world in which the first virtual camera is set, such that a state of the virtual world in which the player object Po arranged in the virtual world is viewed from a distance in a manner of bird's eye viewing is included in the monitor game image. The CPU 10 sets positions of the first virtual camera and the second virtual camera in the virtual world (parameters relating to the first virtual camera and the second virtual camera), based on the position of the player object Po represented by the position data Dai, and the operation instruction direction (the direction of the player object Po) in accordance with the operation instruction direction data Daf2. In this way, the terminal game image and the monitor game image are game images of the same virtual world viewed from different viewpoints. Therefore, the game images of the virtual world viewed from the different viewpoints are displayed on the LCD 61 and the monitor 2, respectively. Although the direction of the first virtual camera is set based on the operation instruction direction (the direction of the player object Po), since the operation instruction direction (the direction of the player object Po) is set based on the attitude of the terminal device 6 as described above, the direction of the first virtual camera is eventually controlled based on the attitude of the terminal device 6. That is, the user is allowed to control the first virtual camera for generating the virtual world image displayed on the LCD 61 of the terminal device 6, by moving the body of the terminal device 6. Since the attitude and the direction of the terminal device 6 are associated with the attitude and the direction of the first virtual camera, the user is allowed to experience a sense of looking into the virtual world through the LCD 61 of the terminal device 6.

Next, the CPU 10 sets a movement trajectory of the player object Po (step 85), and ends the process of the sub-routine. For example, the CPU 10 adds the current position of the player object Po, which is represented by the position data Dai, to the movement trajectory represented by the movement trajectory data Dak, and updates the movement trajectory data Dak by using the movement trajectory to which the current position is added.

Referring back to FIG. 12, after the game control process at step 44, the CPU 10 and the GPU 32 generate a monitor game image to be displayed on the monitor 2 (step 45), and proceed to the next step. For example, the CPU 10 and the GPU 32 read, from the main memory, the data representing the result of the game control process performed at step 44, and read, from the VRAM 34, the data required for generating a monitor game image. Then, the CPU 10 and the GPU 32 generate a game image by using the read data, and store the generated monitor game image in the VRAM 34. Any monitor game image may be generated by any method so long as the monitor game image represents the result of the game control process performed at step 44. For example, the monitor game image may be a three-dimensional CG image which is generated through the steps of: arranging the second virtual camera in the virtual world based on the parameters relating to the second virtual camera, which are represented by the virtual camera data Daj; arranging the player object Po in the virtual world based on the action/attitude data Dag and the position data Dai; arranging the movement trajectory Lp in the virtual world based on the movement trajectory data Dak; and calculating the scene of the virtual world viewed from the second virtual camera.

Next, the CPU 10 and the GPU 32 generate a terminal game image to be displayed on the terminal device 6 (step 46), and proceed to the next step. For example, the CPU 10 and the GPU 32 read, from the main memory, the data representing the result of the game control process performed at step 44, and read, from the VRAM 34, the data required for generating a terminal game image. Then, the CPU 10 and the GPU 32 generate a terminal game image by using the read data, and store the generated terminal game image in the VRAM 34. Like the monitor game image, any terminal game image may be generated by any method so long as the terminal game image represents the result of the game control process performed at step 44. The terminal game image may be generated by the same method as, or a different method from, that for the monitor game image. For example, the terminal game image may be a three-dimensional CG image which is generated through the steps of: arranging the first virtual camera in the virtual world based on the parameters relating to the first virtual camera, which are represented by the virtual camera data Daj; arranging the player object Po in the virtual world based on the action/attitude data Dag and the position data Dai; and calculating the scene of the virtual world viewed from the first virtual camera.

When the action of the player object Po represented by the action/attitude data Dag is an action of doing a kick (action of doing a dolphin kick or a flutter kick), the player object Po may be arranged in the virtual world so as to perform the action of doing a kick. Thereby, it is possible to cause the player object Po to move in synchronization with the action (stepping or knee bending) the user performs on the board type controller 9.

Next, the CPU 10 generates a monitor game sound to be output to the loudspeakers 2a of the monitor 2 (step 47), and proceeds to the next step. For example, the CPU 10 causes the DSP 33 to generate a monitor game sound to be output from the loudspeakers 2a, in accordance with the result of the game control process performed at step 44. In an example, the CPU 10 causes the DSP 33 to generate a monitor game sound in which BGM or the like to be output from the monitor 2 is added to voices and action sounds of the objects, sound effects and the like, which are supposed to be heard on the basis of the position of the second virtual camera in the virtual world which is set based on the result of the game control process at step 44.

Next, the CPU 10 generates a terminal game sound to be output to the loudspeakers 607 of the terminal device 6 (step 48), and proceeds to the next step. For example, the CPU 10 causes the DSP 33 to generate a terminal game sound to be output from the loudspeakers 607, in accordance with the result of the game control process performed at step 44. In an example, the CPU 10 causes the DSP 33 to generate a terminal game sound in which BGM or the like to be output from the terminal device 6 is added to voices and action sounds of the objects, sound effects and the like, which are supposed to be heard on the basis of the position of the first virtual camera in the virtual world which is set based on the result of the game control process at step 44. The terminal game sound may be the same as or different from the monitor game sound. Further, the terminal game sound may be partially different from the monitor game sound. For example, the terminal game sound and the monitor game sound may include the same BGM and different sound effects. When the monitor game sound and the terminal game sound are the same, the terminal game sound generation step at step 48 need not be performed.

Next, the CPU 10 outputs the monitor game image and the monitor game sound to the monitor 2 (step 49), and proceeds to the next step. For example, the CPU 10 transmits, to the AV-IC 15, the data of the monitor game image stored in the VRAM 34 and the data of the monitor game sound generated by the DSP 33. The AV-IC 15 transmits the data of the monitor game image and the data of the monitor game sound through the AV connector 16 to the monitor 2. Thereby, the monitor game image is displayed on the monitor 2, and the monitor game sound is output from the loudspeakers 2a.

Next, the CPU 10 transmits the terminal game image and the terminal game sound to the terminal device 6 (step 50), and proceeds to the next step. For example, the CPU 10 transmits, to the codec LSI 27, the data of the terminal game image stored in the VRAM 34 and the data of the terminal game sound generated by the DSP 33. The codec LSI 27 performs a predetermined compression process on these data. The compressed data of the terminal game image and the compressed data of the terminal game sound are transmitted from the codec LSI 27 to the terminal communication module 28, and then transmitted from the terminal communication module 28 to the terminal device 6 via the antenna 29. The data of the terminal game image and the data of the terminal game sound transmitted from the game apparatus body 5 are received by the wireless module 610 of the terminal device 6, and are subjected to a predetermined decompression process by the codec LSI 606. The decompressed data of the terminal game image is output to the LCD 61, and the decompressed data of the terminal game sound is output to the sound IC 608. Thereby, the terminal game image is displayed on the LCD 61, and the terminal game sound is output from the loudspeakers 607.

Next, the CPU 10 determines whether to end the game (step 51). The game is to be ended, for example, when conditions for game over or game clear are satisfied, or when the user has performed an operation to end the game. When the game is not to be ended, the CPU 10 returns to step 42 and repeats the processing, whereas when the game is to be ended, the CPU 10 ends the processing of the flowchart. Thereafter, the series of process steps 42 to 51 are repeatedly executed until the CPU 10 determines to end the game at step 51.

According to the above-mentioned processing, when the user performs an operation based on his/her action on the board type controller 9 and thereby a process based on the user's action is performed, the user is allowed to view the result of the process on the LCD 61 of the portable terminal device 6 held by the user. Therefore, the user, who performs an action with the terminal device 6 in his/her hands, is allowed to view the result of the process in a favorable situation. Further, the user is allowed to control the virtual camera, and the attitude and the movement direction of the player object Po by moving the portable terminal device 6. Therefore, it is possible to provide the user with a sense of presence in the virtual world, and with an operation sense of becoming the player object Po.

Second Embodiment

The game played by using the terminal device 6 and the board type controller 9 is not limited to the above-mentioned first exemplary game, but various exemplary games are considered. In the following description of the outline of information processing according to a second embodiment, a second exemplary game is adopted as an example of the information processing. Since an information processing apparatus for executing an information processing program according to the second embodiment, and an information processing system including the information processing apparatus are identical to those of the first embodiment, the same components as those of the first embodiment are designated by the same reference numerals, and the detailed description thereof is omitted.

Figure 18A:
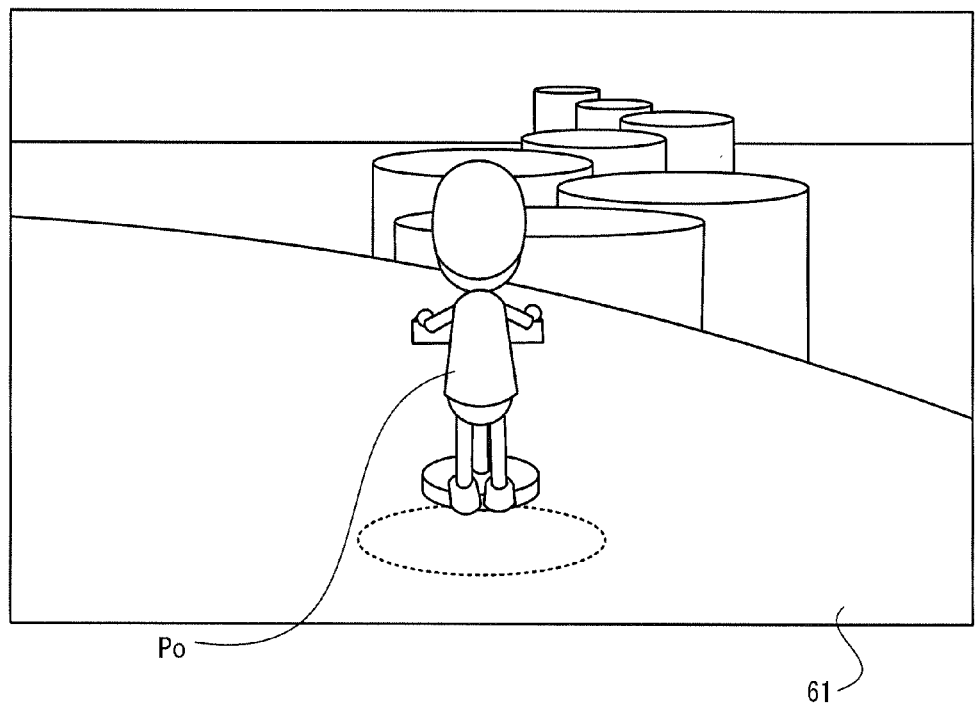
FIG. 18A is a diagram illustrating a non-limiting example of an image displayed on the LCD 61 of the terminal device 6 in a second exemplary game.
Figure 18B:
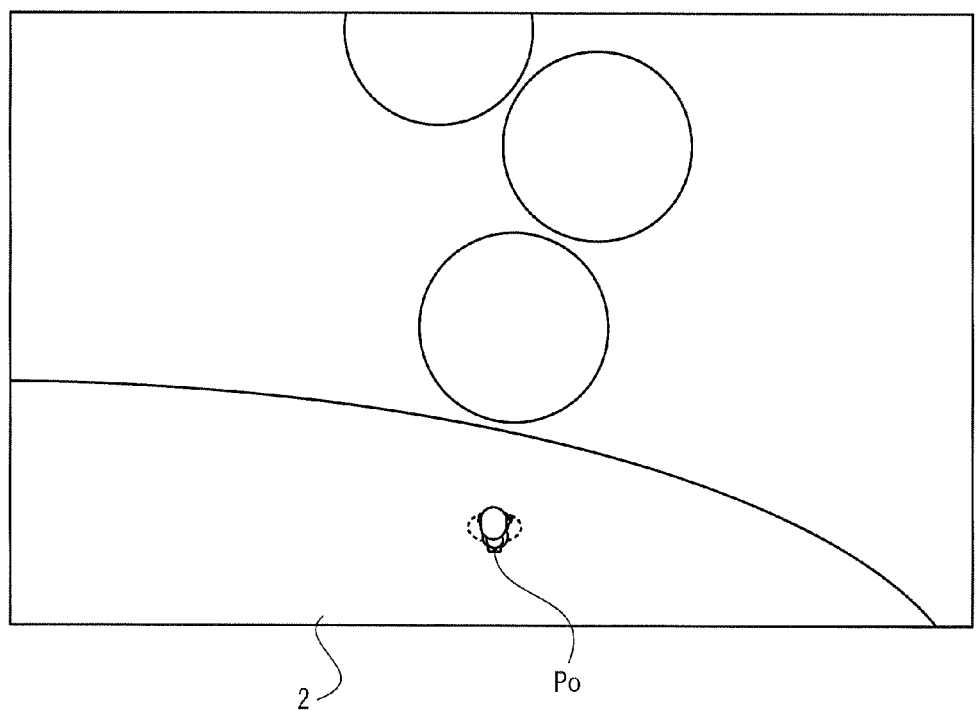
FIG. 18B is a diagram illustrating a non-limiting example of an image displayed on the monitor 2 in the second exemplary game.
Figure 19:
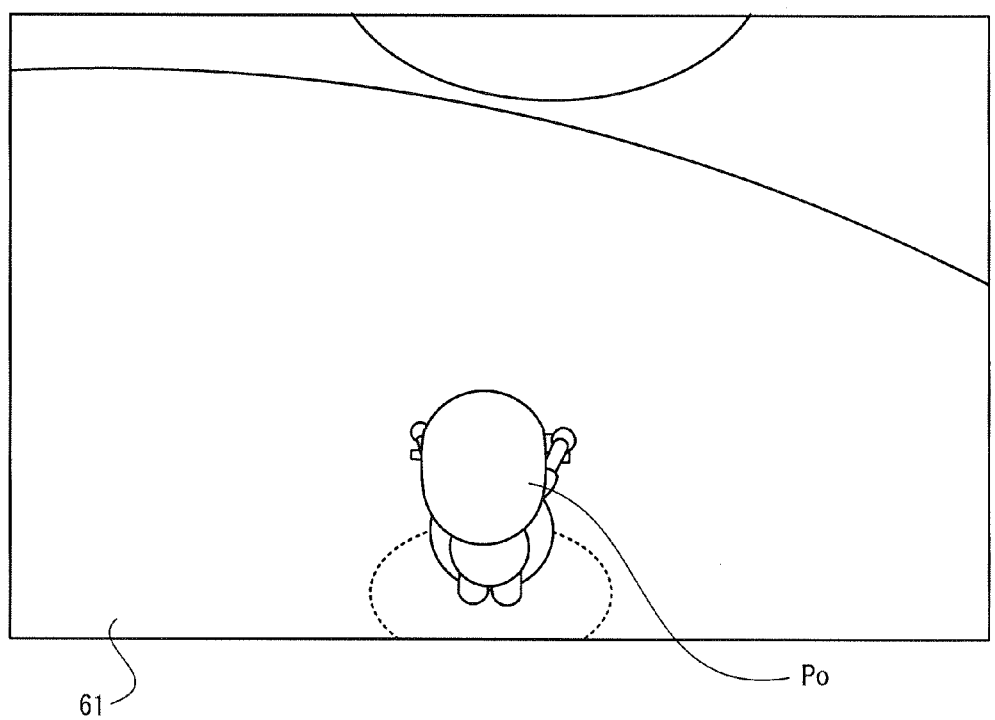
FIG. 19 is a diagram illustrating an another non-limiting example of an image displayed on the LCD 61 of the terminal device 6 in the second exemplary game.
Figure 20:
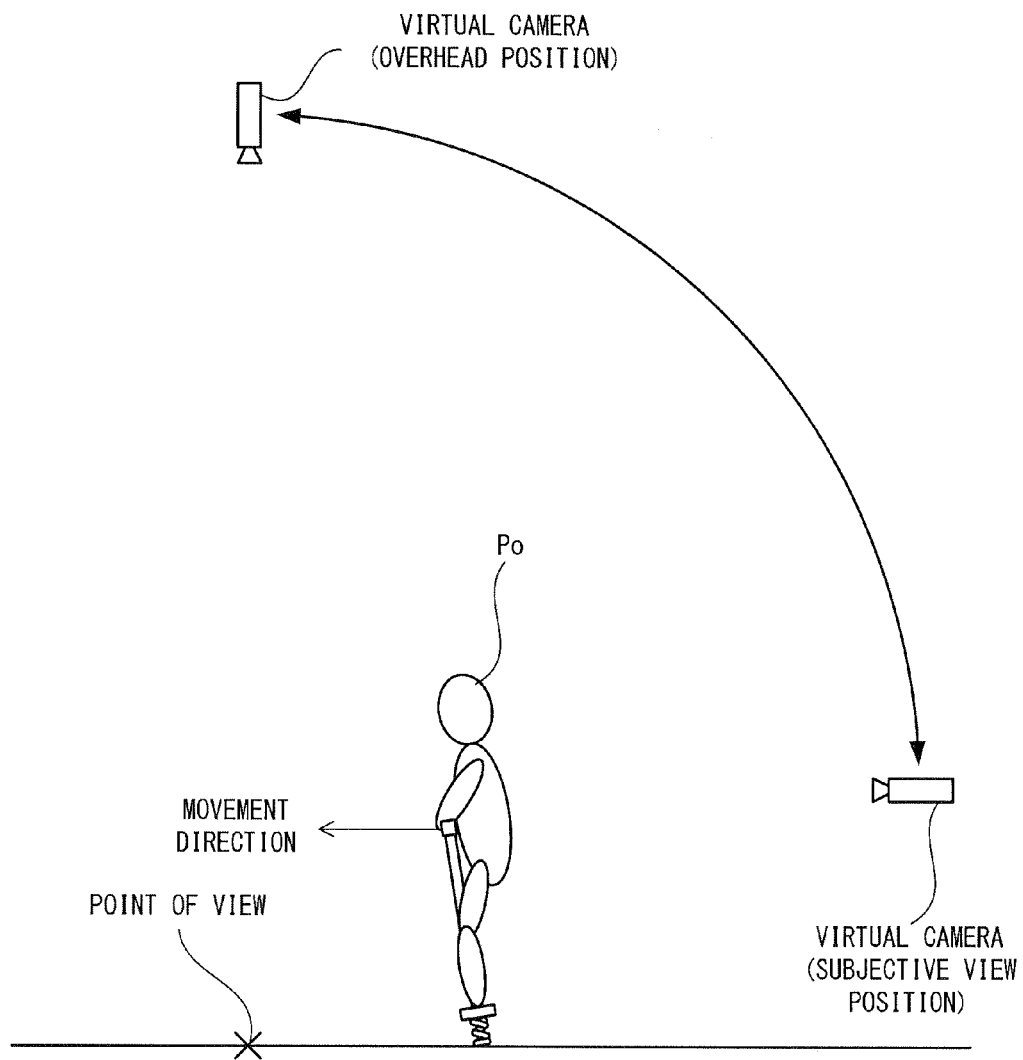
FIG. 20 is a schematic diagram illustrating a non-limiting example of a state in which a position and an attitude of a virtual camera changes in accordance with the attitude of the terminal device 6.

Firstly, an outline of information processing performed on the game apparatus body 5 will be described with reference to FIGS. 18A, 18B, 19, and 20 before a specific description of process steps performed by the game apparatus body 5 is given. FIG. 18A shows an example of an image displayed on the LCD 61 of the terminal device 6 in the second exemplary game. FIG. 18B shows an example of an image displayed on the monitor 2 in the second exemplary game. FIG. 19 shows another example of an image displayed on the LCD 61 of the terminal device 6 in the second exemplary game. FIG. 20 is a schematic diagram illustrating an example in which the position and the attitude of a virtual camera vary depending on the attitude of the terminal device 6.

In the second exemplary game, as in the first exemplary game, a user performs an operation by using the terminal device 6 and the board type controller 9. Specifically, as in the first exemplary game, the user stands on the board type controller 9 with the terminal device 6 in his/her hands, and performs an operation. Then, the user performs an action on the board type controller 9 (e.g., the user performs knee bending on the board type controller 9, or adjusts the center-of-gravity position of a load applied to the board type controller 9), and simultaneously performs an operation to move the terminal device 6, while viewing the image displayed on the monitor 2 and the image displayed on the LCD 61 of the terminal device 6, thereby playing the game. On each of the LCD 61 of the terminal device 6 and the monitor 2, a game image is displayed, in which a player object Po and a virtual camera in a virtual world each perform an action (e.g., an action of the player object Po to change its attitude and movement direction, and an action of the virtual camera to change its position and attitude) in accordance with the direction and the attitude of the terminal device held by the user, and the action of the user on the board type controller 9, and furthermore, the position and the attitude of the virtual camera set in the virtual world are changed in accordance with the position and the attitude of the player object Po and/or the action of the user.

As shown in FIG. 18A, on the LCD 61 of the terminal device 6, a player object Po moving in a virtual world is displayed. In the example shown in FIG. 18A, a virtual camera is located near the back of the player object Po which rides on a pogo stick on the ground in the virtual world, and a state of the virtual world viewed from the virtual camera is displayed together with the player object Po. Displaying, on the LCD 61, the virtual world viewed at close range from behind the player object Po allows the user holding the terminal device 6 to experience a sense of presence in the virtual world, and to intuitively know the movement direction and the movement speed of the player object Po.

Further, as shown in FIG. 18B, the same virtual world as that displayed on the LCD 61 is displayed on the monitor 2. In the example shown in FIG. 18B, a state of the virtual world in which the player object Po on the pogo stick is viewed from a distance in a manner of bird's eye viewing, is displayed together with the player object Po. Displaying, on the monitor 2, the state of the virtual world in which the player object Po is viewed from a distance allows the user to easily know the surroundings of the player object Po, and allows another person who watches the user's playing the second exemplary game to enjoy a view in which the player object Po moves in the virtual world.

For example, when the user performs an action such as knee bending (jumping) on the board type controller 9, the player object Po jumps with the pogo stick at a speed according to the knee bending. When the user performs an action to shift the center-of-gravity position of the load applied to the board type controller 9 while the player object Po is in the air in the virtual world, the movement direction of the player object Po in the air is changed to a direction according to the shift of the center-of-gravity position. In this way, the user is allowed to change the jumping power (movement speed) and the movement direction of the player object Po in accordance with his/her action on the board type controller 9.

When the user changes the attitude of the terminal device 6 or rotates the terminal device 6 to change its direction, the movement direction in which the player object Po jumps out, or the position and the attitude of the virtual camera is changed. For example, when the user turns the terminal device 6 to the left or to the right in the real space, the direction in which the player object Po moves in the virtual world changes in accordance with the direction change of the terminal device 6. Further, in accordance with the change in the movement direction, the position and the attitude of the virtual camera change such that a horizontal line-of-sight direction obtained by projecting the line-of-sight direction of the virtual camera on the horizontal plane in the virtual world becomes equal to a horizontal movement direction obtained by projecting the movement direction on the horizontal plane in the virtual world. Specifically, when the user changes the direction of the terminal device 6 such that the back surface thereof turns to the left, the movement direction of the player object Po changes to the leftward direction in the virtual world. Then, the line of sight of the virtual camera turns to the movement direction, and the position and the attitude of the virtual camera change such that the virtual camera is located near and behind the player object Po.

When the user turns the terminal device 6 upward or downward in the real space, the position and the attitude of the virtual camera change in accordance with the direction change of the terminal device 6. For example, as shown in FIG. 20, when the user holds the terminal device 6 in such an attitude that the back surface of the terminal device 6 faces the horizontal direction in the real space (i.e., the back surface of the terminal device 6 or the display surface of the LCD 61 is orthogonal to the horizontal direction), the virtual camera is located in a subjective position near the back of the player object Po in such an attitude that the line-of-sight direction of the virtual camera is equal to the horizontal direction in the virtual world. In this case, a virtual world as shown in FIG. 18A is displayed on the LCD 61 of the terminal device 6. On the other hand, when the user holds the terminal device 6 in such an attitude that the back surface of the terminal device 6 faces downward in the real space (i.e., the back surface of the terminal device 6 or the display surface of the LCD 61 is orthogonal to the vertical direction, and the back surface faces downward), the virtual camera is located in a position (overhead position) in which the line of sight of the virtual camera is equal to the vertical direction in the virtual world and the virtual camera views the player object Po from above, and the point of view is in front of the player object Po in the movement direction. In this case, a virtual world as shown in FIG. 19 is displayed on the LCD 61 of the terminal device 6. When the user changes the direction of the terminal device 6 from the horizontal direction to the downward direction in the real space, the attitude and the position of the virtual camera also change from the subjective position to the overhead position in accordance with the attitude of the terminal device 6.

In this way, by associating the attitude and the direction of the terminal device 6 with the attitude and the direction of the virtual camera, the user is allowed to experience a sense of looking into the virtual world through the LCD 61 of the terminal device 6. Further, when the user holds the terminal device 6 in such an attitude that the back surface of the terminal device 6 faces downward in the real space, the feet of the player object Po are displayed on the LCD 61 of the terminal device 6, which allows the user to check the landing point of the player object Po or surroundings of the feet of the player object Po. That is, when the user changes the up-down direction of the terminal device 6, the user is allowed to secure a field of view in the movement direction of the player object Po, or a field of view toward the feet of the player object Po, and furthermore, allowed to selectively display his/her desired image on the LCD 61 in accordance with the game situation.

Figure 21:
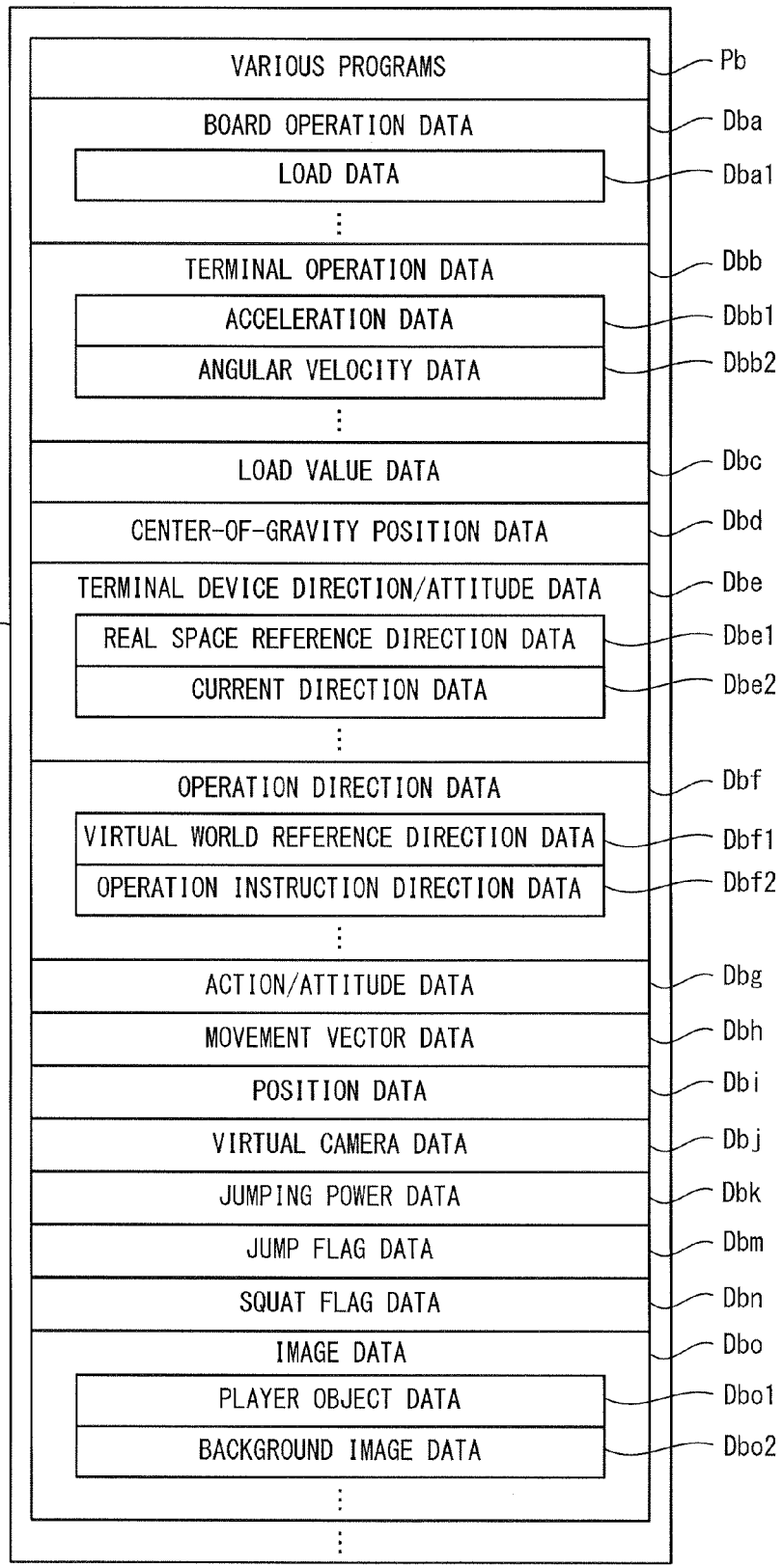
FIG. 21 is a diagram illustrating a non-limiting example of main data and programs stored in the main memory of the game apparatus body 5 in the second exemplary game.

Next, the process of the second embodiment, which is performed by the game system 1, will be described in detail. Firstly, main data used in the process according to the second embodiment will be described with reference to FIG. 21. FIG. 21 is a diagram illustrating an example of main data and programs stored in the main memory of the game apparatus body 5 of the second embodiment. As shown in FIG. 21, in a data storage area of the main memory, board operation data Dba, terminal operation data Dbb, load value data Dbc, center-of-gravity position data Dbd, terminal device direction/attitude data Dbe, operation direction data Dbf, action/attitude data Dbg, movement vector data Dbh, position data Dbi, virtual camera data Dbj, jumping power data Dbk, jump flag data Dbm, squat flag data Dbn, image data Dbo, and the like are stored. In addition to the data shown in FIG. 21, data required for a game process, such as image data of various objects displayed on the monitor 2 and the LCD 61, and sound data used for a game, are optionally stored in the main memory. In a program storage area of the main memory, various programs Pb constituting an information processing program of the second embodiment are stored.

The board operation data Dba includes load data Dba1 and the like. Since the load data Dba1 is identical to the load data Daa1 of the first embodiment, repeated description is not necessary.

The terminal operation data Dbb includes acceleration data Dbb1, angular velocity data Dbb2, and the like. Since the acceleration data Dbb1 and the angular velocity data Dbb2 are identical to the acceleration data Dab1 and the angular velocity data Dab2 of the first embodiment, respectively, repeated description is not necessary.

Since the load value data Dbc and the center-of-gravity position data Dbd are identical to the load value data Dac and the center-of-gravity position data Dad of the first embodiment, respectively, repeated description is not necessary.

The terminal device direction/attitude data Dbe includes real space reference direction data Dbe1, current direction data Dbe2, and the like. Since the real space reference direction data Dbe1 and the current direction data Dbe2 are identical to the real space reference direction data Dae1 and the current direction data Dae2 of the first embodiment, respectively, repeated description is not necessary.

The operation direction data Dbf includes virtual world reference direction data Dbf1, operation instruction direction data Dbf2, and the like. The virtual world reference direction data Dbf1 is data representing a virtual world reference direction set in the virtual world. The operation instruction direction data Dbf2 is data representing an operation instruction direction which is currently instructed in the virtual world by the user. Methods for calculating the virtual world reference direction and the operation instruction direction of the second embodiment will be described later.

The action/attitude data Dbg, the movement vector data Dbh, the position data Dbi, and the virtual camera data Dbj are, as in the first embodiment, data representing the action and the attitude of the player object Po, data representing the movement speed and the movement direction of the player object Po, data representing the position of the player object Po, and data relating to the virtual camera, respectively, although the calculation methods thereof are different from those of the first embodiment as described later.

The jumping power data Dbk is data representing a jumping power (movement speed) of the player object Po, which is calculated based on the user's action on the board type controller 9.

The jump flag data Dbm is data representing a jump flag which is turned on while the player object Po is jumping. The squat flag data Dbn is data representing a squat flag which is turned on when it is determined that the user squats on the board type controller 9.

The image data Dbo includes player object data Dbo1, background image data Dbo2, and the like. The player object data Dbo1 is data for arranging the player object Po of the second exemplary game in the virtual world to generate a game image. The background image data Dbo2 is data for arranging a background of the second exemplary game in the virtual world to generate a game image.

Figure 22:
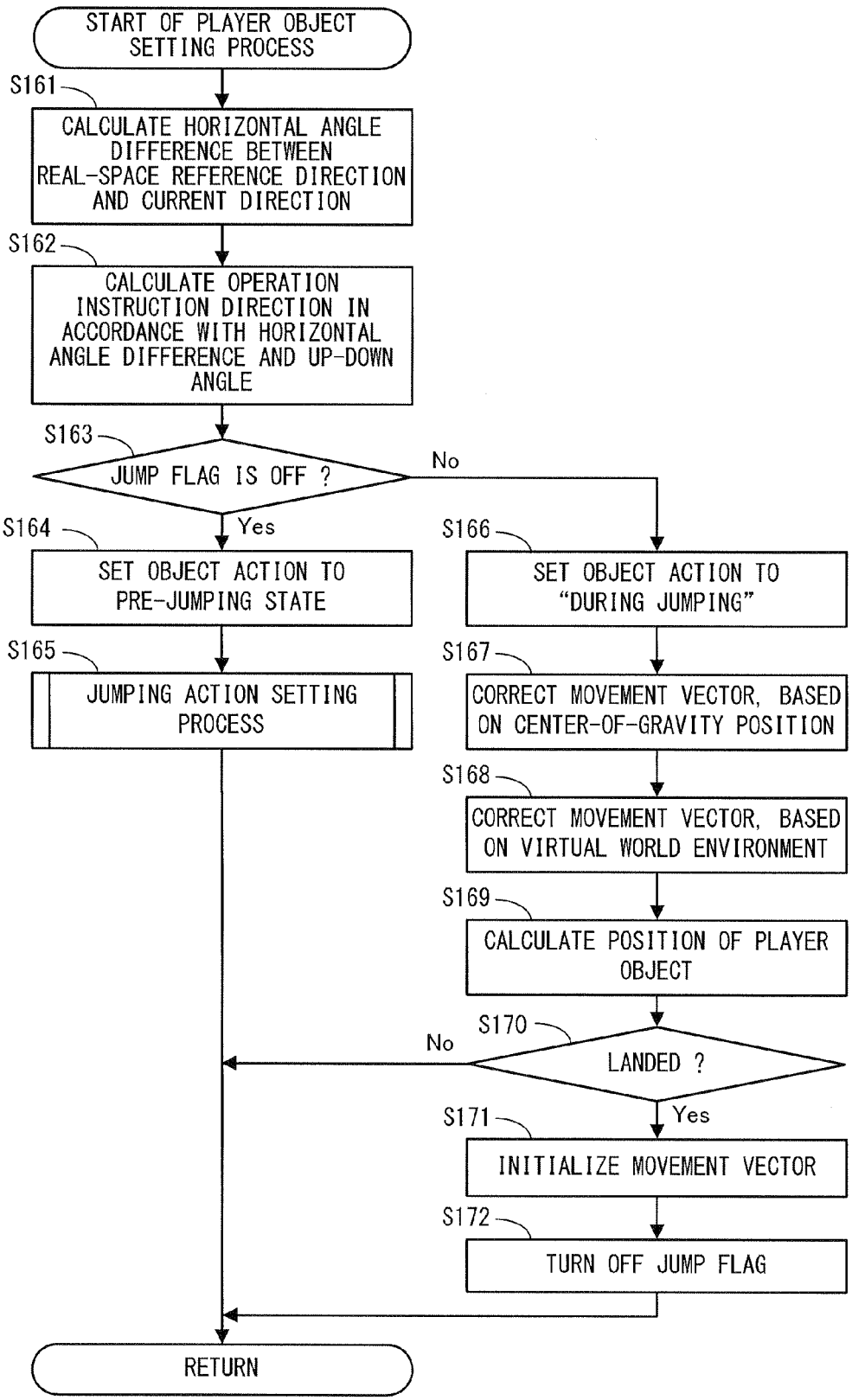
FIG. 22 is a sub-routine illustrating a non-limiting example of a player object setting process according to a second embodiment, which is executed in the game apparatus body 5.
Figure 23:
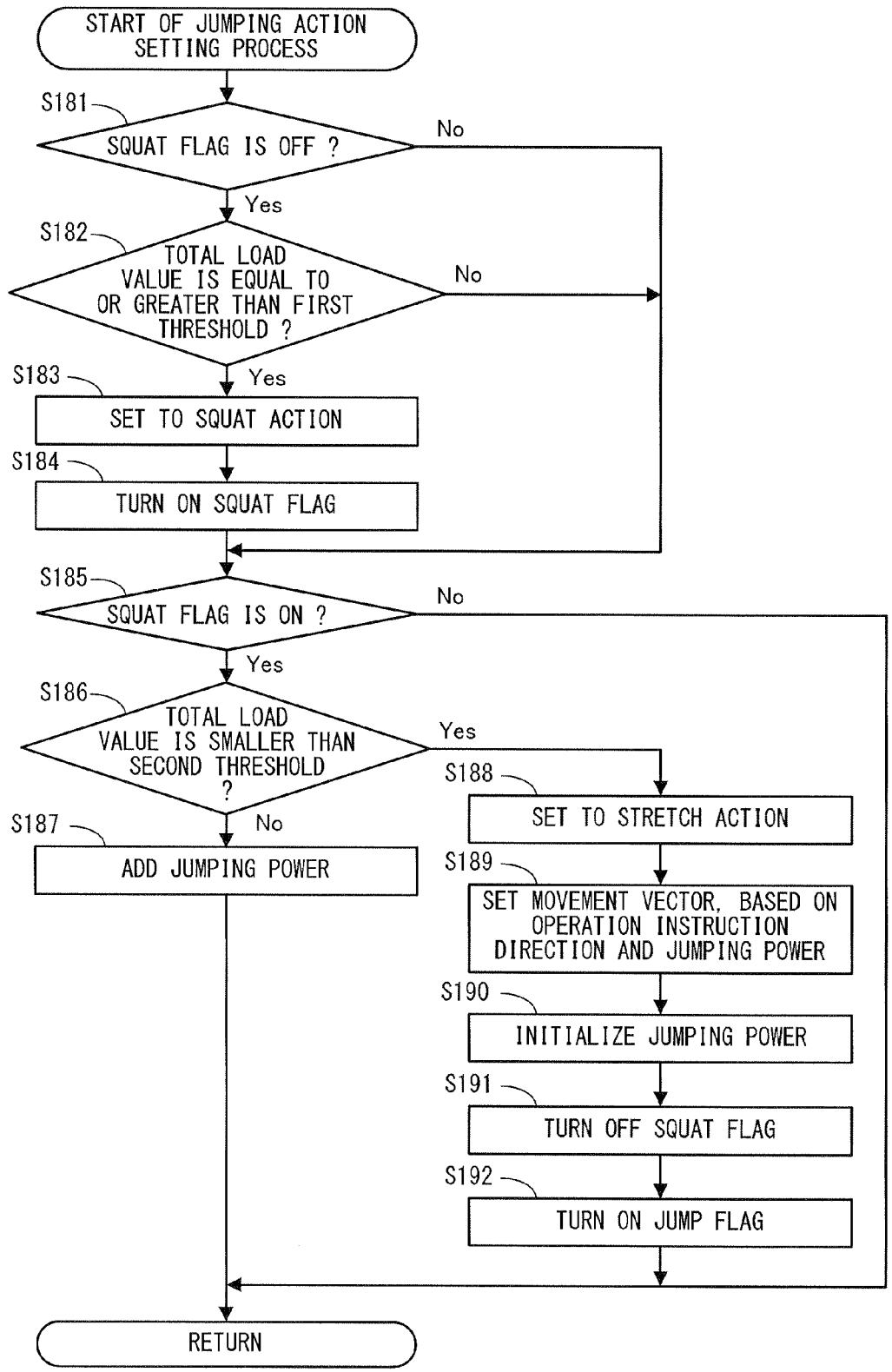
FIG. 23 is a sub-routine illustrating a non-limiting example of a jumping action setting process in step 165 in FIG. 22.
Figure 24:
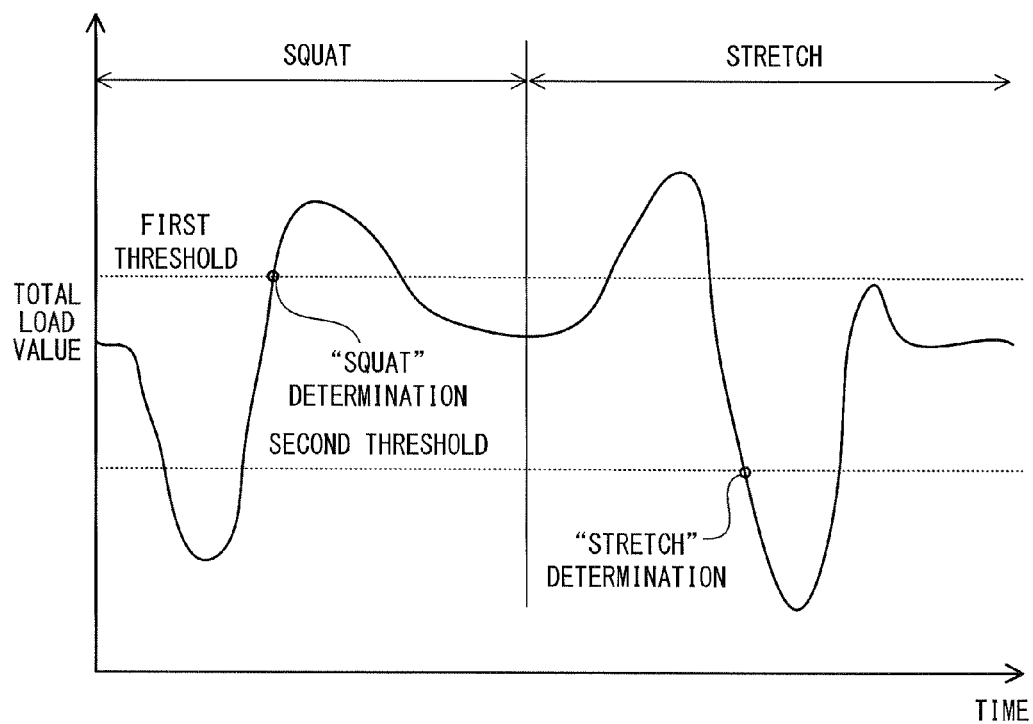
FIG. 24 is a diagram illustrating a non-limiting example of a "squat" determination and a "stretch" determination with respect to variation in a total load value.

Next, the process of the second embodiment, which is performed by the game apparatus body 5, will be described in detail with reference to FIGS. 22 to 24. FIG. 22 is a sub-routine illustrating an example of a player object setting process of the second embodiment executed by the game apparatus body 5. FIG. 23 is a sub-routine illustrating an example of a jumping operation setting process at step 165 in FIG. 22. FIG. 24 is a diagram illustrating an example of "squat" determination and "stretch" determination with respect to variation in the total load value. In the flowcharts of FIGS. 22 and 23, process steps for causing the player object Po to move and displaying the same, in accordance with an operation performed by a user using the terminal device 6 and the board type controller 9, will be mainly described among the whole process, while detailed description of other process steps is not given. Further, in FIGS. 22 to 23, each of the steps executed by the CPU 10 is abbreviated as "S".

When the game apparatus body 5 is powered on, the CPU 10 of the game apparatus body 5 executes a boot program stored in the ROM/RTC 13 to initialize each unit such as the main memory. Then, the information processing program stored in the optical disc 4 is loaded to the main memory, and the CPU 10 starts to execute the program. The process of the second embodiment to be performed after completion of the above-mentioned process steps is identical to the process of the first embodiment except the game control process at step 44 in the main flow shown in FIG. 12. Therefore, the identical part of the process is not repeatedly described. Further, the game control process at step 44 according to the second embodiment is identical to the sub-routine of FIG. 13 of the first embodiment except the player object setting process at step 83, and except that the movement trajectory setting process at step 85 is not performed. Therefore, the identical part of the process is not repeatedly described. Hereinafter, the player object setting process at step 83 according to the second embodiment will be described with reference to FIG. 22.

In FIG. 22, the CPU 10 calculates a horizontal angular difference between the real space reference direction and the current direction (step 161), and proceeds to the next step. The horizontal angular difference is an angular difference which is obtained by projecting an angular difference between the real space reference direction and the current direction in the real space on the horizontal plane, as in the first embodiment. The horizontal angular difference indicates an angle at which the direction of the terminal device 6 (the direction in which the back surface of the terminal device 6 faces (the z-axis positive direction shown in FIG. 3)) is changed from the initial attitude of the terminal device 6 around vertical direction in the real space. For example, the CPU 10 calculates a horizontal angular difference by using the real space reference direction represented by the real space reference direction data Dbe1, and the current direction represented by the current direction data Dbe2.

Next, the CPU 10 calculates an operation instruction direction with respect to the virtual world reference direction, in accordance with the horizontal angular difference and the attitude (up/down angle) of the terminal device 6 in the up-down direction (step 162), and proceeds to the next step. For example, the CPU 10 calculates, based on the virtual world reference direction represented by the virtual world reference direction data Dbf1, an operation instruction direction in the virtual world such that an angular difference which occurs when the virtual world reference direction and the operation instruction direction are projected on the horizontal plane in the virtual world is equal to the horizontal angular difference, and the same positional relation is achieved between the real space and the virtual world (i.e., if the current direction rotates to the left with respect to the real space reference direction, the operation instruction direction also rotates to the left with respect to the virtual world reference direction). Further, the CPU 10 calculates, based on the current direction represented by the current direction data Dbe2, an operation instruction direction in the virtual world such that an angular difference between the horizontal direction and the operation instruction direction in the virtual world is equal to an angular difference between the horizontal direction and the current direction in the real space, and the same positional relation is achieved between the real space and the virtual world (that is, if the current direction is the downward direction with respect to the horizontal direction in the real space, the operation instruction direction is also the downward direction with respect to the horizontal direction in virtual world). Then, the CPU 10 updates the operation instruction direction data Dbf2 by using the calculated operation instruction direction.

In the setting of the operation instruction direction at step 162, a range in which the operation instruction direction can be set may be limited. For example, the operation instruction direction may be set within a predetermined angular range on the left side and the right side of the virtual world reference direction with respect to the horizontal direction in the virtual world, and within a predetermined angular range on the upper side and the lower side of the horizontal direction with respect to the vertical direction in the virtual world. In this case, if the calculated operation instruction direction is outside the above-mentioned angular range, the operation instruction direction is shifted into the angular range closest to the calculated operation instruction direction. In another example, a current direction may be set within a predetermined angular range on the left side and the right side of the real space reference direction with respect to the horizontal direction in the real space, and within a predetermined angular range on the upper side and the lower side of the horizontal direction with respect to the vertical direction in the real space. If the calculated current direction is outside the above-mentioned angular range, the current direction is shifted into the angular range closest to the calculated current direction. Also in this case, since the operation instruction direction is calculated based on the current direction limited within the angular range, the operation instruction direction is also set within the angular ranges set in the upward, downward, leftward, or rightward direction.

Next, the CPU 10 determines whether or not the jump flag is set to OFF (step 163). For example, when the jump flag represented by the jump flag data Dbm is set to OFF, the CPU 10 determines that the player object Po is not jumping, and proceeds to step 164. On the other hand, when the jump flag represented by the jump flag data Dbm is set to ON, the CPU 10 determines that the player object Po is jumping, and proceeds to step 166.

In step 164, the CPU 10 sets the object action in a pre jumping state, and proceeds to next step. For example, the CPU 10 sets the action of the player object Po in a pre-jumping state (e.g., a state in which the player object Po lands on the ground in the virtual world and tries to take a next jump), and updates the action/attitude data Dbg by using the set action.

Next, the CPU 10 performs a jumping action setting process (step 165), and ends the process of this sub-routine. Hereinafter, the jumping action setting process performed at step 165 will be described with reference to FIG. 23.

In FIG. 23, the CPU 10 determines whether or not the squat flag represented by the squat flag data Dbn is set to OFF (step 181). When the squat flag is set to OFF, the CPU 10 proceeds to step 182. On the other hand, when the squat flag is set to ON, the CPU 10 proceeds to step 185.

In step 182, the CPU 10 determines whether or not the total load value is equal to or greater than a first threshold. For example, the CPU 10 determines whether or not the latest total load value represented by the load value data Dbc is equal to or greater than the first threshold. The first threshold is a threshold value for determining that the user performs an action of squatting down on the board type controller 9. For example, the first threshold is set at a value obtained by adding a predetermined rate (e.g., 20%) to the weight of the user on the board type controller 9. The weight of the user on the board type controller 9 may be calculated based on the total load value (e.g., an average of total load values obtained in a predetermined period), or may be previously inputted by the user. When the total load value is equal to or greater than the first threshold, the CPU 10 proceeds to step 183. On the other hand, when the total load value is smaller than the first threshold, the CPU 10 proceeds to step 185.

When the user performs an action of bending and stretching (jumping) on the board type controller 9, it is general that the user firstly takes an action of squatting on the board type controller 9 and then takes an action of stretching upward. As shown in FIG. 24, when the user takes an action of squatting on the board type controller 9, the total load value once falls below the weight of the user and thereafter exceeds the weight. That is, the CPU 10 can detect that the user has performed an action of squatting, by detecting that the total load value exceeds the weight of the user (the total load value becomes equal to or greater than the first threshold).

In step 183, the CPU 10 sets the object action to the squatting action, and proceeds to the next step. For example, the CPU 10 sets the action of the player object Po to the squatting action (e.g., a state in which the player object Po squats on the pogo stick for a next jump, with the pogo stick landing on the ground in the virtual world), and updates the action/attitude data Dbg by using the set action.

Next, the CPU 10 sets the squat flag to ON (step 184), and proceeds to step 185. For example, the CPU 10 sets the squat flag represented by the squat flag data Dbn to ON.

In step 185, the CPU 10 determines whether or not the squat flag represented by the squat flag data Dbn is set to ON. When the squat flag is set to ON, the CPU 10 proceeds to step 186. On the other hand, when the squat flag is set to OFF, the CPU 10 ends the process of this sub-routine.

In step 186, the CPU 10 determines whether or not the total load value is smaller than a second threshold. For example, the CPU 10 determines whether or not the latest total load value represented by the load value data Dbc is smaller than the second threshold. The second threshold is a threshold value for determining that the user performs an action of stretching on the board type controller 9. For example, the second threshold is set at a value obtained by subtracting a predetermined rate (e.g., 20%) from the weight of the user on the board type controller 9. When the total load value is equal to or greater than the second threshold, the CPU 10 proceeds to step 187. On the other hand, when the total load value is smaller than the second threshold, the CPU 10 proceeds to step 188.

When the user performs an action of bending and stretching (jumping) on the board type controller 9, it is general that the user firstly takes an action of squatting on the board type controller 9 and then takes an action of stretching upward. As shown in FIG. 24, when the user takes an action of stretching on the board type controller 9, the total load value once exceeds the weight of the user and thereafter falls below the weight. That is, the CPU 10 can detect that the user has performed an action of stretching, by detecting that the total load value falls below the weight of the user (the total load value becomes smaller than the second threshold) after the detection of the squatting action.

In step 187, the CPU 10 adds a jumping power, and ends the process of this sub-routine. For example, the CPU 10 adds a predetermined amount to the parameter of the jumping power represented by the jumping power data Dbk, and updates the jumping power data Dbk by using the parameter of the jumping power after the addition. The process at step 187 is performed when the determination result is positive (i.e., the squat flag is ON) at step 185, and the determination result is negative (i.e., the total load value is equal to or greater than the second threshold) at step 186. That is, the process at step 187 is performed during a period from when the user squats to when it is determined that the user stretches. The longer the period ("squat" period) is, the more the jumping power is increased gradually.

On the other hand, in step 188, the CPU 10 sets the object action to the stretching action, and proceeds to the next step. For example, the CPU 10 sets the action of the player object Po to the stretching action (e.g., an action of jumping into the air with the pogo stick from the state in which the pogo stick lands on the ground in the virtual world), and updates the action/attitude data Dbg by using the set action.

Next, the CPU 10 sets a movement vector of the player object Po, based on the operation instruction direction and the jumping power (step 189), and proceeds to the next step. For example, the CPU 10 calculates a movement speed of the player object Po, based on the parameter of the jumping power represented by the jumping power data Dbk. In an example, the CPU 10 calculates a movement speed of the player object Po so as to be proportional to the parameter of the jumping power. Further, the CPU 10 sets a movement direction of the player object Po, based on the operation instruction direction represented by the operation instruction direction data Dbf2. For example, a movement direction is set such that a horizontal movement direction obtained by projecting the movement direction on the horizontal plane in the virtual world is equal to a horizontal operation instruction direction obtained by projecting the operation instruction direction on the horizontal plane in the virtual world. Further, a climb angle in the movement direction, at which the player object Po moves upward in the virtual world, is set to a specific angle. Then, the CPU 10 calculates a movement vector in the virtual world by using the movement speed and the movement direction of the player object Po, and updates the movement vector data Dbh by using the calculated movement vector. For example, the CPU 10 sets a length of the movement vector by using the calculated movement speed of the player object Po, and sets a direction of the movement vector based on the operation instruction direction represented by the operation instruction direction data Dbf2.

Next, the CPU 10 initializes the jumping power (step 190), and proceeds to the next step. For example, the CPU 10 initializes the parameter of the jumping power represented by the jumping power data Dbk to a predetermined initial value, thereby to update the jumping power data Dbk. The initial value at step 190 may be a value indicating that the jumping power is 0, or may be a value indicating a relatively low jumping power.

Next, the CPU 10 sets the squat flag to OFF (step 191), and proceeds to the next step. For example, the CPU 10 sets the squat flag represented by the squat flag data Dbn to OFF.

Next, the CPU 10 sets the jump flag to ON (step 192), and ends the process of this sub-routine. For example, the CPU 10 sets the jump flag represented by the jump flag data Dbm to ON.

Referring back to FIG. 22, when it is determined at step 163 that the jump flag is ON, the CPU 10 sets the object action to "during jumping" (step 166), and proceeds to the next step. For example, the CPU 10 sets the action of the player object Po to "during jumping" (e.g., a state in which the player object Po on the pogo stick moves in the air in the virtual world), and updates the action/attitude data Dbg by using the set action.

Next, the CPU 10 corrects the movement vector of the player object Po based on the center-of-gravity position (step 167), and proceeds to the next step. For example, the CPU 10 corrects the movement vector represented by the movement vector data Dbh by using the latest center-of-gravity position represented by the center-of-gravity position data Dbd, and updates the movement vector data Dbh by using the corrected movement vector. In an example, the CPU 10 calculates a correction vector extending from the center of the platform 9*a* to the center-of-gravity position, and adds the correction vector to the movement vector that is currently set to correct the movement vector. The length of the correction vector may be a value obtained by multiplexing the distance between the center of the platform 9*a* and the center-of-gravity position by a predetermined constant, or may be a fixed value. For example, if the center-of-gravity position is present on a position shifted by a distance D from the center of the platform 9*a* to the left, a correction vector having a length according to the distance D in the leftward direction in the virtual world is calculated, and added to the currently set movement vector. Thereby, the movement vector is corrected toward the position where the center-of-gravity position is present by an amount according to the distance between the center of the platform 9*a* and the center-of-gravity position.

Next, the CPU 10 corrects the movement vector of the player object Po based on the environment set in the virtual world (step 168), and proceeds to the next step. For example, the CPU 10 corrects the movement vector represented by the movement vector data Dbh, based on the environment (gravity, wind, influence of other objects, and the like) set in the virtual world, and updates the movement vector data Dbh by using the corrected movement vector.

Next, the CPU 10 calculates a position of the player object Po (step 169), and proceeds to the next step. For example, the CPU 10 causes the position of the player object Po represented by the position data Dbi to shift in the virtual world, based on the movement vector represented by the movement vector data Dbh, and updates the position data Dbi by using the position after the shifting.

Next, the CPU 10 determines whether or not the player object Po has landed from the air in the virtual world (step 170). For example, the CPU 10 determines whether or not the player object Po has landed (e.g., the position of the player object Po is on a topography object or another object in the virtual world) based on the position of the player object Po represented by the position data Dbi. When the result of the determination is that the player object Po has landed, the CPU 10 proceeds to step 171. On the other hand, when the result of the determination is that the player object Po has not landed, the CPU 10 ends the process of this sub-routine.

In step 171, the CPU 10 initializes the movement vector of the player object Po, and proceeds to the next step. For example, the CPU 10 initializes the movement vector represented by the movement vector data Dbh to update the movement vector data Dbh. In step 171, the movement vector may be initialized to a parameter indicating that the player object Po does not move, or may be initialized to a predetermined movement vector.

Next, the CPU 10 sets the jump flag to OFF (step 172), and ends the process of this sub-routine. For example, the CPU 10 sets the jump flag represented by the jump flag data Dbm to OFF.

In the virtual camera setting process (step 84) of the second embodiment, a first virtual camera for generating a terminal game image is set such that a first player object Po1 arranged in the virtual world is included in the display range, based on the operation instruction direction represented by the operation instruction direction data Dbf2. Specifically, as described with reference to FIG. 20, when the operation instruction direction is the horizontal direction in the virtual world, the operation instruction direction is regarded as the line-of-sight direction, and the player object Po is arranged substantially in the center of the view volume, and the first virtual camera is set at the subjective position near the player object Po. When the operation instruction direction is the vertical direction in the virtual world, the operation instruction direction is regarded as the line-of-sight direction, and a position in front of the player object Po in the movement direction of the player object Po is regarded as a point of view, and the first virtual camera is set at the overhead position at which the first virtual camera views the player object Po from above. When the operation instruction direction is between the horizontal direction and the vertical direction, the attitude and the position of the first virtual camera are also changed from the subjective position to the overhead position in accordance with the direction of the operation instruction direction. On the other hand, a second virtual camera for generating a monitor game image is set in the same virtual world as the first virtual camera such that a state of the virtual world in which the player object Po is viewed from a distance in a manner of bird's eye viewing is included in the monitor game image. The CPU 10 sets the positions of the first virtual camera and the second virtual camera in the virtual world (the parameters of the first virtual camera and the second virtual camera), based on the position of the player object Po represented by the position data Dbi and the operation instruction direction represented by the operation instruction direction data Dbf2.

In the monitor game image generation process (step 45) and the terminal game image generation process (step 46) of the second embodiment, images representing the result of the game control process are generated, respectively, as in the first embodiment. For example, the monitor game image is generated as a three-dimensional CG image which is generated through the steps of: arranging the second virtual camera in the virtual world based on the parameters relating to the second virtual camera, which are represented by the virtual camera data Dbj; arranging the player object Po and the like in the virtual world based on the action/attitude data Dbg and the position data Dbi; and calculating a scene of the virtual world viewed from the second virtual camera. The terminal game image is generated as a three-dimensional CG image which is generated through the steps of: arranging the first virtual camera in the virtual world based on the parameters relating to the first virtual camera, which are represented by the virtual camera data Dbj; arranging the player object Po and the like in the virtual world based on the action/attitude data Dbg and the position data Dbi; and calculating a scene of the virtual world viewed from the first virtual camera.

In this way, according to the above-mentioned process, when the user performs an operation based on his/her action on the board type controller 9 and thereby a process based on the user's action is performed, the user is allowed to view the result of the process on the LCD 61 of the portable terminal device 6 held by the user. Therefore, the user, who performs an action with the terminal device 6 in his/her hands, is allowed to view the result of the process in a favorable situation for the user. Further, since the user is allowed to control the position and the attitude of the virtual camera or the attitude and the movement direction of the player object Po by moving the portable terminal device 6, it is possible to provide the user with a sense of presence in the virtual world, and with an operation sense of becoming the player object Po. Furthermore, in the second exemplary game, the movement direction of the player object Po is determined based on the attitude of the portable terminal device 6, but the movement direction after the player object Po has jumped is adjusted in accordance with the action of the user on the board type controller 9. Accordingly, the movement direction of the player object Po can be changed not only by an operation using the terminal device 6 but also by an operation using the board type controller 9, which provides the user with a new operation sense.

Third Embodiment

Hereinafter, information processing according to a third embodiment will be described based on another exemplary game which is played by using the terminal device 6 and the board type controller 9. In the following description of the outline of the information processing according to the third embodiment, a third exemplary game is adopted as an example of the information processing. Since an information processing apparatus for executing an information processing program according to the third embodiment, and an information processing system including the information processing apparatus are identical to those of the first embodiment, the same components as those of the first embodiment are designated by the same reference numerals, and the detailed description thereof is omitted.

Figure 25A:
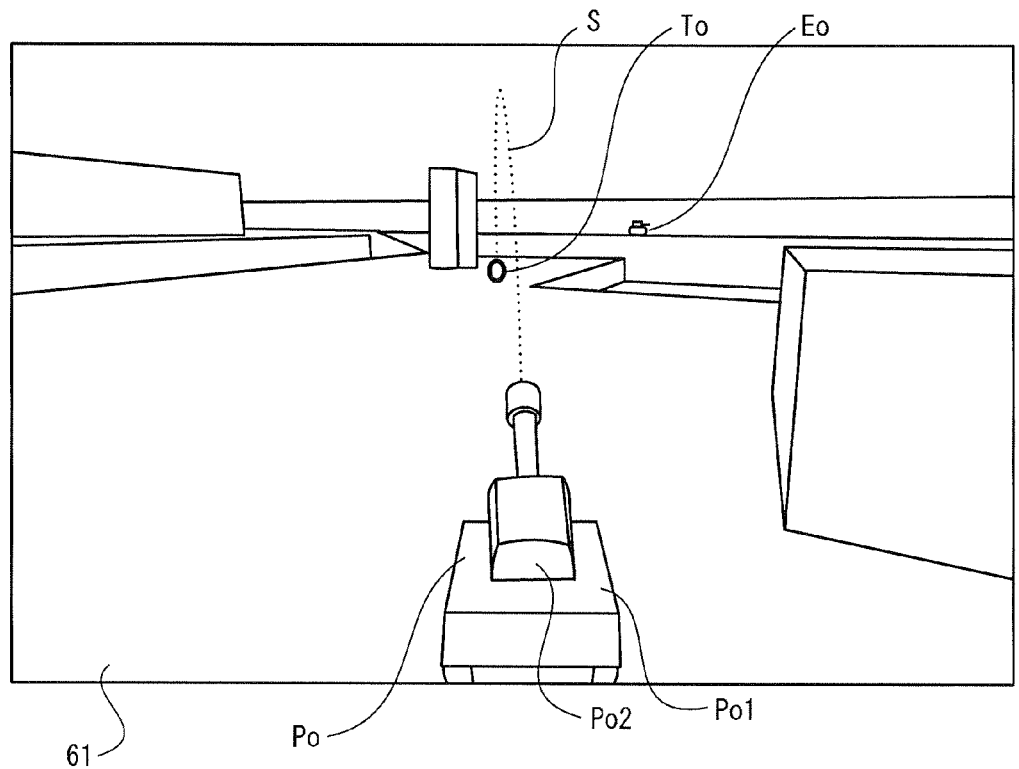
FIG. 25A is a diagram illustrating a non-limiting example of an image displayed on the LCD 61 of the terminal device 6 in a third exemplary game.
Figure 25B:
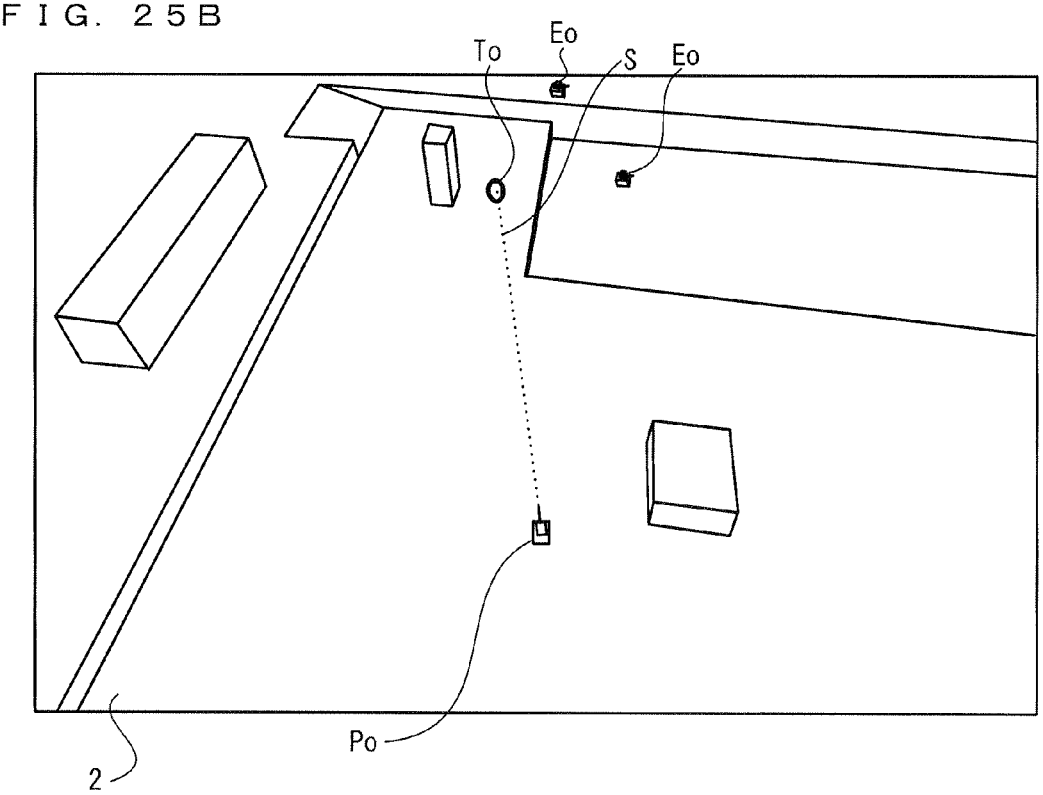
FIG. 25B is a diagram illustrating a non-limiting example of an image displayed on the monitor 2 in the third exemplary game.
Figure 26:
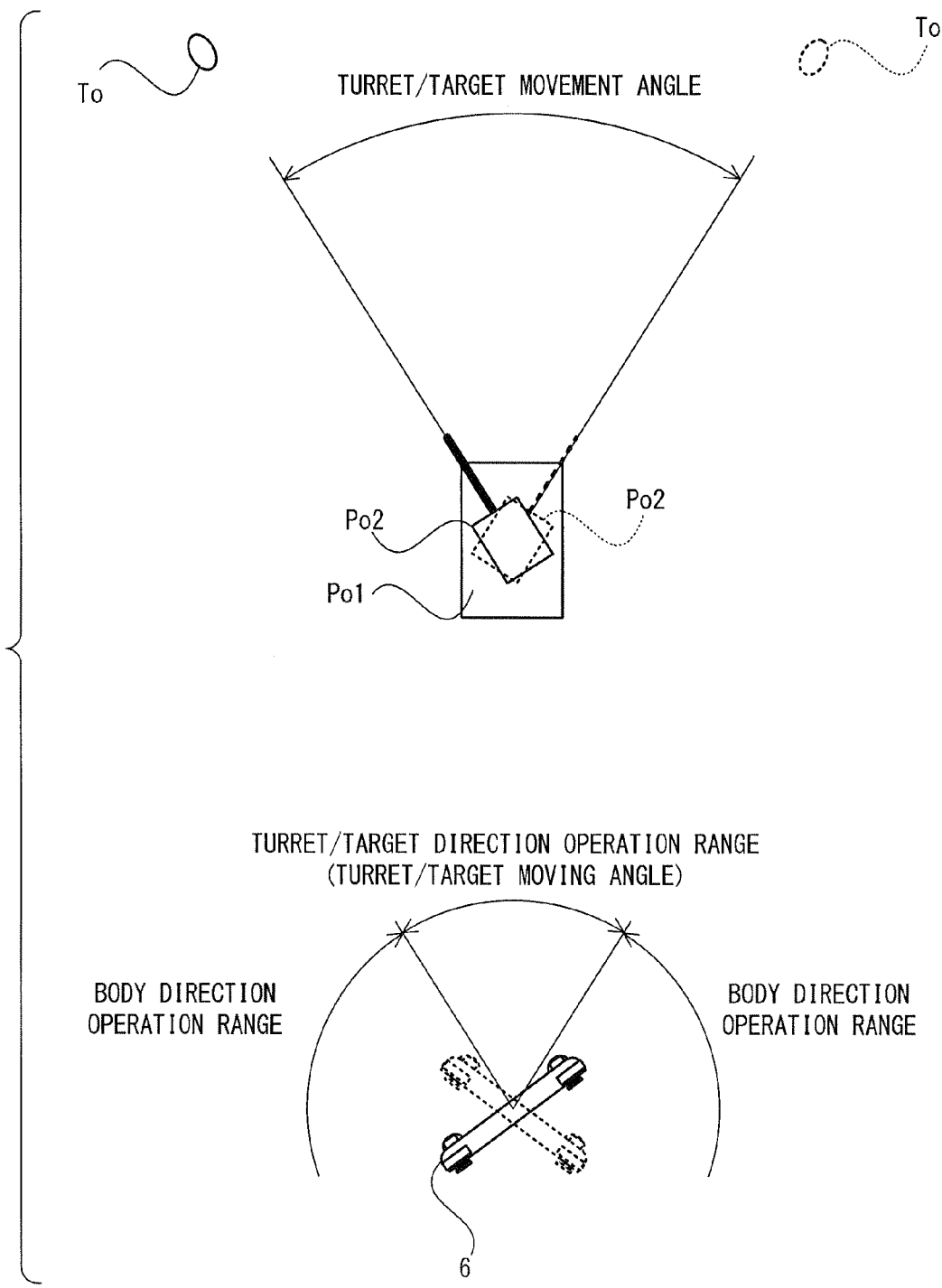
FIG. 26 is a schematic diagram illustrating a non-limiting example of actions of a first player object Po1 and a second player object Po2 in accordance with the attitude of the terminal device 6.

Firstly, an outline of information processing performed on the game apparatus body 5 will be described with reference to FIGS. 25A, 25B, and 26 before a specific description of processes of the third embodiment performed by the game apparatus body 5 is given. In the following description of the outline of the information processing according to the third embodiment, a third exemplary game is adopted as an example of the information processing. FIG. 25A shows an example of an image displayed on the LCD 61 of the terminal device 6 in the third exemplary game. FIG. 25B shows an example of an image displayed on the monitor 2 in the third exemplary game. FIG. 26 is a schematic diagram illustrating an example of actions of a first player object Po1 and a second player object Po2 in accordance with the attitude of the terminal device 6.

In the third exemplary game, as in the first exemplary game shown in FIG. 9, a user performs an operation by using the terminal device 6 and the board type controller 9. Specifically, as in the first exemplary game, the user stands on the board type controller 9 with the terminal device 6 in his/her hands, and performs an operation. Then, the user performs an action on the board type controller 9 (e.g., an action of placing his/her weight forward and backward on the board type controller 9), and performs an operation to move the terminal device 6, while viewing the image displayed on the monitor 2 and the image displayed on the LCD 61 of the terminal device 6, thereby playing the game. On the LCD 61 of the terminal device 6 and on the monitor 2, a game image is displayed, in which the first player object Po1, the second player object Po2, and a target object To each perform an action in a virtual world (e.g., an action of the first player object Po1 to change its attitude and movement direction, an action of the second player object Po2 to change its direction, or an action of the target object To to move) in accordance with the direction and the attitude of the terminal device held by the user, and the action of the user on the board type controller 9, and furthermore, the position and the attitude of a virtual camera set in the virtual world are changed in accordance with the position and the attitude of the first player object Po1.

As shown in FIG. 25A, on the LCD 61 of the terminal device 6, a player object Po moving in a virtual world is displayed. In the example shown in FIG. 25A, the player object Po includes two player objects (a first player object Po1 and a second player object Po2). As an example of the player object Po, a tank moving on the ground in the virtual world is displayed. Specifically, the first player object Po1 corresponds to the body of the tank, and the second player object Po2 corresponds to a turret of the tank. A virtual camera is located near the back of the first player object Po, and a state of the virtual world viewed from the virtual camera is displayed together with the player object Po. Further, in the example shown in FIG. 25A, the target object To, which is a target of a shell shot by the tank, is arranged in the virtual world, and an expected trajectory S of the shell from a front end of the turret (second player object Po2) of the tank to the target object to is displayed. An enemy object Eo, which is an enemy of the player object Po, is arranged in the virtual world. Displaying, on the LCD 61, the virtual world viewed from near the back of the player object Po (specifically, the first player object Po1) allows the user holding the terminal device 6 to experience a sense of presence in the virtual world, and to intuitively know the movement direction and the movement speed of the player object Po.

Further, as shown in FIG. 25B, the same virtual world as that displayed on the LCD 61 is displayed on the monitor 2. In the example shown in FIG. 25B, a state of the virtual world in which the player object Po is viewed from a distance in a manner of bird's eye viewing, is displayed together with the player object Po, the target object To, the enemy object Eo, and the expected trajectory S. Displaying, on the monitor 2, the state of the virtual world in which the player object Po is viewed from a distance allows the user to easily know the surroundings of the player object Po, and allows another person who watches the user's playing the third exemplary game to enjoy a view in which the player object Po moves in the virtual world.

For example, when the user performs an action to shift forward the center-of-gravity position of a load the user applies to the board type controller 9, the player object Po moves forward in the direction of the first player object Po1 at a speed according to a forward length from the center of the platform 9a to the center-of-gravity position. When the user performs an action to shift backward the center-of-gravity position of the load the user applies to the board type controller 9, the player object Po moves backward in the direction of the first player object Po1 at a speed according to a backward length from the center of the platform 9a to the center-of-gravity position. In this way, the user is allowed to move the player object Po forward and backward in accordance with his/her action on the board type controller 9.

When the user changes the attitude of the terminal device 6 or rotates the terminal device 6 to change the direction of the terminal device 6, the direction of the player object Po and the position of the target object To change. Specifically, as shown in FIG. 26, when the direction of the terminal device 6 rotates within a turret/target direction operation range corresponding to a turret/target movement angle range, the second player object Po2 (turret) rotates to the left or to the right in the virtual world, and the position of the target object To, which is a target of a shell shot from the turret, also moves in the virtual world. When the direction of the terminal device 6 rotates into a body direction operation range corresponding to a range outside the turret/target movement angle range, the first player object Po1 (the tank body) as well as the second player object Po2 rotate to the left or to the right in the virtual world in accordance with the change in the direction of the terminal device 6, and further, position of the target object To also shifts in the virtual world in accordance with the rotation of the second player object Po2. Since the virtual camera is set near the back of the first player object Po1 as described above, the attitude and the position of the virtual camera change with the change in the direction of the first player object Po1. Accordingly, when the user changes the left-right direction of the terminal device 6 within the turret/target direction operation range in the real space, the user is allowed to change the position of the target object To without changing the position and the attitude of the virtual camera, and therefore, the user is allowed to adjust the target position with the game screen displayed on the LCD 61 being fixed. That is, the operation using the terminal device 6 within the turret/target direction operation range provides the user with favorable operation environment for adjusting the position of the target object To to attack the enemy object Eo. Further, when the user changes the direction of the terminal device 6 to the left or to the right in the body direction operation range in the real space, the user is allowed to change the direction of the first player object Po1 and the position and the direction of the virtual camera. Therefore, the user is allowed to change the movement direction of the player object Po, and adjusts the target position to the outside of the game screen displayed on the LCD 61. In this way, setting at least two operation ranges allows the user to perform various operations by using the attitude of a single device.

When the direction of the terminal device 6 changes upward or downward, the direction of the turret (second player object Po2) changes upward or downward in the virtual world with the change in the direction of the terminal device 6, and the position of the target object To, which is a target of a shell shot from the turret, also changes in the virtual world. That is, the user is allowed to change the direction of the turret (the position of the target object To) upward, downward, leftward, and rightward in accordance with the direction of the terminal device 6. Thus, the user is allowed to direct the turret (the arrange the target object To)

to his/her desired direction (position) by only changing the direction of the terminal device 6.

Figure 27:
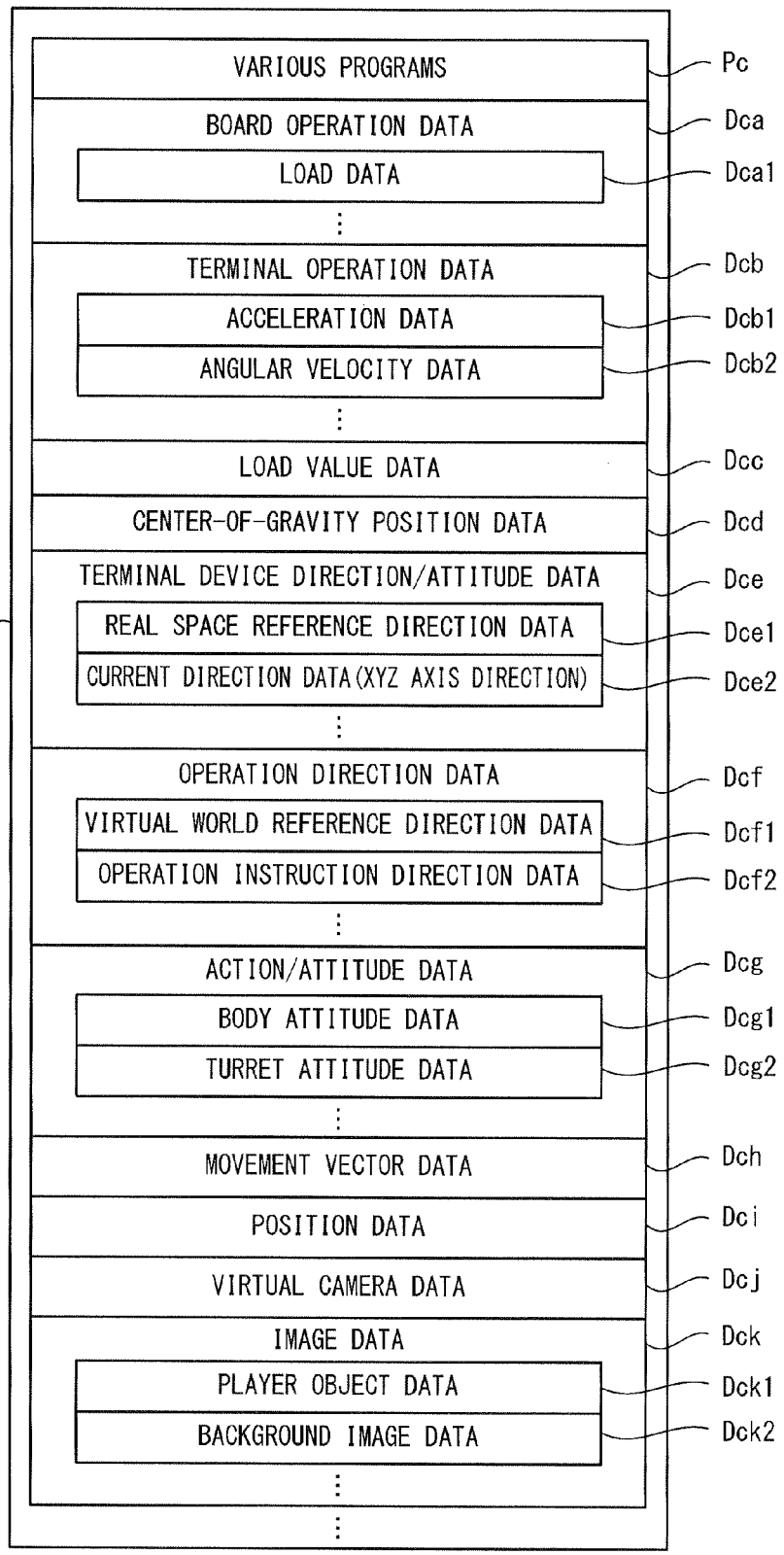
FIG. 27 is a diagram illustrating a non-limiting example of main data and programs stored in the main memory of the game apparatus body 5 in the third exemplary game.

Next, the process of the third embodiment, which is performed by the game system 1, will be described in detail. First, main data used in the process according to the third embodiment will be described with reference to FIG. 27. FIG. 27 is a diagram illustrating an example of main data and programs stored in the main memory of the game apparatus body 5 of the third embodiment.

As shown in FIG. 27, in a data storage area of the main memory, board operation data Dca, terminal operation data Dcb, load value data Dcc, center-of-gravity position data Dcd, terminal device direction/attitude data Dce, operation direction data Dcf, action/attitude data Dcg, movement vector data Dch, position data Dci, virtual camera data Dcj, image data Dck, and the like are stored. In addition to the data shown in FIG. 27, data required for a game process, such as image data of various objects displayed on the monitor 2 and the LCD 61, and sound data used for a game, are optionally stored in the main memory. In a program storage area of the main memory, various programs Pc constituting an information processing program of the third embodiment are stored.

The board operation data Dca includes load data Dca1 and the like. Since the load data Dca1 is identical to the load data Daa1 of the first embodiment, repeated description is not necessary.

The terminal operation data Dcb includes acceleration data Dcb1, angular velocity data Dcb2, and the like. Since the acceleration data Dcb1 and the angular velocity data Dcb2 are identical to the acceleration data Dab1 and the angular velocity data Dab2 of the first embodiment, respectively, repeated description is not necessary.

Since the load value data Dcc and the center-of-gravity position data Dcd are identical to the load value data Dac and the center-of-gravity position data Dad of the first embodiment, respectively, repeated description is not necessary.

The terminal device direction/attitude data Dce includes real space reference direction data Dce1, current direction data Dce2, and the like. As in the first embodiment, the real space reference direction data Dce1 is data representing the reference direction of the terminal device 6 in the real space, and the current direction data Dce2 is data representing the direction and the attitude of the terminal device 6 at the current time in the real space. However, in the third embodiment, the respective direction data are subjected to various corrections. Methods of calculating the real space reference direction and the current direction according to the third embodiment will be described later.

The operation direction data Dcf includes virtual world reference direction data Dcf1, operation instruction direction data Dcf2, and the like. The virtual world reference direction data Dcf1 is data representing a virtual world reference direction set in the virtual world. The operation instruction direction data Dcf2 is data representing an operation instruction direction which is currently instructed in the virtual world by the user. Methods for calculating the virtual world reference direction and the operation instruction direction of the third embodiment will be described later.

The action/attitude data Dcg includes body attitude data Dcg1 and turret attitude data Dcg2, and the like. The body attitude data Dcg is data representing the action and the attitude of the first player object Po1 (tank body) in the virtual world. The turret attitude data Dcg2 is data representing the action and the attitude of the second player object Po1 (turret) in the virtual world.

The movement vector data Dch is data representing the movement speeds and the movement directions of the respective player objects (the first player object Po1 and the second player object Po2) and the shell object as in the first embodiment, although the calculation method thereof is different from that of the first embodiment as described later.

The position data Dci is data representing the positions of the player object Po, the target object To, the shell object and the like in the virtual world. The virtual camera data Dcj is data relating to the virtual camera as in the first embodiment although the calculation method thereof is different from that of the first embodiment as described later.

The image data Dck includes player object data Dck1, background image data Dck2, and the like. The player object data Dck1 is data for arranging the player object Po (the first player object Po1 and the second player object Po2), the target object To, and the shell object of the third exemplary game in the virtual world to generate a game image. The background image data Dck2 is data for arranging a background of the third exemplary game in the virtual world to generate a game image.

Figure 28:
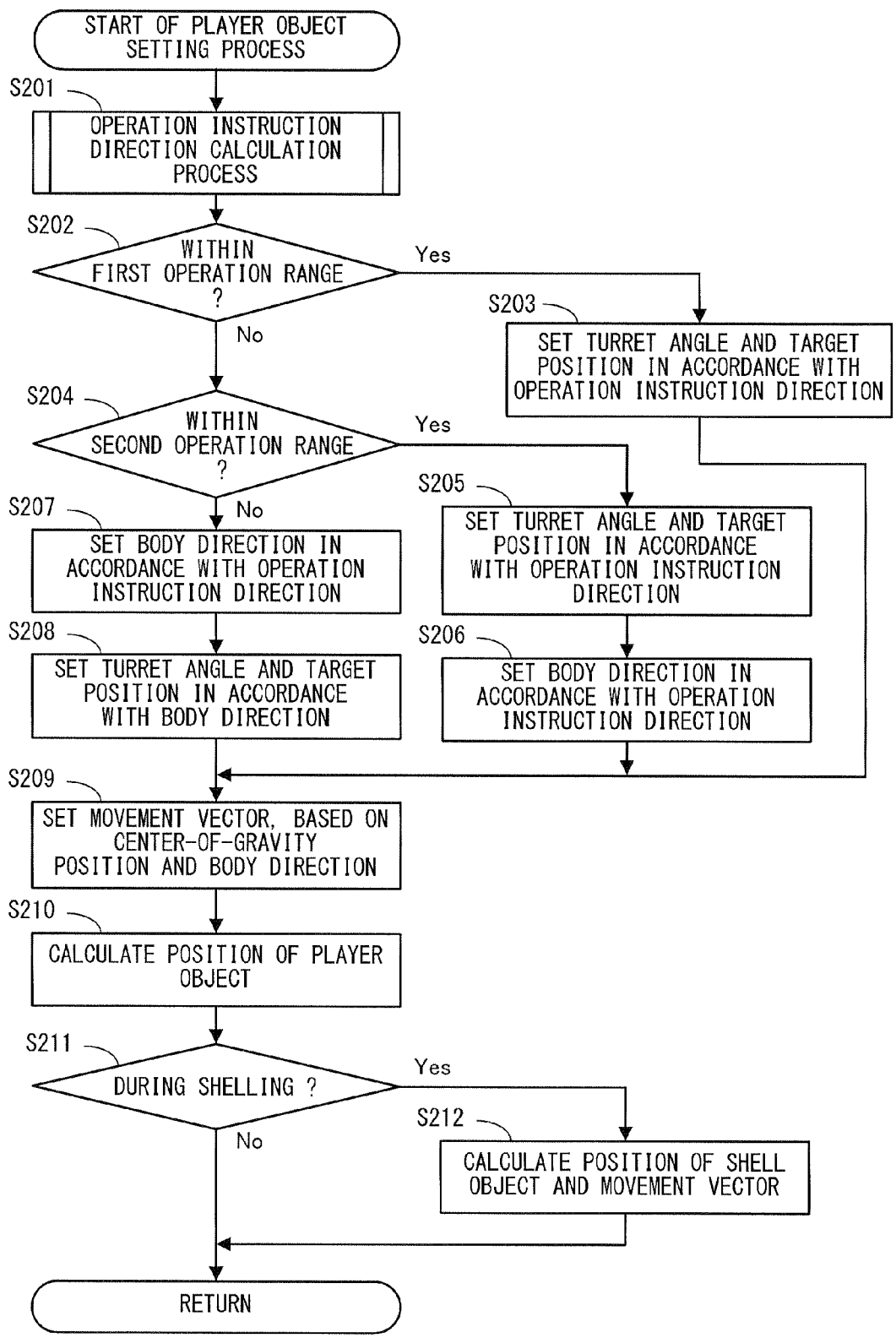
FIG. 28 is a sub-routine illustrating a non-limiting example of a player object setting process according to a third embodiment, which is executed in the game apparatus body 5.
Figure 29:
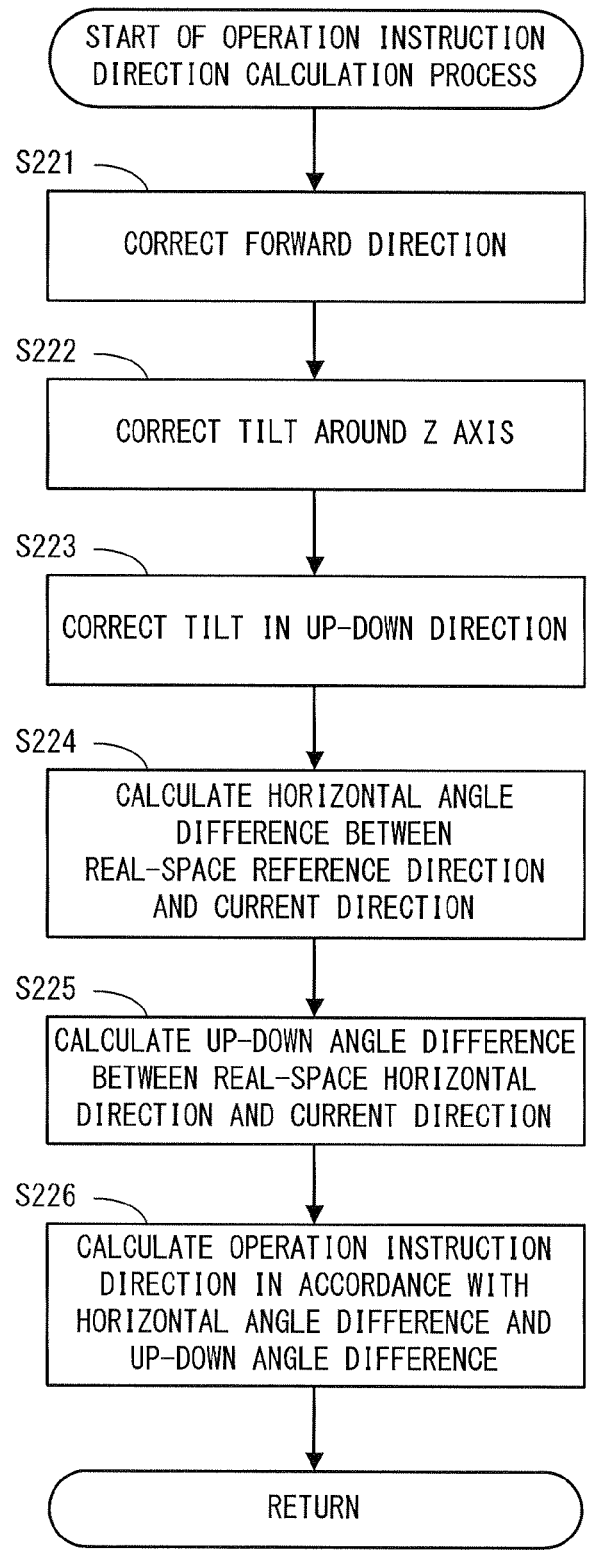
FIG. 29 is a sub-routine illustrating a non-limiting example of an operation direction calculation process in step 201 in FIG. 28.

Next, the process of the third embodiment, which is performed by the game apparatus body 5, will be described in detail with reference to FIGS. 28 and 29. FIG. 28 is a sub-routine illustrating an example of a player object setting process of the third embodiment executed by the game apparatus body 5. FIG. 29 is a sub-routine illustrating an example of an operation instruction direction calculation process at step 201 in FIG. 28. In the flowcharts of FIGS. 28 and 29, process steps for causing the player object Po to move and displaying the same, in accordance with an operation performed by a user using the terminal device 6 and the board type controller 9, will be mainly described among the whole process, while detailed description of other process steps is not given. Further, in FIGS. 28 to 29, each of the steps executed by the CPU 10 is abbreviated as "S".

When the game apparatus body 5 is powered on, the CPU 10 of the game apparatus body 5 executes a boot program stored in the ROM/RTC 13 to initialize each unit such as the main memory. Then, the information processing program stored in the optical disc 4 is loaded to the main memory, and the CPU 10 starts to execute the program. The process of the third embodiment to be performed after completion of the above-mentioned process steps is identical to the process of the main flow of the first embodiment shown in FIG. 12 except the reference direction setting process at step 44 and the game control process at step 45. Therefore, the identical part of the process is not repeatedly described. The game control process at step 44 according to the third embodiment is identical to the sub-routine of the first embodiment shown in FIG. 13 except the player object setting process at step 83, and except that the movement trajectory setting process at step 85 is not performed. Therefore, the identical part of the process is not repeatedly described.

In the main flow of the third embodiment, in the reference direction setting process at step 41, a reference direction is set after the attitude and the direction of the terminal device 6 are subjected to various corrections, and the real space reference direction data Dce1 is updated by using the reference direction after the corrections. Further, the real space reference direction after the corrections is converted into a model coordinate system in the virtual world, and the virtual world reference direction data Dcf1 is updated by using the direction after the conversion, as the reference direction in the virtual world. The methods for correcting the attitude and the direction of the terminal device 6 will be described later. Hereinafter, the player object setting process at step 83 according to the third embodiment will be described with reference to FIG. 28.

In FIG. 28, the CPU 10 performs an operation instruction direction calculation process (step 201), and proceeds to the next step. Hereinafter, the operation instruction direction calculation process at step 201 will be described with reference to FIG. 29.

In FIG. 29, the CPU 10 corrects the forward direction of the terminal device 6 with respect to the upward and downward directions (step 221), and proceeds to the next step. For example, the CPU 10 corrects the direction (attitude) of the terminal device 6 such that a state in which the terminal device 6 tilts downward at a predetermined angle (e.g., 42°) with respect to the horizontal direction in the real space becomes the operation instruction direction in the horizontal direction. Specifically, in step 82, the CPU 10 calculates X-axis, Y-axis, and Z-axis directions of the terminal device 6 in the real space, based on the acceleration represented by the acceleration data Dcb1 and the angular velocity represented by the angular velocity data Dcb2, and updates the current direction data Dce2 by using the calculated X-axis, Y-axis, and Z-axis directions as current directions. Then, in step 221, the CPU 10 corrects the Y-axis direction and the Z-axis direction such that the Y-axis direction and the Z-axis direction tilt upward around the X axis by the above-mentioned predetermined angle (i.e., the Y-axis direction and the Z-axis direction are rotated to the right by the predetermined angle around the X axis as viewed in the X-axis direction), by using the X-axis, Y-axis, and Z-axis directions represented by the current direction data Dce2.

Next, the CPU 10 corrects the tilt of the terminal device 6 around the Z axis (step 222), and proceeds to the next step. For example, the CPU 10 corrects the direction (attitude) of the terminal device 6 such that the X axis of the terminal device 6 becomes the horizontal direction in the real space. Specifically, the CPU 10 forcibly corrects the X-axis direction to the horizontal direction in the real space by using the X-axis, Y-axis, and Z-axis directions corrected in step 221, and newly calculates a Z-axis direction, based on a cross product of the X-axis direction and the Y-axis direction. Then, the CPU 10 newly calculates a Y-axis direction, based on a cross product of the newly calculated Z-axis direction and the X-axis direction corrected to the horizontal direction.

Next, the CPU 10 performs a correction to limit the tilt of the terminal device 6 in the up-down direction of the terminal device 6 (step 223), and proceeds to the next step. For example, the CPU 10 limits the Z-axis direction newly calculated at step 222 into a predetermined range with respect to the up-down direction in the real space. If the Z-axis direction is outside the range, the CPU 10 resets the Z-axis direction in the closest range. Then, the CPU 10 newly calculates a Y-axis direction, based on a cross product of the reset Z-axis direction and the X-axis direction corrected to the horizontal direction at step 222. Further, the CPU 10 newly calculates an X-axis direction, based on a cross product of the newly calculated Y-axis direction and the reset Z-axis direction. Then, the CPU 10 updates the current direction data Dce2 by using the newly calculated X-axis direction and Y-axis direction, and the reset Z-axis direction.

Also in the reference direction setting process at step 41, the X-axis, Y-axis, and Z-axis directions of the terminal device 6 are corrected as in steps 221 to 223, and the real space reference direction data Dce1 is updated by using the corrected Z-axis direction as the real space reference direction.

Next, the CPU 10 calculates a horizontal angular difference between the real space reference direction and the current direction (step 224), and proceeds to the next step. The horizontal angular difference is an angular difference obtained by projecting an angular difference between the real space reference direction in the real space and the Z-axis direction represented by the current direction data Dce2 on the horizontal plane. The horizontal angular difference indicates an angle at which the direction of the terminal device 6 (the direction in which the back surface of the terminal device 6 faces (the z-axis positive direction shown in FIG. 3)) is changed from the initial attitude of the terminal device 6 around the vertical direction in the real space. For example, the CPU 10 calculates the horizontal angular difference by using the real space reference direction represented by the real space reference direction data Dce1, and the Z-axis direction represented by the current direction data Dce2.

Next, the CPU 10 calculates an up-down angular difference between the horizontal direction in the real space and the current direction (step 225), and proceeds to the next step. For example, the CPU 10 calculates, as an up-down angular difference, an angular difference between the horizontal direction in the real space and the Z-axis direction, by using the Z-axis direction represented by the current direction data Dce2.

Next, the CPU 10 calculates an operation instruction direction corresponding to the virtual world reference direction, in accordance with the horizontal angular difference calculated at step 224 and the up-down angular difference calculated at step 225 (step 226), and ends the process of this sub-routine. For example, based on the virtual world reference direction represented by the virtual world reference direction data Dcf1, the CPU 10 calculates an operation instruction direction in the virtual world such that an angular difference that occurs when the virtual world reference direction and the operation instruction direction are projected on the horizontal plane in the virtual world is equal to the horizontal angular difference, and the same positional relation is achieved between the real space and the virtual world (i.e., if the Z-axis direction rotates to the left with respect to the real space reference direction, the operation instruction direction also rotates to the left with respect to the virtual world reference direction). Further, the CPU 10 calculates an operation instruction direction in the virtual world such that an angular difference between the horizontal direction in the virtual world and the operation instruction direction is equal to the up-down angular difference, and the same positional relation is achieved between the real space and the virtual world (i.e., if the Z-axis direction is downward with respect to the horizontal direction of the real space, the operation instruction direction is also downward with respect to the horizontal direction in the virtual world). Then, the CPU 10 updates the operation instruction direction data Dcf2 by using the calculated operation instruction direction.

Referring back to FIG. 28, after the operation instruction direction calculation process at step 201, the CPU 10 determines whether or not the operation instruction direction is within a first operation range (step 202). When the operation instruction direction is within the first operation range, the CPU 10 proceeds to step 203. On the other hand, when the operation instruction direction is outside the first operation range, the CPU 10 proceeds to step 204. The first operation range is a rotation angle range in the horizontal direction, in which the direction of the second player object Po2 and the position of the target object To are changed in accordance with the operation instruction direction. For example, the first operation range is set to a range from −5° to +5° centering around the virtual world reference direction. Then, in step 202, the CPU 10 determines whether or not an angular difference which occurs when the virtual world reference direction and the operation instruction direction are projected on the horizontal plane in the virtual world is within the first operation range, by using the virtual world reference direction represented by the virtual world reference direction data Dcf1 and the operation instruction direction represented by the operation instruction direction data Dcf2. The first operation range corresponds an example of the turret/target direction operation range shown in FIG. 26.

In step 203, the CPU 10 sets the direction (turret angle) of the second player object Po2 and the position (target position) of the target object To in accordance with the operation instruction direction, and proceeds to step 209. For example, the CPU 10 sets, as the turret direction of the second player object Po2, the operation instruction direction represented by the operation instruction direction data Dcf2, and updates the turret attitude data Dcg2 by using the set turret direction. Based on the turret direction of the second player object Po2 and the position of the player object Po represented by the position data Dci, the CPU 10 calculates, as a position of the target object To, a position at which a shell object shot from the second player object Po2 at a predetermined shell speed lands in the virtual world. Then, the CPU 10 updates, by using the calculated position, the position of the target object To represented by the position data Dci.

On the other hand, in step 204, the CPU 10 determines whether or not the operation instruction direction is within a second operation range. When the operation instruction direction is within the second operation range, the CPU 10 proceeds to step 205. On the other hand, when the operation instruction direction is outside the second operation range, the CPU 10 proceeds to step 207. The second operation range is a rotation angle range in the horizontal direction, in which the direction of the second player object Po2 and the position of the target object To are changed in accordance with the operation instruction direction, and further, the forward direction (body direction) of the first player object Po1 is changed so as to approach the operation instruction direction by a predetermined angle. For example, the second operation range includes a range from −87° to −5° and a range from +5° to +87° centering around the vertical world reference direction. Then, in step 204, the CPU 10 determines whether or not an angular difference which occurs when the virtual world reference direction and the operation instruction direction are projected on the horizontal plane in the virtual world is within the second operation range, by using the virtual world reference direction represented by the virtual world reference direction data Dcf1 and the operation instruction direction represented by the operation instruction direction data Dcf2. The second operation range corresponds an example of the body direction operation range shown in FIG. 26.

In step 205, the CPU 10 sets the direction (turret angle) of the second player object Po2 and the position (target position) of the target object To in accordance with the operation instruction direction, and proceeds to the next step. For example, the CPU 10 sets the operation instruction direction represented by the operation instruction direction data Dcf2, as the turret direction of the second player object Po2, and updates the turret attitude data Dcg2 by using the set turret. Based on the turret direction of the second player object Po2 and the position of the player object Po represented by the position data Dci, the CPU 10 calculates, as a position of the target object To, a position at which a shell object shot from the second player object Po2 at a predetermined shell speed lands in the virtual world. Then, the CPU 10 updates, by using the calculated position, the position of the target object To represented by the position data Dci.

Next, the CPU 10 sets the forward direction (body direction) of the first player object Po1 in accordance with the operation instruction direction (step 206), and proceeds to step 209. For example, based on the forward direction of the first player object Po1 represented by the body attitude data Dcg1 and the operation instruction direction represented by the operation instruction direction data Dcf2, the CPU 10 calculates an angular difference θd which occurs when the forward direction of the first player object Po1 and the operation instruction direction are projected on the horizontal plane in the virtual world. Then, CPU 10 calculates an angle θc2 at which the forward direction of the first player object Po1 is changed, in accordance with the following equation:

$$\theta c2 = 1.0 - \cos \theta d$$

Then, the CPU 10 changes the forward direction of the first player object Po1 so as to approach the operation instruction direction by the calculated angle θc2, and updates the body attitude data Dcg1 by using the changed forward direction. Further, since the line-of-sight direction of the virtual camera for taking a game image to be displayed on the LCD 61 is set to a direction in which the first player object Po1 faces, the CPU 10 changes the virtual world reference direction represented by the virtual world reference direction data Dcf1, to the same direction and by the same angle θc2 as the forward direction of the first player object Po1, and updates the virtual world reference direction data Dcf1 by using the changed virtual world reference direction.

On the other hand, when it is determined at step 204 that the operation instruction direction is outside the second operation range, the CPU 10 determines that the operation instruction direction is within a third operation range. Then, the CPU 10 sets the direction (body direction) of the first player object Po1 in accordance with the operation instruction direction (step 207), and proceeds to the next step. The third operation range is a rotation angle range in the horizontal direction, in which the forward direction (body direction) of the first player object Po1 is changed at an angle relatively greater than that in the second operation range. For example, the third operation range includes a range from −180° to −87° and a range from +87° to +180° centering around the virtual world reference direction. The third operation range corresponds an example of the body direction operation range shown in FIG. 26, and a combination of the second operation range and the third operation range corresponds to an example of the body direction operation range shown in FIG. 26.

In step 207, the CPU 10 changes the forward direction of the first player object Po1 so as to approach the operation instruction direction by a predetermined angle θc3 (e.g., 1.0°), based on the forward direction of the first player object Po1 represented by the body attitude data Dcg1 and the operation instruction direction represented by the operation instruction direction data Dcf2, and updates the body attitude data Dcg1 by using the changed forward direction. Since the line-of-sight direction of the virtual camera for taking a game image to be displayed on the LCD 61 is set to the direction in which the first player object Po1 faces, the CPU 10 changes the virtual world reference direction represented by the virtual world reference direction data Dcf1, to the same direction and by the same angle θc3 as the forward direction of the first player object Po1, and updates the virtual world reference direction data Dcf1 by using the changed virtual world reference direction.

Next, the CPU 10 sets the direction (turret angle) of the second player object Po2 and the position (target position) of the target object To in accordance with the body direction (step 208), and proceeds to step 209. For example, in the third operation range, the direction of the second player object Po2 (turret) arranged on the first player object Po1 changes with the direction change of the first player object Po1 while maintaining the positional relation with the first player object Po1, and further, the position of the target object To also changes with the direction change of the first player object Po1. Accordingly, the CPU 10 changes the turret direction of the second player object Po2 represented by the turret attitude data Dcg2, to the same direction and by the same angle θc3 as the forward direction of the first player object Po1, and updates the turret attitude data Dcg2 by using the changed turret direction. Then, based on the turret direction of the second player object Po2 and the position of the player object Po represented by the position data Dci, the CPU 10 calculates, as a position of the target object To, a position at which a shell object shot from the second player object Po2 at a predetermined shell speed lands in the virtual world. Then, the CPU 10 updates, by using the calculated position, the position of the target object To represented by the position data Dci. That is, in the process at step 208, the turret direction of the second player object Po2 rotates in the virtual world together with the first player object Po1 while maintaining an angle (e.g., −87° or +87°) corresponding to the boundary between the second operation range and the third operation range with respect to the first player object Po1.

In step 209, the CPU 10 sets a movement vector based on the center-of-gravity position and the body direction, and proceeds to the next step. For example, the CPU 10 calculates a movement speed of the player object Po based on the latest center-of-gravity position represented by the center-of-gravity position data Dcd. For example, the CPU 10 calculates a movement speed of the player object Po, based on a Y1 axis value (a coordinate value in a short-side direction) of the center-of-gravity position in a predetermined coordinate system corresponding to a position on the platform 9a of the board type controller 9. For example, when the center of the platform 9a is set at the origin of the coordinate system, if the Y1 axis value of the center-of-gravity position is greater than a predetermined numerical value (i.e., if the center-of-gravity position is provided at a position apart from the center of the platform 9a, forward or backward, by a predetermined distance or more), the CPU 10 sets a forward or backward movement speed of the player object Po in accordance with the numerical value. Specifically, when the front side of the board type controller 9 (the side on which the load sensors 94c and 94d are provided as shown in FIG. 6) is set in the Y1 axis direction, if the Y1 axis direction of the center-of-gravity position is a positive value and its absolute value is greater than the predetermined numerical value, the CPU 10 sets a forward movement speed (e.g., a positive movement speed) of the player object Po in accordance with the numerical value. On the other hand, if the Y1 axis value of the center-of-gravity position is a negative value and its absolute value is greater than the predetermined numerical value, the CPU 10 sets a backward movement speed (e.g., a negative movement speed) of the player object Po in accordance with the numerical value.

When the forward movement speed (e.g., the positive movement speed) of the player object Po is set, the CPU 10 regards the forward direction of the first player object Po1 represented by the body attitude data Dcg1, as the movement direction of the player object Po. When the backward movement speed (e.g., the negative movement speed) of the player object Po is set, the CPU 10 regards a direction opposite to the forward direction of the first player object Po1 represented by the body attitude data Dcg1, as the movement direction of the player object Po. Then, the CPU 10 calculates a movement vector in the virtual world, based on the calculated movement speed and movement direction of the player object Po, and updates the movement vector data Dch by using the calculated movement vector. For example, the CPU 10 sets a length of the movement vector by using the calculated movement speed of the player object Po, and sets a direction of the movement vector by using the forward direction of the first player object Po1 represented by the body attitude data Dcg1 or a direction opposite to the forward direction.

Next, the CPU 10 calculates a position of the player object Po (step 210), and proceeds to the next step. For example, the CPU 10 causes the position of the player object Po represented by the position data Dci to shift in the virtual world, based on the movement vector represented by the movement vector data Dch, and updates the position data Dci by using the position after the shifting.

Next, the CPU 10 determines whether or not the player object Po is during shelling (step 211). When the player object Po is during shelling, the CPU 10 proceeds to step 212. On the other hand, if the player object Po is not during shelling, the CPU 10 ends the process of this sub-routine. The player object Po is capable of shooting a shell object from the second player object Po2 toward the target object To, and a shell is shot from the turret toward the set turret direction in accordance with an operation by the user (e.g., an operation to press an attack button (operation button 64E) of the terminal device 6). The "during shelling" means a period from when the operation to cause the player object Po to shoot a shell object toward the target object To is performed to when the shell object collides with another object or the like and disappears.

In step 212, the CPU 10 calculates a position and a movement vector of the shell object, and ends the process of this sub-routine. For example, when the above-mentioned operation to shoot the shell object has been performed, the CPU 10 sets the position of the shell object in the turret as the second player object Po2, and sets a movement vector having a predetermined shell speed in the turret direction, thereby updating the movement vector of the shell object represented by the movement vector data Dch, and the position of the shell object represented by the position data Dci. After the shell object was shot, the CPU 10 moves the shell object in the virtual world, based on the set movement vector, to set a new position of the shell object, and updates the position of the shell object represented by the position data Dci by using the set position. Further, the CPU 10 corrects the movement vector, based on the environment (gravity, wind, influence of other objects, and the like) set in the virtual world, and updates the movement vector of the shell object represented by the movement vector data Dch by using the corrected movement vector.

In the virtual camera setting process (step 84) of the third embodiment, the first virtual camera for generating a terminal game image is set such that a state of the virtual world viewed from near the back of the first player object Po1 arranged in the virtual world is included in the terminal game image. On the other hand, the second virtual camera for generating a monitor game image is set in the same virtual world as the first virtual camera, such that a state of the virtual world in which the player object Po arranged in the virtual world is viewed from a distance, in the forward direction of the first player object Po1, in a manner of bird's eye viewing is included in the monitor game image. The CPU 10 set the positions of the first virtual camera and the second virtual camera in the virtual world (the parameters relating to the first virtual camera and the second virtual camera), based on the position of the player object Po represented by the position data Dbi and the forward direction of the first player object Po1 represented by the body attitude data Dcg1.

In the monitor game image generation process (step 45) and the terminal game image generation process (step 46) of the third embodiment, images representing the result of the game control process are generated, respectively, as in the first embodiment. For example, the monitor game image is generated as a three-dimensional CG image which is generated through the steps of: arranging the second virtual camera in the virtual world based on the parameters relating to the second virtual camera, which are represented by the virtual camera data Dcj; arranging the player object Po (the first player object Po1 and the second player object Po2), the target object To, the shell object, and the like in the virtual world based on the action/attitude data Dcg and the position data Dci; and calculating a scene of the virtual world viewed from the second virtual camera. The terminal game image is generated as a three-dimensional CG image which is generated through the steps of: arranging the first virtual camera in the virtual world based on the parameters relating to the first virtual camera, which are represented by the virtual camera data Dcj; arranging the player object Po, the target object To, the shell object, and the like in the virtual world based on the action/attitude data Dcg and the position data Dci; and calculating a scene of the virtual world viewed from the first virtual camera.

In this way, according to the above-mentioned process, in the operation using the terminal device 6 within the turret/target direction operation range (the first operation range), only the direction of the second player object Po2 and the position of the target object To change, while the direction of the first player object Po1 and the display range of the virtual world displayed on the LCD 61 do not change. Accordingly, in the operation using the terminal device 6 within the turret/target direction operation range (the first operation range), the objects to be moved by this operation are limited, and favorable operation environment is provided for adjusting the position of the target object To to shoot a shell toward the enemy object Eo or the like. Further, in the operation using the terminal device 6 within the body direction operation range (the second operation range or the third operation range) in the real space, not only the direction of the second player object Po2 and the position of the target object To but also the direction of the first player object Po1 and the position and the direction of the virtual camera can be changed. Accordingly, the operation using the terminal device 6 within the body direction operation range enables an operation of the objects other than the objects operable in the turret/target direction operation range, and is favorable for changing the movement direction of the player object Po, or changing the display range on the LCD 61.

Thus, setting at least two operation ranges allows the user to perform various operations by using the attitude of a single device.

In the above-mentioned first to third exemplary games, control (control of the position and the direction) of the virtual camera (the first virtual camera) for generating an image to be displayed on the LCD 61 is performed based on the attitude of the terminal device 6. Such control provides the user with an image that makes the user feel like looking into the virtual world through the LCD 61, and thereby allows the user to experience a sense of presence in the virtual world. Further, the operation based on the attitude of the terminal device 6 enables rotation operations in three directions, i.e., the left-right swing motion (yaw) around the vertical direction (e.g., around the Y-axis direction), the up-down swing motion (pitch) around the left-right horizontal direction (e.g., around the X-axis direction), and the left-right rotation (roll) around the front-rear horizontal direction (e.g., around the Z-axis direction). Therefore, the operation based on the attitude of the terminal device 6 is suitable for control of the virtual camera that is similarly movable in the virtual world. By controlling the attitude of the virtual camera in the virtual world so as to be equal to the attitude of the terminal device 6 in the real space, it is possible to provide the user with an image that makes the user feel like looking into the virtual world along his/her desired direction. Further, in the first to third exemplary games, the player object performs an action (e.g., moves) in accordance with an action of the user on the board type controller 9. That is, the image displayed on the LCD 61 allows the user to experience a sense of presence in the virtual world, and moreover, allows the user to experience an operation sense of becoming the player character in the real space, which enhances the sense of presence in the virtual world.

In the first to third exemplary games, the attitude of the player object Po displayed on the LCD 61 is controlled based on the attitude of the terminal device 6. Such control provides the user with an operation environment as if the terminal device 6 is the player object Po, and allows the user to experience a sense of becoming the player object Po in the virtual world, and a sense of directly operating the player object Po. Further, the operation based on the attitude of the terminal device 6 enables rotation operations in three directions, i.e., the left-right swing motion (yaw) around the vertical direction (e.g., around the Y-axis direction), the up-down swing motion (pitch) around the left-right horizontal direction (e.g., around the X-axis direction), and the left-right rotation (roll) around the front-rear horizontal direction (e.g., around the Z-axis direction). Therefore, the operation based on the attitude of the terminal device 6 is suitable for control of the player object Po that is similarly movable in the virtual world. For example, in the first exemplary game, the left-right swing motion (yaw) around the vertical direction (Y-axis direction) along the LCD 61 of the terminal device 6 is related to an attitude change (yaw) of the player object Po in the left-right direction, the up-down swing motion (pitch) around the left-right direction (X-axis direction) along the LCD 61 is related to an attitude change (pitch) of the player object Po in the up-down direction, and the left-right rotation (roll) around the depth direction (Z-axis direction) of the LCD 61 is related to a rotational attitude change (roll) around the forward direction of the player object Po, thereby providing the user with an image of an object whose attitude changes as desired by the user in the virtual world. Further, in the first to third exemplary games, the player object performs an action (e.g., moves) in accordance with an action of the user on the board type controller 9. That is, the user operates one player object by using a plurality of devices (the terminal device 6 and the board type controller 9), which realizes a new operation. Further, control of the attitude of the player object based on the attitude of the terminal device 6 allows the user to experience a sense of becoming the player object in the virtual world, and a sense of directly operating the player object. Moreover, user's operation on the board type controller 9 allows the user to experience a sense of becoming the player character in the real space, which enhances the sense of presence in the virtual world. Further, in the first to third exemplary games, it is possible to move the player object in the direction forward from the player object. Accordingly, the user is allowed to set, based on the attitude of the terminal device 6, the movement direction of the player object as well as the attitude (forward direction) of the player object, and thus the user is allowed to easily and intuitively set the movement direction of the player object to his/her desired direction. Further, as well as the attitude of the player object, it is possible to set the movement direction of the player object in accordance with the rotation operations in the three directions of the terminal device 6. Therefore, the user is allowed to set his/her desired movement direction as it is in the virtual world.

In the first to third exemplary games, the movement direction of the player object Po is set based on the attitude of the terminal device 6. Such setting of the movement direction provides the user with an operation environment as if the terminal device 6 becomes the player object Po, and allows the user to experience a sense of presence in the virtual world as the player object Po, and a sense of directly operating the player object Po. Further, the operation using the attitude of the terminal device 6 enables rotation operations in three directions, i.e., the left-right swing motion (yaw) around the vertical direction (e.g., around the Y-axis direction), the up-down swing motion (pitch) around the left-right horizontal direction (e.g., around the X-axis direction), and the left-right rotation (roll) around the front-rear horizontal direction (e.g., around the Z-axis direction). Therefore, the operation based on the attitude of the terminal device 6 is suitable for control of the player object Po whose movement direction can be set in at least one direction among the three directions in the virtual world. For example, in the case of the first exemplary game, the left-right swing motion (yaw) around the vertical direction (Y-axis direction) along the LCD 61 of the terminal device 6 is related to a movement direction change (yaw) of the player object Po in the left-right direction, and the up-down swing motion (pitch) around the left-right direction (X-axis direction) along the LCD 61 is related to a movement direction change (pitch) of the player object Po in the up-down direction, thereby providing an object control for causing the player object Po to move in a movement direction desired by the user in the virtual world. Further, in the first to third exemplary games, setting of the movement (e.g., setting of the movement speed) of the player object is performed in accordance with an action of the user on the board type controller 9. That is, the user controls the movement direction and the movement speed of one player object by using a plurality of devices (the terminal device 6 and the board type controller 9), thereby realizing a new operation. Further, setting of the movement direction of the player object based on the attitude of the terminal device 6 allows the user to experience a sense of becoming the player object in the virtual world, and a sense of directly operating the player object. Moreover, the user's operation on the board type controller 9 allows the user to experience an operation sense of becoming the player object in the real space, which enhances the sense of presence in the virtual world.

In the first to third exemplary games, the direction of the virtual world displayed on the LCD 61 of the terminal device 6 is the movement direction of the player object. Accordingly, the user is allowed to set, based on the attitude of the terminal device 6, the movement direction of the player object. Further, since the virtual world viewed in the movement direction is displayed on the LCD 61, the user is allowed to easily and intuitively set the movement direction of the player object to his/her desired direction. Further, as well as the direction of the virtual camera, it is possible to set the movement direction of the player object in accordance with the rotation operations in the three directions of the terminal device 6, the user is allowed to set his/her desired movement direction as it is in the virtual world.

Further, in the first to third exemplary games, an image of a virtual world including at least the player object Po is displayed on the LCD 61 of the terminal device 6. However, an image of another type of a virtual world may be displayed on the LCD 61. For example, an image of a virtual world viewed from a subjective point of the player object Po may be displayed on the LCD 61 without displaying the player object Po. In this case, the direction of the virtual world displayed on the LCD 61 from the subjective point may be the same as the movement direction of the player object Po, or may be different from the movement direction of the player object Po. When the direction of the virtual world displayed on the LCD 61 from the subjective point is the same as the movement direction of the player object Po, the virtual world viewed in the movement direction is displayed on the LCD 61. Therefore, the user is allowed to easily and intuitively set the movement direction of the player object to his/her desired direction.

The above-mentioned first to third exemplary games adopts an example of a process in which control of the position and the attitude of the virtual camera is immediately associated with the operation instruction direction determined based on the attitude of the terminal device 6. However, control of the position and the attitude of the virtual camera may be delayed for a predetermined time in accordance with a change in the operation instruction direction. In this case, after the direction of the player object has changed, the position and the direction of the virtual camera follows the direction of the player object after the predetermined time.

Further, in the first to third exemplary games, the game image displayed on the LCD 61 of the terminal device 6 and the game image displayed on the monitor 2 are images showing the same virtual world (virtual space), but the images are viewed from different viewpoints or in different ranges of the virtual world. Accordingly, the user is allowed to view different views or ranges of the virtual world (virtual space) displayed on the two display screens, and thereby allowed to view appropriate game images according to the game situation or the like. Further, in the first to third exemplary games, the user holds and operates the terminal device 6 to change the position and the attitude of the player object or the virtual camera in accordance with the attitude and the position of the terminal device 6 in the real space, and change the image displayed on the LCD 61 in accordance with the position and the attitude of the player object or the virtual camera. Accordingly, the user, who views the image displayed on the LCD 61 with the terminal device 6 in his/her hands, is given a sense of presence in the virtual world (virtual space). On the other hand, it is difficult for the user, who views only the image displayed on the LCD 61, to know the position of the player object in the entire virtual world (virtual space) and the surroundings of the player object. Such a problem is resolved by displaying, on the monitor 2, a relatively wide range of the virtual world (virtual space).

In the first to third exemplary games, the user is allowed to perform an operation by changing a load applied to the board type controller 9 by the user, and further allowed to perform an operation (an operation according to the attitude or the position of the terminal device 6, a touch operation, a button operation, or the like) with holding the terminal device 6 on which a game image including a player object is displayed. The player object displayed on the terminal device 6 is caused to move in the virtual world (virtual space) in accordance with the operation of changing the load applied to the board type controller 9 and/or the operation using the terminal device 6. Accordingly, the user is allowed to experience a sense of acting as the player object and viewing the virtual world (virtual space), and a sense of operating the player object in the real world.

In the operation using the board type controller 9, presence/absence of a load applied to the board type controller 9, a change in a load, and a center-of-gravity position of a load are used for various operation controls for the player objects. For example, in the first to third exemplary games, the action, the movement speed, the movement speed and the like of the player object are changed in accordance with a change in the load applied to the board type controller 9, and the center-of-gravity position of the load. In the exemplary games, although the direction (e.g., the movement direction or the forward direction of the player object) in the virtual world (virtual space) is set in accordance with the direction of the user's operation, the direction is set based on the attitude (direction) of the terminal device 6. Further, correction of the movement direction in the air in the virtual world in the second exemplary game, and switching between the forward movement and the backward movement in the third exemplary game, are performed based on the center-of-gravity position of the load applied to the board type controller 9. That is, between the operation based on the attitude of the terminal device 6 and the operation using the board type controller 9, an appropriate operation, which facilitates setting of a direction or enhances a sense of presence in the virtual world, is selected. Thus, an appropriate one, between the attitude of the terminal device 6 and the center-of-gravity position of the load applied to the board type controller 9, can be selected according to the game content, as an operation to instruct a direction. In this way, in the case where the terminal device 6 and the board type controller 9 are used as operation means, when setting a direction in the virtual world (virtual space) in accordance with an operation of the user, the user is allowed to select an appropriate operation among a plurality of operations as options.

The game system 1 allows the user to play various games by using the terminal device 6 and the board type controller 9 as operation means. The terminal device 6 serves as a controller which allows the user to perform an input by an operation based on its motion, a touch operation, a button operation or the like, while it also serves as a portable display or a second display. Therefore, the game system 1 realizes a wide range of games. That is, since the terminal device 6 functions as a display device, there may be a game system in which the terminal device 6 is used as display means and the board type controller 9 is used as operation means while the monitor 2 and the controller 7 are not used.

Further, since the terminal device 6 functions as an operation device as well as a display device, there may be a game system in which the terminal device 6 is used as display means and the terminal device 6 and the board type controller 9 are used as operation means while the monitor 2 and the controller 7 are not used. Furthermore, since the terminal device 6 functions as an operation device as well as a display device, there may be a game system in which the terminal device 6 is used as display means and operation means while the monitor 2, the controller 7, and the board type controller 9 are not used.

In the above-mentioned embodiments, the terminal device 6 functions as a so-called thin client terminal which does not execute a game process. However, at least a part of the sequential game processes executed by the game apparatus body 5 may be executed by the terminal device 6. For example, the terminal game image generating process may be executed by the terminal device 6. In another example, all the sequential game processes to be executed by the game apparatus body 5 may be executed by the terminal device 6. In this case, since the terminal device 6 functions as a processing device for executing the game processes as well as a display device, there may be a game system in which the terminal device 6 is used as display means, the board type controller 9 is used as operation means, and the terminal device 6 is used as processing means while the monitor 2, the game apparatus body 5, and the controller 7 are not used. In this game system, only the terminal device 6 and the board type controller 9 are connected wirelessly or via a cable, and board operation data is transmitted from the board type controller 9 to the terminal device 6, thereby realizing various kinds of games. Further, when the board type controller 9 is not used, there may be a game system in which the terminal device 6 is used as display means, operation means, and processing means.

In the above-mentioned embodiments, the attitude data (e.g., data outputted from at least one of the magnetic sensor 602, the acceleration sensor 603, and the gyro sensor 604) used for calculating the movement (including the position and the attitude, or a change in the position or the attitude) of the terminal device 6 is transmitted from the terminal device 6 to the game apparatus body 5, and the movement of the terminal device 6 is calculated by the information processing in the game apparatus body 5. However, the movement of the terminal device 6 to be calculated in the game apparatus body 5 may be calculated in the terminal device 6. In this case, data representing the movement of the terminal device 6, which is calculated in the terminal device 6 (i.e., data representing the position and the attitude of the termination device, or a change in the position or the attitude, which is calculated based on the attitude data) is transmitted from the terminal device 6 to the game apparatus body 5, and used in the information processing in the game apparatus body 5.

In the above description, the terminal device 6 and the game apparatus body 5 are connected by wireless communication, and the board type controller 9 and the game apparatus body 5 are connected by wireless communication. However, the inter-device wireless communication may be achieved in a manner other than mentioned above. In a first example, the terminal device 6 serves as a relay device for another wireless communication. In this case, the board operation data of the board type controller 9 is wirelessly transmitted to the terminal device 6, and the terminal device 6 wirelessly transmits, to the game apparatus body 5, the terminal operation data of the terminal device 6 together with the received board operation data. In this case, while the terminal device 6 and the game apparatus body 5 are directly connected by wireless communication, the board type controller 9 is connected via the terminal device 6 to the game apparatus body 5 by wireless communication. In a second example, the board type controller 9 serves as a relay device for another wireless communication. In this case, the terminal operation data of the terminal device 6 is wirelessly transmitted to the board type controller 9, and the board type controller 9 wirelessly transmits, to the game apparatus body 5, the board operation data of the board type controller 9 together with the received terminal operation data. In this case, the board type controller 9 and the game apparatus body 5 are directly connected by wireless communication, and the terminal device 6 is connected via the board type controller 9 to the game apparatus body 5 by wireless communication. When another device serves as a relay device to transmit operation data to the game apparatus body 5, a device which generates the operation data and the relay device which relays the control data may be electrically connected via a cable.

Further, the terminal device 6 and/or the board type controller 9 may be electrically connected to the game apparatus body 5 via cables. In this case, the cables connected to the terminal device 6 and/or the board type controller 9 are connected to a connection terminal of the game apparatus body 5. In a first example, the terminal device 6 and the game apparatus body 5 are electrically connected via a first cable, and the board type controller 9 and the game apparatus body 5 are electrically connected via a second cable. In a second example, the terminal device 6 is electrically connected to the game apparatus body 5 via a cable. In this case, the board operation data of the board type controller 9 may be wirelessly transmitted to the terminal device 6 and then transmitted to the game apparatus body 5 via the cable. Alternatively, the board operation data of the board type controller 9 may be wirelessly transmitted from the board type controller 9 directly to the game apparatus body 5. In a third example, the board type controller 9 is electrically connected to the game apparatus body 5 via a cable. In this case, the terminal operation data of the terminal device 6 may be wirelessly transmitted to the board type controller 9 and then transmitted to the game apparatus body 5 via the cable. Alternatively, the terminal operation data of the terminal device 6 may be wirelessly transmitted from the terminal device 6 directly to the game apparatus body 5.

Further, in the above-mentioned embodiments, the game system 1 includes one terminal device 6 and one board type controller 9. However, the game system 1 may be configured to include a plurality of terminal devices 6 and a plurality of board type controllers 9. In this case, the game apparatus body 5 may be wirelessly communicable with the respective terminal devices 6 and the respective type controllers 9, and may transmit game image data, game sound data, and control data to the respective terminal devices, and receive terminal operation data, camera image data, microphone sound data, and board operation data from the respective terminal devices 6 and the respective board type controllers 9. When the game apparatus body 5 wirelessly communicates with the plurality of terminal devices 6 and the plurality of board type controllers 9, the game apparatus body 5 may perform the wireless communications in a time division manner or a frequency division manner.

When the game system 1 includes a plurality of terminal devices 6 and a plurality of board type controllers 9 as described above, a plurality of users are allowed to play more types of games. For example, when the game system 1 includes two pairs of terminal devices 6 and board type controllers 9, two users are allowed to play a game simultaneously. Further, when the game system 1 includes two pairs of terminal devices 6 and board type controllers 9, since the game system 1 includes three display units, game images for three users can be generated to be displayed on the respective display units.

In the above description, the board type controller 9 is provided with a plurality of load sensors 94. However, if information of the center-of-gravity position of a load applied to the board type controller 9 is not required in the above-mentioned processing, the board type controller 9 may be provided with at least one load sensor 94.

The exemplary embodiments have been described by using the stationary game apparatus 3. However, the information processing program may be executed by an information processing apparatus such as a hand-held game apparatus or a general personal computer. Further, the exemplary embodiments may be applied to, as well as the game apparatus, any hand-held electronic devices, e.g., a PDA (Personal Digital Assistant), a mobile telephone, a personal computer, a camera, and the like. Any device may be connected to the terminal device 6 and the board type controller 9 wirelessly or via cables.

In the above description, the information processing is executed by the game apparatus body 5. However, at least a part of the process steps in the information processing may be performed by another apparatus provided outside the game system 1. For example, when the game apparatus body 5 is configured to be communicable with another apparatus (e.g., a server or another game apparatus), the process steps in the information processing may be performed by the game apparatus body 5 in combination with the other apparatus. For example, the other apparatus performs a process of setting a player object, a virtual world and the like, and data relating to an action or an attitude of the player object is transmitted from the game apparatus body 5 to the other apparatus, and thereby the information processing is performed. Then, image data representing a virtual world generated in the other apparatus is transmitted to the game apparatus body 5, and the virtual world is displayed on the monitor 2 and the LCD 61. Thus, when at least a part of the process steps in the information processing is performed by another apparatus, the same processing as the information processing is achieved. At least a part of the process steps in the information processing may be performed by the board type controller 9 (microcomputer 100). Further, the above-mentioned information processing can be executed by one processor or by a cooperation of a plurality of processors which is/are included in an information processing system constituted by at least one information processing apparatus. Further, in the exemplary embodiment, the processes shown in the above-mentioned flowcharts are performed by the CPU 10 of the game apparatus body 5 executing the predetermined program. However, a part or the entirety of the processes may be performed by a dedicated circuit included in the game apparatus body 5.

Further, the shape of the game apparatus body 5, the shapes of the terminal device 6, the controller 7, and the board type controller 9, and the shapes, numbers, and mounting positions of the operation buttons and the sensors, are merely examples. It should be understood that other shapes, numbers, and mounting positions may be adopted. Further, the processing sequences, set values, display modes, and values used in determination which are used in the above-mentioned game process are merely examples. It is understood that other sequences, display modes, and values may be adopted.

Further, the information processing program (game program) may be supplied to the game apparatus body 5 via a wired or wireless communication circuit, as well as to the game apparatus body 5 via an external storage medium such as the optical disc 4. Further, the information processing program may be previously stored in a nonvolatile storage device inside the game apparatus body 5. Examples of an information storage medium storing the information processing program therein include: a CD-ROM, a DVD, any other optical disc-shaped storage medium similar to these media, a flexible disk, a hard disk, a magnetic optical disk, and a magnetic tape. Further, the information storage medium storing the information processing program therein may be a nonvolatile semiconductor memory or a volatile memory. Such a storage medium is a storage medium readable by a computer or the like. For example, it is possible to provide the above-mentioned various functions by causing a computer or the like to read and execute the programs stored in these storage media.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While the exemplary embodiments have been described in detail, the foregoing description is in all aspects illustrative and not restrictive. It is understood that numerous other modifications and variations can be devised. It is also understood that, from the description of specific embodiments, the one skilled in the art can implement the exemplary embodiments in the equivalent range based on the description and on the common technological knowledge. Further, it should be understood that terms used in the present specification have meanings generally used in the art concerned unless otherwise specified. Therefore, unless otherwise defined, all the jargon and technical terms have the same meanings as those generally understood by one skilled in the art of the exemplary embodiments. In the event of any conflict, the present specification (including meanings defined herein) has priority.

What is claimed is:

1. A non-transitory computer-readable storage medium comprising an information processing program executed on a computer of an information processing apparatus which is capable of displaying an image on a separately housed portable display device which outputs at least attitude data based on an attitude of a body of the portable display device, wherein the information processing program, when executed, causes the computer to:

obtain data based on a load applied to a load detection device;

cause an object arranged in a virtual world to move based on the obtained data;

render, using processing circuitry of the information processing apparatus, a first image from a first virtual camera;

control the first virtual camera, which generates the first image of the virtual world, based on the attitude data, corresponding to the attitude of the body of the portable display device, and a position of the object in the virtual world;

render, using the processing circuitry of the information processing apparatus, a second image from a second virtual camera having a different viewpoint than the first virtual camera;

transmit, from the information processing apparatus to the separately housed portable display device, an encoded signal including the first image representing the virtual world viewed from the first virtual camera and rendered using the processing circuitry of the information processing apparatus; and output, from the information processing apparatus to a separately housed stationary display device operatively coupled to the information processing apparatus, the second image representing the virtual world viewed from the second virtual camera and rendered using the processing circuitry of the information processing apparatus.

2. The non-transitory computer-readable storage medium according to claim 1, wherein the information processing program further causes the computer to calculate an attitude of the portable display device, based on the attitude data, and control the first virtual camera based on the calculated attitude of the portable display device and the position of the object.

3. The non-transitory computer-readable storage medium according to claim 2, wherein at least one of a position and an attitude of the first virtual camera in the virtual world is controlled based on the attitude of the portable display device.

4. The non-transitory computer-readable storage medium according to claim 3, wherein an attitude of the portable display device is calculated with respect to a predetermined direction in a real space, and at least one of the position and the attitude of the first virtual camera is controlled, with reference to a direction which corresponds to the predetermined direction and is set in the virtual world, based on the attitude of the portable display device with respect to the predetermined direction in the real space.

5. The non-transitory computer-readable storage medium according to claim 4, wherein
the predetermined direction is a direction of gravity in the real space, and an attitude of the portable display device is calculated with respect to the direction of gravity, and
at least one of the position and the attitude of the first virtual camera is controlled, with reference to a direction of gravity set in the virtual world, based on the attitude of the portable display device with respect to the direction of gravity in the real space.

6. The non-transitory computer-readable storage medium according to claim 5, wherein
at least an attitude in which the portable display device rotates around the direction of gravity in the real space is calculated, and
the attitude of the first virtual camera is controlled by rotating the first virtual camera around the direction of gravity set in the virtual world, based on the attitude in which the portable display device rotates around the direction of gravity in the real space.

7. The non-transitory computer-readable storage medium according to claim 2, wherein
at least one of a position and an attitude of the first virtual camera is controlled by controlling a line-of-sight direction of the first virtual camera in the virtual world, the line-of-sight direction being based on the attitude of the portable display device.

8. The non-transitory computer-readable storage medium according to claim 2, wherein
an attitude of the first virtual camera is controlled so as to be the same as the attitude of the portable display device.

9. The non-transitory computer-readable storage medium according to claim 2, wherein
the first virtual camera is controlled such that the object is included in the first image.

10. The non-transitory computer-readable storage medium according to claim 2, wherein
the object is caused to move in a direction based on a line-of-sight direction of the first virtual camera.

11. The non-transitory computer-readable storage medium according to claim 2, wherein
the portable display device includes at least one of a gyro sensor and an acceleration sensor, and
an attitude of the portable display device is calculated based on data outputted from at least one of the gyro sensor and the acceleration sensor.

12. The non-transitory computer-readable storage medium according to claim 2, wherein
image data representing the first image is transmitted to the portable display device, and
the portable display device is configured to:
obtain image data outputted from the information processing apparatus; and
display the first image represented by the obtained image data.

13. The non-transitory computer-readable storage medium according to claim 12, wherein
the information processing program further causes the computer to generate compressed image data by compressing the image data representing the first image,
output the generated compressed image data to the portable display device, and
obtain the compressed image data outputted from the information processing apparatus, wherein the portable display device is further configured to decompress the compressed image data to obtain image data representing the first display image, and
display the first image represented by the obtained and decompressed image data.

14. The non-transitory computer-readable storage medium according to claim 1, wherein
the information processing program further causes the computer to set, based on the position of the object in the virtual world, the second virtual camera for generating an image of the virtual world, in a position different from the position of the first virtual camera such that the object is included in the second image.

15. The non-transitory computer-readable storage medium according to claim 14, wherein
the second virtual camera is set in a position apart from the object by a distance longer than the distance between the object and the first virtual camera, and
a range of the virtual world, which range is broader than the range of the virtual world as the first image, is displayed on the stationary display device as the second image.

16. The non-transitory computer-readable storage medium according to claim 14, wherein
the second virtual camera is set in a position in the virtual world from which the second virtual camera views the object in a manner of bird's eye viewing, and
an image in which the object arranged in the virtual world is viewed in a manner of bird's eye viewing is displayed on the stationary display device as the second image.

17. The non-transitory computer-readable storage medium according to claim 1, wherein
a line-of-sight direction of the second virtual camera in the virtual world is changed in accordance with a change in a line-of-sight direction of the first virtual camera in the virtual world.

18. The non-transitory computer-readable storage medium according to claim 1, wherein the first and second image are rendered using a graphics processing unit of the information processing apparatus.

19. The non-transitory computer-readable storage medium according to claim 1, wherein the signal transmitted from the information processing apparatus to the separately housed portable display device is encoded using a codec.

20. A non-transitory computer-readable storage medium comprising an information processing program executed on a computer of an information processing apparatus which is capable of displaying an image on a separately housed portable display device which outputs at least attitude data according to an attitude of a body of the portable display device, wherein the information processing program, when executed, causes the computer to:
obtain data based on a load applied to a load detection device;
render, using processing circuitry of the information processing apparatus, a first image from a first virtual camera;
control the first virtual camera which generates the first image of the virtual world, based on the obtained data and the attitude data, corresponding to the attitude of the body of the portable display device;
render, using the processing circuitry of the information processing apparatus, a second image from a second virtual camera having a different viewpoint than the first virtual camera;

transmit, from the information processing apparatus to the separately housed portable display device, an encoded signal including the first image representing the virtual world viewed from the first virtual camera and rendered using the processing circuitry of the information processing apparatus; and output, from the information processing apparatus to a separately housed stationary display device operatively coupled to the information processing apparatus, the second image representing the virtual world viewed from the second virtual camera and rendered using the processing circuitry of the information processing apparatus.

21. An information processing system including a portable display device, a load detection device, and an information processing apparatus capable of displaying an image on the portable display device, wherein the load detection device configured to output, to the information processing apparatus, data based on a load applied to the load detection device, the portable display device configured to output, to the separately housed information processing apparatus, at least attitude data according to an attitude of the portable display device, the information processing apparatus configured to:
obtain data outputted from the load detection device;
cause an object arranged in the virtual world to move, based on the obtained data;
render a first image from a first virtual camera using processing circuitry of the information processing apparatus;
control the first virtual camera which generates the first image of the virtual world, based on the attitude data, corresponding to the attitude of the portable display device, and a position of the object in the virtual world;
render a second image from a second virtual camera having a different viewpoint than the first virtual camera using the processing circuitry of the information processing apparatus;
transmit, to the separately housed portable display device, an encoded signal including the first image representing the virtual world viewed from the first virtual camera and rendered using the processing circuitry of the information processing apparatus; and
output, to a separately housed stationary display device operatively coupled to the information processing apparatus, the second image representing the virtual world viewed from the second virtual camera and rendered using the processing circuitry of the information processing apparatus, and the portable display device further configured to:
obtain the data of the first image transmitted from the information processing apparatus; and
display the first image represented by the obtained image data.

22. An information processing system including a portable display device, a load detection device, and an information processing apparatus capable of displaying an image on the portable display device, wherein the load detection device configured to output, to the information processing apparatus, data based on a load applied to the load detection device, the portable display device configured to output, to the separately housed information processing apparatus, at least attitude data according to an attitude of the portable display device, the information processing apparatus configured to:
obtain data outputted from the load detection device;
render a first image from a first virtual camera using processing circuitry of the information processing apparatus;
control the first virtual camera which generates the first image of the virtual world, based on the obtained data, and the attitude data, corresponding to the attitude of the portable display device;
render a second image from a second virtual camera having a different viewpoint than the first virtual camera using the processing circuitry of the information processing apparatus;
transmit, to the separately housed portable display device, an encoded signal including the first image representing the virtual world viewed from the first virtual camera and rendered using the processing circuitry of the information processing apparatus; and
output, to a separately housed stationary display device operatively coupled to the information processing apparatus, the second image representing the virtual world viewed from the second virtual camera and rendered using the processing circuitry of the information processing apparatus, and the portable display device further configured to:
obtain the data of the first image transmitted from the information processing apparatus; and
display the first image represented by the obtained image data.

23. An information processing method executed by one processor included in an information processing system that includes at least one information processing apparatus capable of displaying an image on a separately housed portable display device that outputs at least attitude data according to an attitude of a body of the portable display device, or by a plurality of processors included in the information processing system in a cooperative manner, the information processing method comprising:

obtaining data based on a load applied to a load detection device;
causing an object arranged in a virtual world to move based on the obtained data;
rendering, using processing circuitry of the information processing apparatus, a first image from a first virtual camera;
controlling the first virtual camera which generates the first image of the virtual world, based on the attitude data, corresponding to the attitude of the body of the portable display device, and a position of the object in the virtual world;
rendering, using the processing circuitry of the information processing apparatus, a second image from a second virtual camera having a different viewpoint than the first virtual camera;
transmitting, from the information processing apparatus to the separately housed portable display device, an encoded signal including the first image representing the virtual world viewed from the first virtual camera and rendered using the processing circuitry of the information processing apparatus; and
outputting, from the information processing apparatus to a separately housed stationary display device operatively coupled to the information processing apparatus, the second image representing the virtual world viewed from the second virtual camera and rendered using the processing circuitry of the information processing apparatus.

24. An information processing method executed by one processor included in an information processing system that includes at least one information processing apparatus capable of displaying an image on a separately housed portable display device that outputs at least attitude data according to an attitude of a body of the portable display device, or by a plurality of processors included in the information processing system in a cooperative manner, the information processing method comprising:
  obtaining data based on a load applied to a load detection device;
  rendering, using processing circuitry of the information processing apparatus, a first image from a first virtual camera;
  controlling the first virtual camera which generates the first image of the virtual world, based on the obtained data and the attitude data, corresponding to the attitude of the body of the portable display device;
  rendering, using the processing circuitry of the information processing apparatus, a second image from a second virtual camera having a different viewpoint than the first virtual camera;
  transmitting, from the information processing apparatus to the separately housed portable display device, an encoded signal including the first image representing the virtual world viewed from the first virtual camera and rendered using the processing circuitry of the information processing apparatus; and
  outputting, from the information processing apparatus to a separately housed stationary display device operatively coupled to the information processing apparatus, the second image representing the virtual world viewed from the second virtual camera and rendered using the processing circuitry of the information processing apparatus.

25. An information processing apparatus, comprising:
  a processing system having at least one processor, the processing system configured to:
    obtain data based on a load applied to a load detection device;
    cause an object arranged in a virtual world to move based on the obtained data;
    render a first image of a virtual world from a first virtual camera using the processing system of the information processing apparatus;
    control the first virtual camera, which generates the first image of the virtual world, based on attitude data, corresponding to an attitude of a body of a separately housed portable display device, and a position of the object in the virtual world;
    render a second image from a second virtual camera having a different viewpoint than the first virtual camera using the processing system of the information processing apparatus;
    transmit, from the information processing apparatus to the separately housed portable display device, a signal including the first image representing the virtual world viewed from the first virtual camera; and
    output, from the information processing apparatus to a separately housed stationary display device operatively coupled to the information processing apparatus, the second image representing the virtual world viewed from the second virtual camera.

26. An information processing apparatus, comprising:
  a processing system having at least one processor, the processing system configured to:
    obtain data based on a load applied to a load detection device;
    render a first image of a virtual world from a first virtual camera using the processing system of the information processing apparatus;
    control the first virtual camera which generates the first image of the virtual world, based on the obtained data and attitude data, corresponding to an attitude of a body of a separately housed portable display device;
    render a second image from a second virtual camera having a different viewpoint than the first virtual camera using the processing system of the information processing apparatus;
    transmit, from the information processing apparatus to the separately housed portable display device, a signal including the first image representing the virtual world viewed from the first virtual camera; and
    output, from the information processing apparatus to a separately housed stationary display device operatively coupled to the information processing apparatus, the second image representing the virtual world viewed from the second virtual camera.

* * * * *